(12) United States Patent
Vandike et al.

(10) Patent No.: US 12,320,666 B2
(45) Date of Patent: **\*Jun. 3, 2025**

(54) MACHINE CONTROL USING A PREDICTIVE MAP

(71) Applicant: Deere & Company, Moline, IL (US)

(72) Inventors: Nathan R. Vandike, Geneseo, IL (US); Bhanu Kiran Reddy Palla, Bettendorf, IA (US); Nathan E. Krehbiel, Bettendorf, IA (US); Duane M. Bomleny, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,945

(22) Filed: Jan. 30, 2024

(65) Prior Publication Data
US 2024/0167842 A1  May 23, 2024

Related U.S. Application Data

(63) Continuation of application No. 17/067,243, filed on Oct. 9, 2020, now Pat. No. 11,927,459.

(51) Int. Cl.
*G05D 1/00* (2024.01)
*A01B 69/00* (2006.01)
(Continued)

(52) U.S. Cl.
CPC ........ *G01C 21/3826* (2020.08); *A01B 69/008* (2013.01); *A01D 41/1278* (2013.01); *B60K 35/00* (2013.01); *G01C 21/3841* (2020.08); *G01C 21/3848* (2020.08); *G01C 21/3885* (2020.08); *G01S 19/42* (2013.01);
(Continued)

(58) Field of Classification Search
CPC G01C 21/3848; G01C 21/3889; G01C 19/42; G01C 21/3826; G01C 21/00; A01D 61/02; A01D 45/023; A01D 4/1278; G01N 33/24; B07B 4/04; B02C 25/00; A01B 79/005; A01B 19/04; A01B 69/004; A01B 79/00; B60K 31/0066; G05D 1/0276;
(Continued)

(56) References Cited

U.S. PATENT DOCUMENTS 5,995,895 A * 11/1999 Watt .................... B60K 31/0066
56/10.2 G
6,178,253 B1 * 1/2001 Hendrickson ............. G06T 7/90
382/110

(Continued)

*Primary Examiner* — Yuri Kan
(74) *Attorney, Agent, or Firm* — Kelly, Holt & Christenson; Joseph R. Kelly

(57) ABSTRACT

One or more information maps are obtained by an agricultural work machine. The one or more information maps map one or more agricultural characteristic values at different geographic locations of a field. An in-situ sensor on the agricultural work machine senses an agricultural characteristic as the agricultural work machine moves through the field. A predictive map generator generates a predictive map that predicts a predictive agricultural characteristic at different locations in the field based on a relationship between the values in the one or more information maps and the agricultural characteristic sensed by the in-situ sensor. The predictive map can be output and used in automated machine control.

20 Claims, 20 Drawing Sheets

(51) Int. Cl.

| | |
|---|---|
| *A01B 69/04* | (2006.01) |
| *A01D 41/127* | (2006.01) |
| *A01D 61/02* | (2006.01) |
| *B60K 35/00* | (2024.01) |
| *B60K 35/10* | (2024.01) |
| *B60K 35/22* | (2024.01) |
| *B60K 35/28* | (2024.01) |
| *G01C 21/00* | (2006.01) |
| *G01N 33/00* | (2006.01) |
| *G01N 33/24* | (2006.01) |
| *G01S 19/42* | (2010.01) |
| *G05D 1/02* | (2020.01) |
| *G05D 1/248* | (2024.01) |
| *G05D 1/646* | (2024.01) |
| *G06N 20/00* | (2019.01) |

(52) U.S. Cl.
CPC ......... *G05D 1/0212* (2013.01); *G05D 1/0278* (2013.01); *G05D 1/248* (2024.01); *G05D 1/646* (2024.01); *A01B 69/001* (2013.01); *A01D 41/1277* (2013.01); *B60K 35/10* (2024.01); *B60K 35/22* (2024.01); *B60K 35/28* (2024.01); *B60K 2360/1438* (2024.01); *B60K 2360/166* (2024.01)

(58) Field of Classification Search
CPC ........ G05D 1/0278; G05D 1/02; G05D 1/646; G05D 1/0274; G06T 7/90
See application file for complete search history.

(56) References Cited

U.S. PATENT DOCUMENTS

| | | | | |
|---|---|---|---|---|
| 6,199,000 | B1* | 3/2001 | Keller | A01B 79/005 |
| | | | | 342/357.62 |
| 8,770,501 | B2* | 7/2014 | Laukka | B02C 25/00 |
| | | | | 241/34 |
| 9,232,693 | B2* | 1/2016 | Hendrickson | A01D 45/023 |
| 10,194,574 | B2* | 2/2019 | Knobloch | A01B 19/04 |
| 10,315,655 | B2* | 6/2019 | Blank | G05D 1/0276 |
| 10,412,887 | B2* | 9/2019 | Füchtling | A01D 61/02 |
| 11,825,768 | B2* | 11/2023 | Vandike | G05D 1/0274 |
| 11,927,459 | B2* | 3/2024 | Vandike | G05D 1/646 |
| 2008/0192987 | A1* | 8/2008 | Helgason | G01N 33/24 |
| | | | | 382/109 |
| 2014/0102955 | A1* | 4/2014 | Viny | B07B 4/04 |
| | | | | 209/645 |
| 2014/0230392 | A1* | 8/2014 | Dybro | A01D 45/021 |
| | | | | 56/10.2 R |
| 2020/0326727 | A1* | 10/2020 | Palla | A01B 69/004 |
| 2021/0000010 | A1* | 1/2021 | Gunda | A01D 45/00 |
| 2021/0176916 | A1* | 6/2021 | Sidon | A01B 79/005 |
| 2022/0110255 | A1* | 4/2022 | Vandike | A01B 79/005 |
| 2022/0110257 | A1* | 4/2022 | Vandike | G05D 1/0274 |
| 2022/0110258 | A1* | 4/2022 | Vandike | G05D 1/0278 |
| 2022/0113161 | A1* | 4/2022 | Vandike | G01S 19/42 |
| 2022/0113725 | A1* | 4/2022 | Vandike | G01C 21/3848 |
| 2022/0113727 | A1* | 4/2022 | Vandike | G05D 1/0221 |
| 2022/0113734 | A1* | 4/2022 | Vandike | G01C 21/3889 |
| 2022/0167547 | A1* | 6/2022 | Vandike | G05B 13/048 |

* cited by examiner

MACHINE CONTROL USING A PREDICTIVE MAP

CROSS-REFERENCE TO RELATED APPLICATION

The present application is a continuation of and claims priority of U.S. patent application Ser. No. 17/067,243, filed Oct. 9, 2020, the content of which is hereby incorporated by reference in its entirety.

FIELD OF THE DESCRIPTION

The present description relates to agricultural machines, forestry machines, construction machines and turf management machines.

BACKGROUND

There are a wide variety of different types of agricultural machines. Some agricultural machines include harvesters, such as combine harvesters, sugar cane harvesters, cotton harvesters, self-propelled forage harvesters, and windrowers. Some harvesters can also be fitted with different types of heads to harvest different types of crops.

A variety of different conditions in fields have a number of deleterious effects on the harvesting operation. Therefore, an operator may attempt to modify control of the harvester upon encountering such conditions during the harvesting operation.

The discussion above is merely provided for general background information and is not intended to be used as an aid in determining the scope of the claimed subject matter.

SUMMARY

One or more information maps are obtained by an agricultural work machine. The one or more information maps map one or more agricultural characteristic values at different geographic locations of a field. An in-situ sensor on the agricultural work machine senses an agricultural characteristic as the agricultural work machine moves through the field. A predictive map generator generates a predictive map that predicts a predictive agricultural characteristic at different locations in the field based on a relationship between the values in the one or more information maps and the agricultural characteristic sensed by the in-situ sensor. The predictive map can be output and used in automated machine control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to examples that solve any or all disadvantages noted in the background.

DETAILED DESCRIPTION

Figure 1:
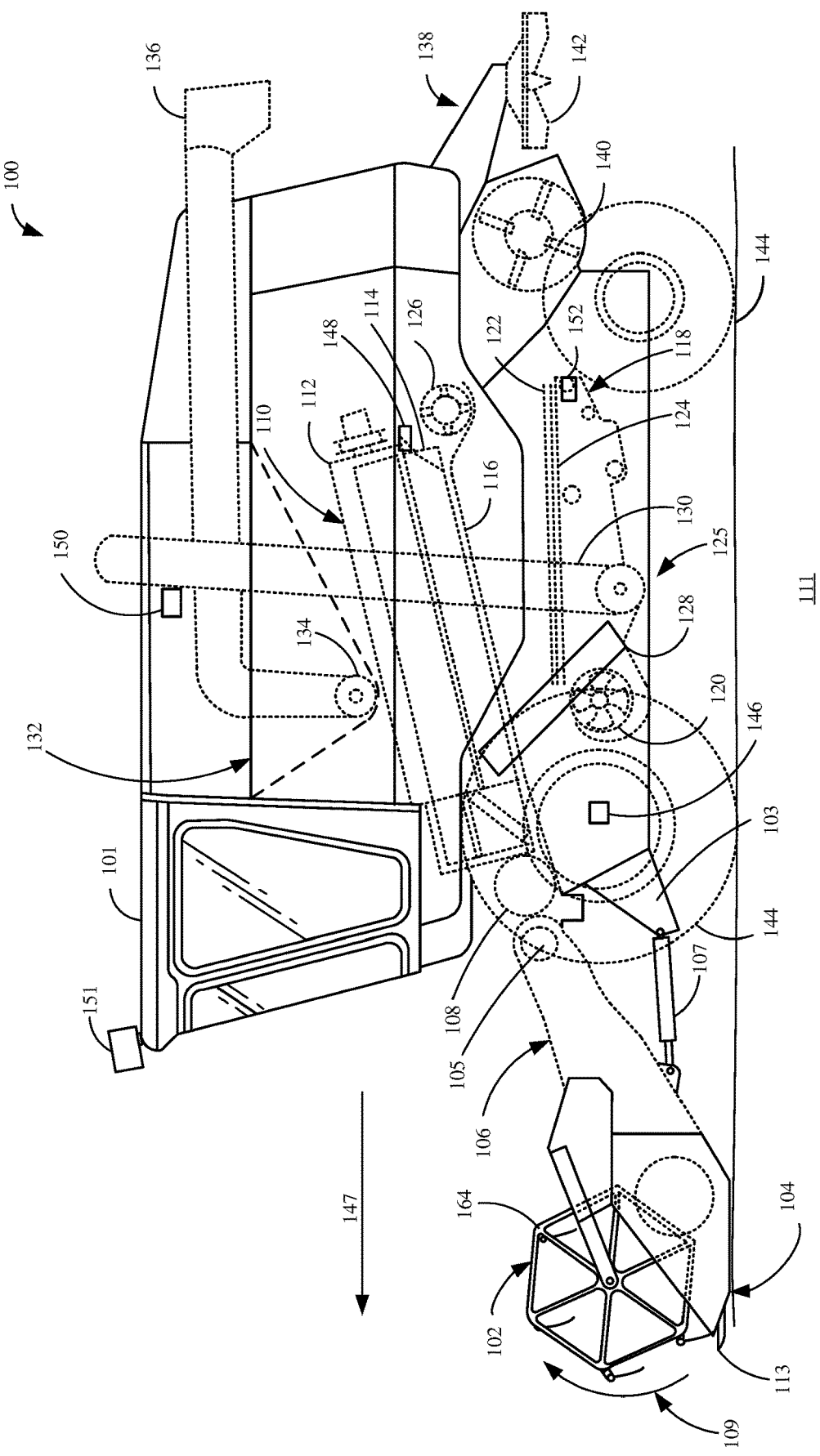
FIG. 1 is a partial pictorial, partial schematic illustration of one example of an agricultural harvester.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

The present description relates to using in-situ data taken concurrently with an agricultural operation, in combination with data provided by a map, to generate a functional predictive map and, more particularly, a functional predictive stalk diameter map. In some examples, the functional predictive stalk diameter map can be used to control an agricultural work machine, such as an agricultural harvester. Stalk diameter may be expressed quantitatively in length units such as millimeters, inches, etc. In other examples without limitation, stalk diameter may be expressed qualitatively or relatively with classifications such as "wide/wider", "typical" or "large, medium, small", and "narrow/narrower". It is to be understood that for the purposes of the present disclosure, stalk diameter refers to a cross-sectional width of the plant stalk, not necessarily a geometric diameter. As plant stalks are not typically perfectly circular, diameter is used herein to describe a width across the plant stalk. The performance of an agricultural harvester may be degraded when the agricultural harvester engages areas of varying stalk diameter unless machine settings are also changed. For instance, if the deck plates on the header of the agricultural harvester are not properly spaced, the crop may be processed undesirably, which may lead to, among other things, increased material other than grain (MOG) intake or grain loss, or both.

A vegetative index map illustratively maps vegetative index values, which may be indicative of vegetative growth, across different geographic locations in a field of interest. One example of a vegetative index includes a normalized difference vegetation index (NDVI). There are many other vegetative indices, and all of these vegetative indices are within the scope of the present disclosure. In some examples, a vegetative index may be derived from sensor readings of one or more bands of electromagnetic radiation reflected by the plants. Without limitations, these bands may be in the microwave, infrared, visible, or ultraviolet portions of the electromagnetic spectrum.

A vegetative index map can thus be used to identify the presence and location of vegetation. In some examples, a vegetative index map enables crops to be identified and georeferenced in the presence of bare soil, crop residue, or other plants, including crop or weeds. For instance, towards the beginning of a growing season, when a crop is in a growing state, the vegetative index may show the progress of the crop development. Therefore, if a vegetative index map is generated early in the growing season or midway through the growing season, the vegetative index map may be indicative of the progress of the development of the crop plants. For instance, the vegetative index map may indicate whether the plant is stunted, establishing a sufficient canopy, or other plant attributes that are indicative of plant development.

A historical yield map illustratively maps yield values across different geographic locations in one or more field(s) of interest. These historical yield maps are collected from past harvesting operations on the field(s). A yield map may show yield in yield value units. One example of a yield value unit includes dry bushels per acre. In some examples, a historical yield map may be derived from sensor readings of one or more yield sensors. Without limitation, these yield sensors may include gamma ray attenuation sensors, impact plate sensors, load cells, cameras, or other optical sensors and ultrasonic sensors, among others.

A seeding map illustratively maps seeding characteristics across different geographic locations in a field of interest. These seeding maps are typically collected from past seed planting operations on the field. In some examples, the seeding map may be derived from control signals used by a seeder when planting the seeds or from sensors on the seeder, such as sensors that confirm a seed was delivered to a furrow generated by the seeder. Seeders can include geographic position sensors that geolocate the locations of where the seeds were planted as well as topographical sensors that generate topographical information of the field. The information generated during a previous seed planting operation can be used to determine various seeding characteristics, such as location (e.g., geographic location of the planted seeds in the field), spacing (e.g., both the spacing between the individual seeds, the spacing between and the seed rows, or both), population (which can be derived from spacing characteristics), orientation (e.g., seed orientation in the a trench, as well as or orientation of the seed rows), depth (e.g., seed depth or, as well as furrow depth), dimensions (such as seed size), or genotype (such as seed species, seed hybrid, seed cultivar, etc.). A variety of other seeding characteristics may be determined as well.

Alternatively, or in addition to data from a prior operation, various seeding characteristics on the seeding maps can be generated based on data from third parties, such as third-party seed vendors that provide the seeds for the seed planting operation. These third parties may provide various data that indicates various seeding characteristics, for example, dimension data, such as seed size, or genotype data, such as seed species, seed hybrid, or seed cultivar. Additionally, seed vendors can provide various data relative to particular plant characteristics of the resultant plants of each different seed genotype. For example, data on plant growth, such as stalk diameter, car size, plant height, plant mass, etc., plant response to weather conditions, plant response to applied substances, such as herbicide, fungicide, pesticide, insecticide, fertilizer, etc., plant response to pests, fungus, weeds, disease, etc., as well as any number of other plant characteristics.

Alternatively, or in addition to the data from a prior operation or from a third party, various seeding characteristics on the seeding maps can be generated based on various user or operator input data, for instance, operator or user input data indicative of various seeding characteristics, such as location, depth, orientation, spacing, dimensions, taxonomy, as well as various other seeding characteristics.

In some examples, a seeding map may be derived from sensor readings of one or more bands of electromagnetic radiation reflected by the seeds. Without limitation, these bands may be in the microwave, infrared, visible, or ultraviolet portions of the electromagnetic spectrum.

The present discussion proceeds with respect to systems that receive a map. The map received by the system can include, for instance, a prior information map, a map generated on the basis of a prior operation, or a functional predictive map, for instance a predictive yield map. The system also uses an in-situ sensor to detect a variable indicative of one or more characteristics during a harvesting operation. The one or more characteristics detected by the in-situ sensor include an agricultural characteristic, such as a characteristic of the environment in which the agricultural harvester operates, a machine characteristic of the agricultural harvester, or operator command inputs. An agricultural characteristic is any characteristic which may affect an agricultural operation, such as a harvesting operation. In one example, one or more in-situ sensors detect one or more variables indicative of a diameter of stalks of vegetation on the field, such as a diameter of crop stalks on the field, for instance, the one or more in-situ sensors can include one or more stalk diameter sensors that sense a diameter of cornstalks on the field. In another example, stalk diameter may be proportional to the energy required to sever the stalk or stem of one or more plants. It will be noted, however, that the in-situ sensor can detect a variable indicative of any number of other agricultural characteristics and is not limited to the characteristics described herein. The systems generate a model that models a relationship between the values on the received map and the values output by the in-situ sensor of the detected characteristic. The model is used to generate a functional predictive map that contains predicted values of, for example, stalk diameter, agricultural characteristics, or operator command inputs, at different areas of the field based on the values from the received map at those areas. The functional predictive map, generated during the harvesting operation, can be presented to an operator or other user or used in automatically controlling an agricultural harvester during the harvesting operation, or both. The functional predictive map can be used to control one or more of the controllable subsystems on the agricultural harvester. For instance, a deck plate position controller can generate control signals to control a machine actuator subsystem to adjust a position or spacing of deck plates on the agricultural harvester based on the functional predictive map.

Deck plates, also referred to as stripper plates, are included on row units of the headers of agricultural harvesters, such as corn headers. Generally, included on each row unit is a left and right deck plate, each deck plate having an inner edge. The inner edges of the left and right deck plates are spaced apart. The spacing between the left and right deck plates defines a gap that receives vegetation, such as the stalks of corn plants. The gap can be tapered. For example, the gap can be tapered from back (closer to rear of agricultural harvester) to front (farther from the agricultural harvester and where the stalk enters the gap) such that the spacing between the front of the deck plates is narrower than the spacing at the back of the deck plates. As the agricultural harvester travels across a field, the gap defined by the spacing of the deck plates receives cornstalks of an aligned row of corn plants as the row unit moves along the row. As the row unit is moved along the row, the cornstalks are drawn through the gap with the assistance of gathering chains (usually located above the deck plates), stalk rolls, also referred to as snapping rolls, (usually located below the deck plates), or both on the row unit such that the ears of corn carried by the stalk impact the deck plates and are separated from the stalk. The separated ears of corn are further conveyed through the agricultural harvester while the severed stalk material is left on the field, where the stalk material remains or is later gathered, such as part of a stover gathering process.

Having the proper settings, such as position and spacing, of the deck plates on the agricultural harvester is important to reduce loss, such as header grain loss from butt shelling and from ear tossing, and to reduce material other than grain (MOG) intake. In field conditions where stalk diameter can vary significantly, the deck plate position and spacing can have significant performance impacts. For instance, if the spacing between the deck plates is too wide, butt shelling (i.e., the shelling or removal of corn kernels from a cob when the butt end of the ear is allowed to contact the snapping rolls) can occur which leads to grain loss at the header by leaving shelled corn kernels on the field. If the spacing between the deck plates is too narrow, the stalks can be snapped too early and the agricultural harvester will take in too much MOG by carrying MOG along with the ear into the harvester, which can overload the separator and make separating grain from MOG on the sieves more difficult, thus leading to grain loss out of the back of the agricultural harvester as the residue is expelled. With harvest speeds increasing and header sizes growing larger, failing to make proper and timely adjustments to deck plate position and spacing can deleteriously affect the agricultural harvester's performance.

The values (or characteristics indicated by or derived from the values) in the received maps can have an effect on or otherwise share a relationship with resultant stalk diameters such that by detecting a stalk diameter at a first location in a field with known values (provided by the map) stalk diameters in one or more other locations of the field can be predicted (without detection) based on the values (provided by the map) at those locations and based on the relationship between the detected stalk diameter and the values (provided by the map) at the first location. Vegetative index values, such as crop growth and crop health, can be indicators of resultant stalk diameter such that crops in areas with similar vegetative index values may have similar or predictable stalk diameters. Additionally, the seeding characteristics of seeds planted at a field may have an effect on or share a relationship with a resultant stalk diameter of the crop plant. For instance, the spacing between seeds and seed rows, the characteristics of the seedbed, and the seed genotype, among various other seeding characteristics, can be indicators of resultant stalk diameter such that crops in areas with similar seeding characteristics may have similar or predictable stalk diameters. Additionally, yield characteristics may also have an effect on or share a relationship with stalk diameters of the crop plant. For instance, generally crop plants (or locations of the field) with higher yield values will have more or larger ears, seed heads, etc., or both, and thus the crop plants generally have correspondingly larger stalks to support the additional or larger ears or seed heads of the crop plant.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters described and is, thus, not limited to combine harvesters. Moreover, the present disclosure is directed to other types of work machines, such as agricultural seeders and sprayers, construction equipment, forestry equipment, and turf management equipment where generation of a predictive map may be applicable. Consequently, the present disclosure is intended to encompass these various types of harvesters and other work machines and is, thus, not limited to combine harvesters.

As shown in FIG. 1, agricultural harvester 100 illustratively includes an operator compartment 101, which can have a variety of different operator interface mechanisms, for controlling agricultural harvester 100. Agricultural harvester 100 includes front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100.

Thresher 110 illustratively includes a threshing rotor 112 and a set of concaves 114. Further, agricultural harvester 100 also includes a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, a combine harvester within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command from an operator. The operator of agricultural harvester 100 may determine one or more of a height setting, a tilt angle setting, or a roll angle setting for header 102. For example, the operator inputs a setting or settings to a control system, described in more detail below, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 104 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axel, or other components. In some instances, the travel speed may be sensed using a positioning system, such as a global positioning system (GPS), a dead reckoning system, a long range navigation (LORAN) system, or a wide variety of other systems or sensors that provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of cleaning fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. Crop property sensors may also be configured to sense characteristics of the severed crop material as the crop material is being processed by agricultural harvester 100. For example, in some instances, the crop property sensors may sense grain quality such as broken grain, MOG levels; grain constituents such as starches and protein; and grain feed rate as the grain travels through the feeder house 106, clean grain elevator 130, or elsewhere in the agricultural harvester 100. The crop property sensors may also sense the feed rate of biomass through feeder house 106, through the separator 116 or elsewhere in agricultural harvester 100. The crop property sensors may also sense the feed rate as a mass flow rate of grain through elevator 130 or through other portions of the agricultural harvester 100 or provide other output signals indicative of other sensed variables. Crop property sensors can include one or more yield sensors that sense crop yield being harvested by agricultural harvester.

Yield sensor(s) can include a grain flow sensor that detects a flow of crop, such as grain, in material handling subsystem 125 or other portions of agricultural harvester 100. For example, a yield sensor can include a gamma ray attenuation sensor that measures flow rate of harvested grain. In another example, a yield sensor includes an impact plate sensor that detects impact of grain against a sensing plate or surface so as to measure mass flow rate of harvested grain. In another example, a yield sensor includes one or more load cells which measure or detect a load or mass of harvested grain. For example, one or more load cells may be located at a bottom of grain tank 132, wherein changes in the weight or mass of grain within grain tank 132 during a measurement interval indicates the aggregate yield during the measurement interval. The measurement interval may be increased for averaging or decreased for more instantaneous measurements. In another example, a yield sensor includes cameras or optical sensing devices that detect the size or shape of an aggregated mass of harvested grain, such as the shape of the mound or height of a mound of grain in grain tank 132. The change in shape or height of the mound during the measurement interval indicates an aggregate yield during the measurement interval. In other examples, other yield sensing technologies are employed. For instance, in one example, a yield sensor includes two or more of the above described sensors, and the yield for a measurement interval is determined from signals output by each of the multiple different types of sensors. For example, yield is determined based upon signals from a gamma ray attenuation sensor, an impact plate sensor, load cells within grain tank 132, and optical sensors along grain tank 132.

Crop property sensors can also include one or more stalk diameter sensors that sense a diameter of crop stalks, such as cornstalks, on the field.

Stalk diameter sensor(s) can include a moveable member, such as mechanical fingers or feelers, configured to contact the plant stalk, such as when the plant stalk is within the passageway defined by the spacing of the deck plates, or, for example, contact plant stalks in an area around the agricultural harvester, such as in front of the header or in an adjacent row. The plant stalk, when contacting the moveable member, exerts a force against the moveable member which may cause displacement of the moveable member. The displacement or force can be measured and used to derive a stalk diameter. In such an example, the stalk diameter sensor may include appropriate sensing technology, such as a sensing device utilizing the piezoelectric effect, a potentiometer, or a light barrier encoder. Further, stalk diameter sensors may also include other sensing technologies adapted to detect a size of a stalk. In another example, when the plant stalk contacts the deck plates, the plant stalk exerts a force against the deck plates, which may cause displacement of the deck plates. For example, the deck plates may be displaced when the passageway is too narrow to accommodate the diameter of the stalk. Thus, the stalk diameter sensor may be configured to measure the displacement or force exerted by the stalk to cause displacement of the deck plates as an indication of the stalk diameter. In such an example, the stalk diameter sensor may include sensing technologies, such as a sensing device utilizing the piezoelectric effect, a potentiometer, or a light barrier encoder. Other sensing technologies may also be used. Stalk diameter sensor(s) can also include optical sensors, such as a camera or other optical sensing device (e.g., radar, lidar, sonar, etc.). In some instances, an optical sensor captures images of the vegetation around the agricultural harvester. The images, which include indications of the plant stalks, can be processed using processing techniques, such as image processing, to derive stalk diameters of the plant stalks around the agricultural harvester. These and various other stalk diameter sensors can be used to provide in-situ indications of stalk diameters on the field in which agricultural harvester 100 is operating. It will be appreciated that these are merely some examples of stalk diameter sensors, and those skilled in the art will appreciate that various other stalk diameter sensors can be used without deviating from the spirit and scope of the disclosure. The agricultural harvester 100 can have one or more stalk diameter sensors. For example, the agricultural harvester 100 can include a stalk diameter sensor for each row unit on header 102.

Prior to describing how agricultural harvester 100 generates a functional predictive stalk diameter map and uses the functional predictive stalk diameter map for presentation or control, a brief description of some of the items on agricultural harvester 100, and their operation, will first be described. The description of FIGS. 2 and 3 describe receiving a general type of prior information map and combining information from the prior information map with a georeferenced sensor signal generated by an in-situ sensor, where the sensor signal is indicative of a characteristic in the field, such as characteristics of crop or weeds present in the field. Characteristics of the field may include, but are not limited to, characteristics of a field such as slope, weed intensity, weed type, soil moisture, surface quality; characteristics of crop properties such as crop height, stalk diameter, ear size, crop moisture, crop density, crop state; characteristics of grain properties such as grain moisture, grain size, grain test weight; and characteristics of machine performance such as loss levels, job quality, fuel consumption, and power utilization. A relationship between the characteristic values obtained from in-situ sensor signals and the prior information map values is identified, and that relationship is used to generate a new functional predictive map. A functional predictive map predicts values at different geographic locations in a field, and one or more of those values may be used for controlling a machine, such as one or more subsystems of an agricultural harvester. In some instances, a functional predictive map can be presented to a user, such as an operator of an agricultural work machine, which may be an agricultural harvester. A functional predictive map may be presented to a user visually, such as via a display, haptically, or audibly. The user may interact with the functional predictive map to perform editing operations and other user interface operations. In some instances, a functional predictive map can be used for one or more of controlling an agricultural work machine, such as an agricultural harvester, presentation to an operator or other user, and presentation to an operator or user for interaction by the operator or user.

Figure 2:
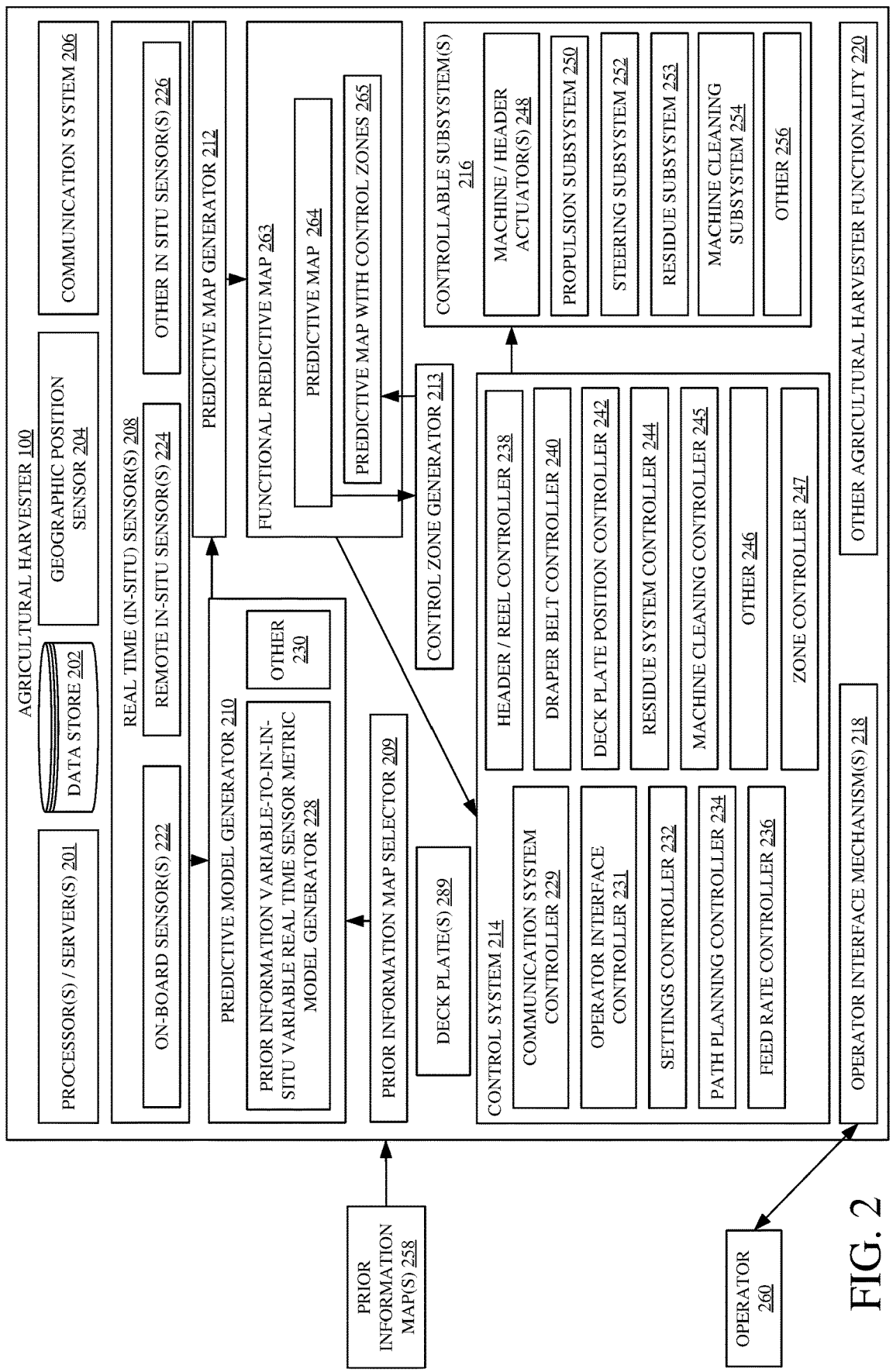
FIG. 2 is a block diagram showing some portions of an agricultural harvester in more detail, according to some examples of the present disclosure.
Figure 3A:
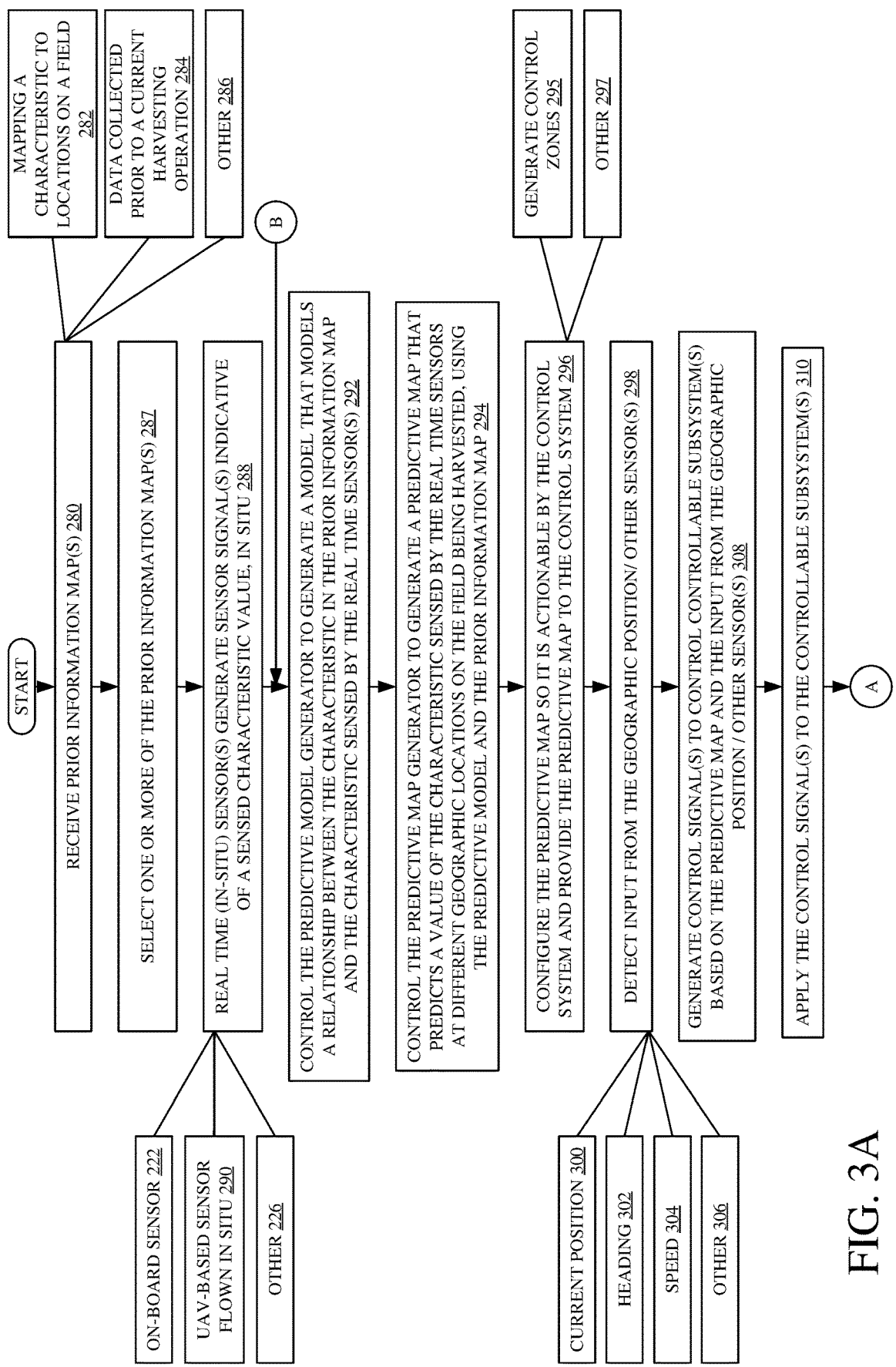
FIGS. 3A-3B (collectively referred to herein as FIG. 3) show a flow diagram illustrating an example of operation of an agricultural harvester in generating a map.
Figure 3B:
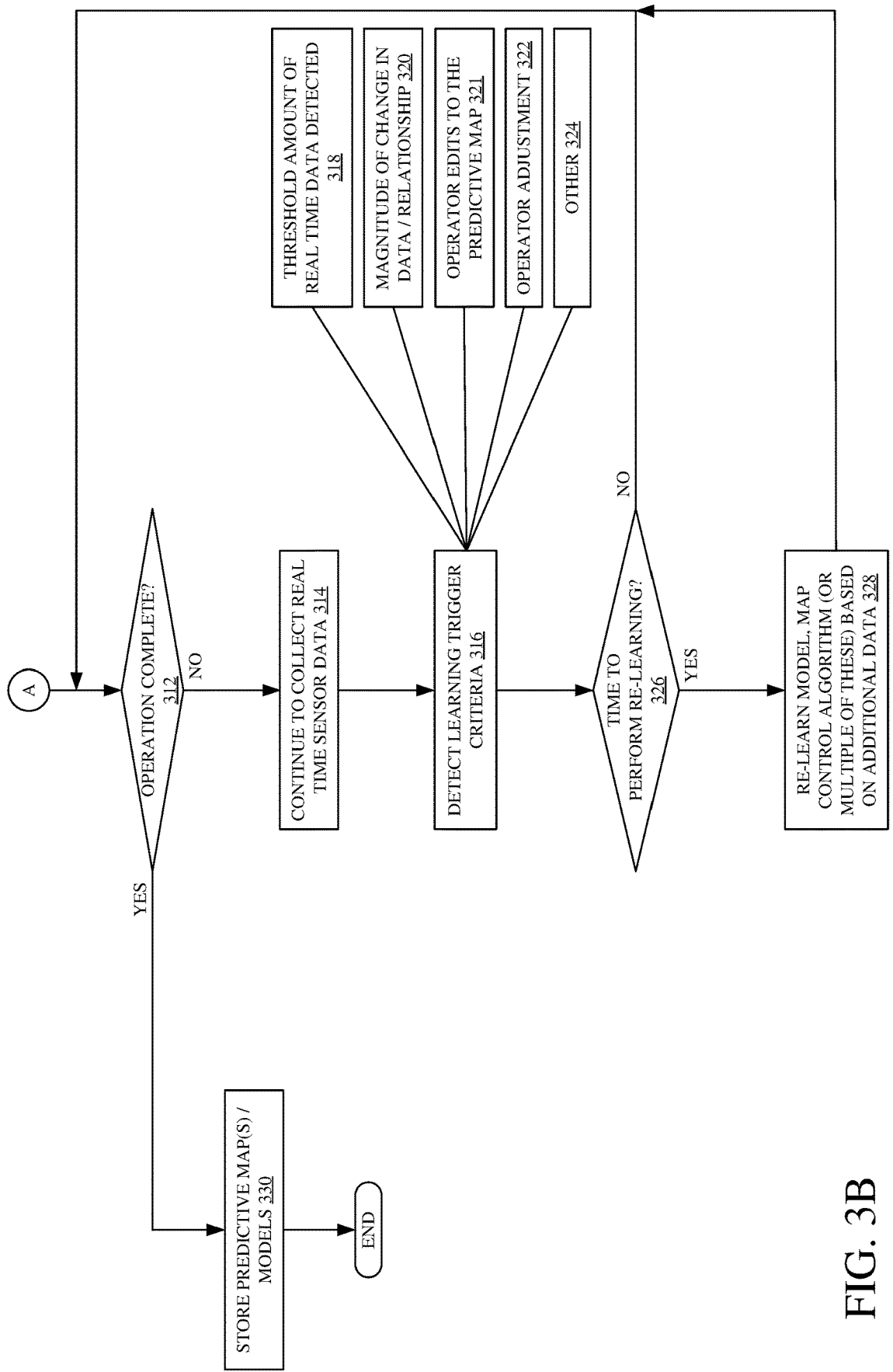
Figure 4:
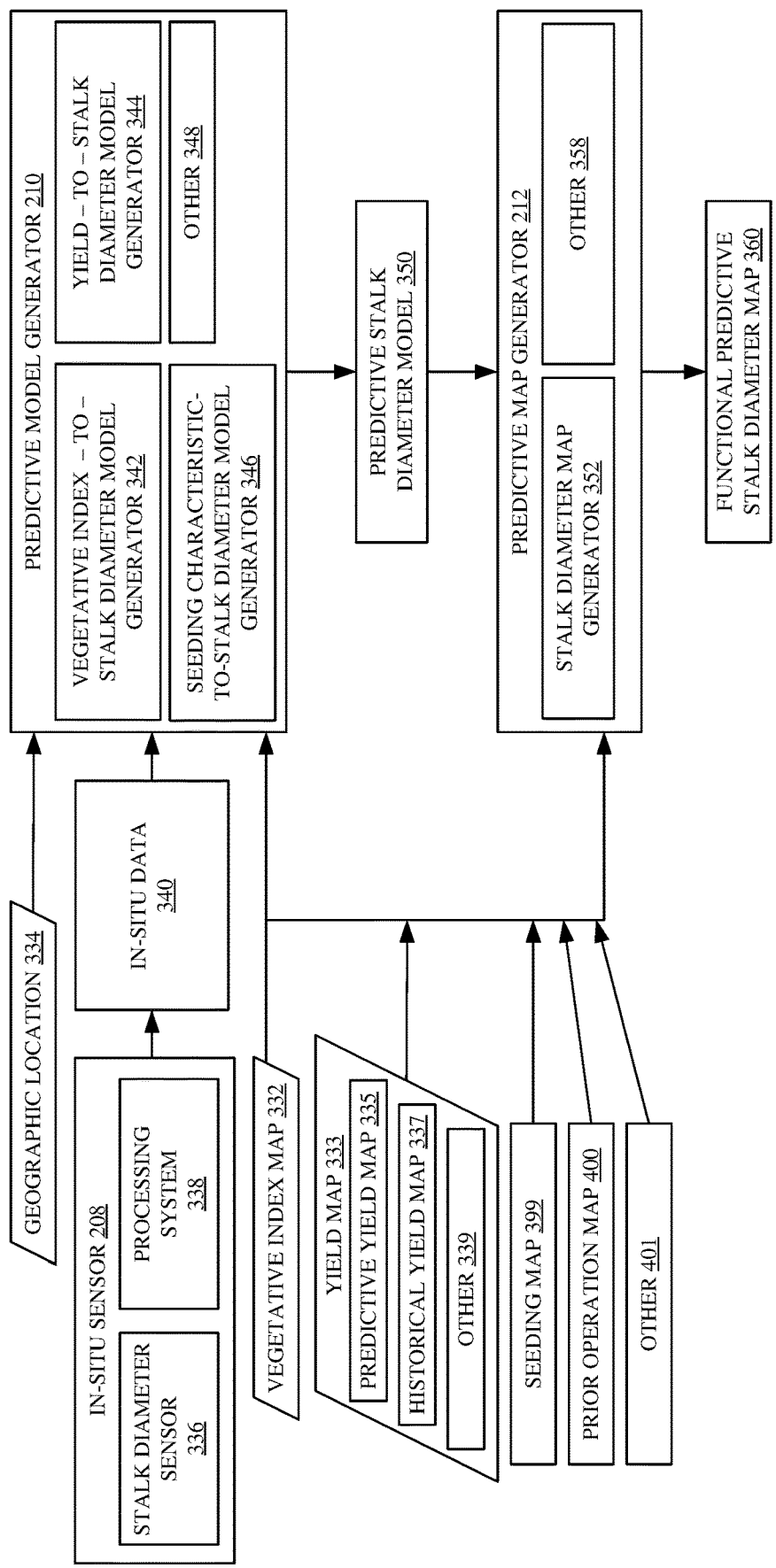
FIG. 4 is a block diagram showing one example of a predictive model generator and a predictive map generator.
Figure 5:
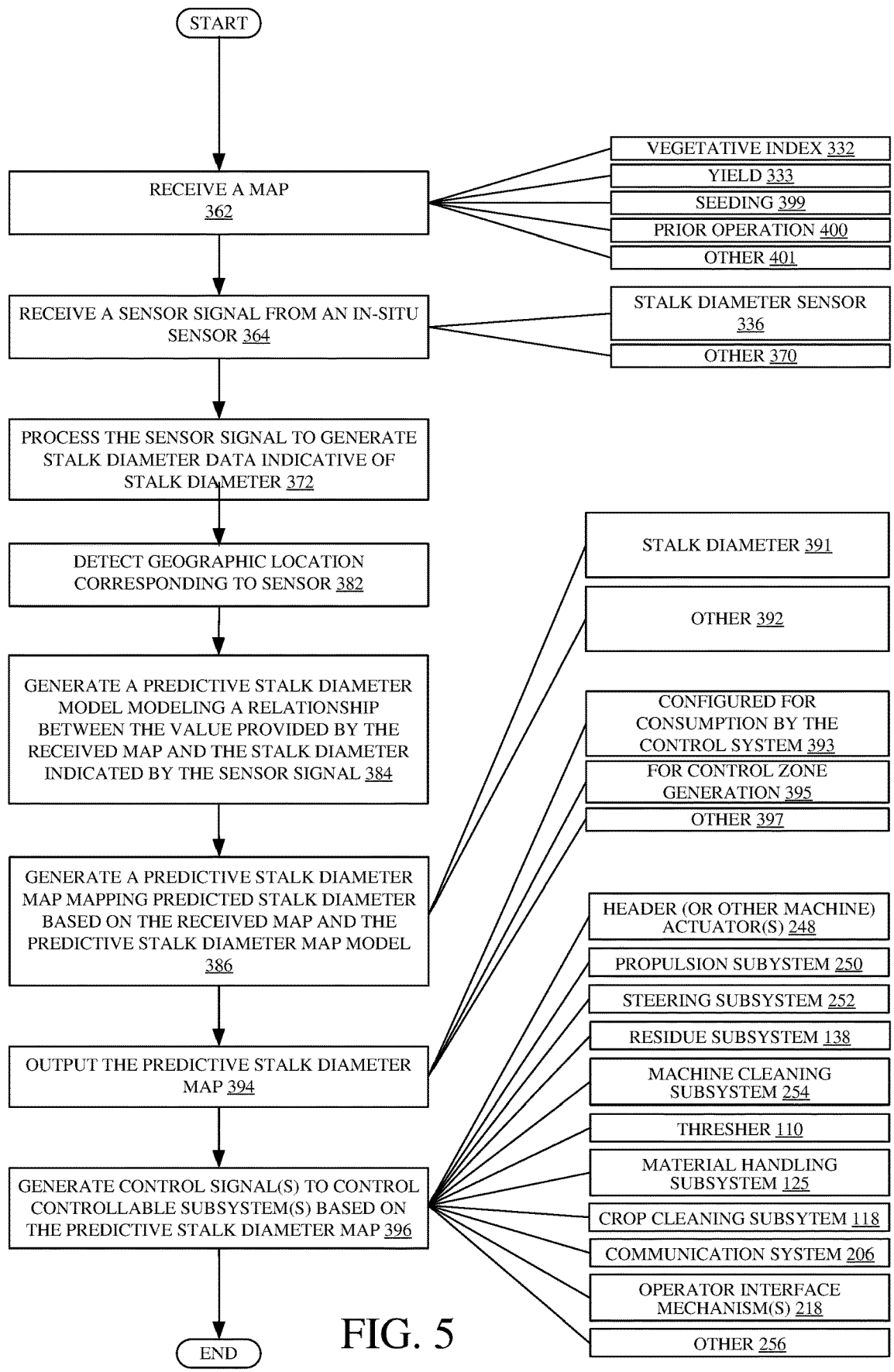
FIG. 5 is a flow diagram showing an example of operation of an agricultural harvester in receiving a map, detecting an in-situ stalk diameter characteristic, and generating a functional predictive stalk diameter map for presentation or use in controlling the agricultural harvester during a harvesting operation or both.

After the general approach is described with respect to FIGS. 2 and 3, a more specific approach for generating a functional predictive stalk diameter map that can be presented to an operator or user, or used to control agricultural harvester 100, or both is described with respect to FIGS. 4 and 5. Again, while the present discussion proceeds with respect to the agricultural harvester and, particularly, a combine harvester, the scope of the present disclosure encompasses other types of agricultural harvesters or other agricultural work machines.

Figure 8:
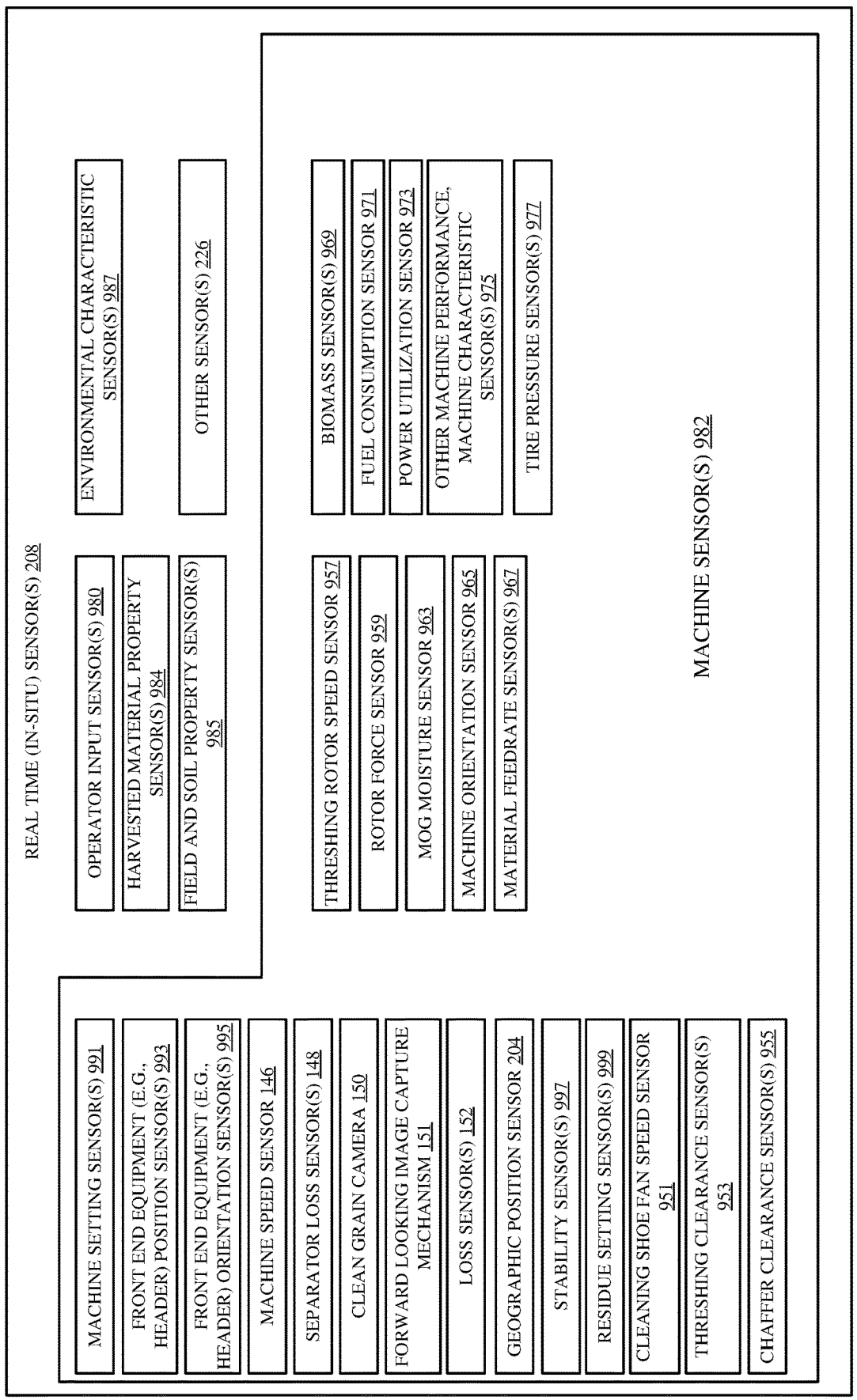
FIG. 8 is a block diagram showing one example of in-situ sensor(s).

FIG. 2 is a block diagram showing some portions of an example agricultural harvester 100. FIG. 2 shows that agricultural harvester 100 illustratively includes one or more processors or servers 201, data store 202, geographic position sensor 204, communication system 206, and one or more in-situ sensors 208 that sense one or more characteristics of a field concurrent with a harvesting operation. The in-situ sensors 208 generate values corresponding to the sensed characteristics. The agricultural harvester 100 also includes a predictive model or relationship generator (collectively referred to hereinafter as "predictive model generator 210"), predictive map generator 212, control zone generator 213, control system 214, one or more controllable subsystems 216, and an operator interface mechanism 218. The agricultural harvester 100 can also include a wide variety of other agricultural harvester functionality 220. The in-situ sensors 208 include, for example, on-board sensors 222, remote sensors 224, and other sensors 226 that sense characteristics of a field during the course of an agricultural operation. Some examples of in-situ sensors 208 are shown in FIG. 8. Predictive model generator 210 illustratively includes a prior information variable-to-in-situ variable model generator 228, and predictive model generator 210 can include other items 230. Control system 214 includes communication system controller 229, operator interface controller 231, a settings controller 232, path planning controller 234, feed rate controller 236, header and reel controller 238, draper belt controller 240, deck plate position controller 242, residue system controller 244, machine cleaning controller 245, zone controller 247, and control system 214 can include other items 246. Controllable subsystems 216 include machine and header actuators 248, propulsion subsystem 250, steering subsystem 252, residue subsystem 138, machine cleaning subsystem 254, and controllable subsystems 216 can include a wide variety of other subsystems 256.

FIG. 2 also shows that agricultural harvester 100 can receive one or more prior information map(s) 258. As described below, the prior information map(s) include, for example, a vegetative index map, a seeding map, a yield map, or a map from a prior operation in the field. However, prior information map(s) 258 may also encompass other types of data that were obtained prior to a harvesting operation or a map from a prior operation, such as historical yield maps from past years that contain contextual information associated with the historical yield. Contextual information can include, without limitation, one or more of weather conditions over a growing season, presence of pests, geographic location, soil types, irrigation, treatment application, etc. Weather conditions can include, without limitation, precipitation over the season, presence of hail capable of crop damage, presence of high winds, temperature over the season, etc. Some examples of pests broadly include, insects, fungi, weeds, bacteria, viruses, etc. Some examples of treatment applications include herbicide, pesticide, fungicide, fertilizer, mineral supplements, etc. FIG. 2 also shows that an operator 260 may operate the agricultural harvester 100. The operator 260 interacts with operator interface mechanisms 218. In some examples, operator interface mechanisms 218 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 260 may interact with operator interface mechanisms 218 using touch gestures. These examples described above are provided as illustrative examples and are not intended to limit the scope of the present disclosure. Consequently, other types of operator interface mechanisms 218 may be used and are within the scope of the present disclosure.

Prior information map 258 may be downloaded onto agricultural harvester 100 and stored in data store 202, using communication system 206 or in other ways. In some examples, communication system 206 may be a cellular communication system, a system for communicating over a wide area network or a local area network, a system for communicating over a near field communication network, or a communication system configured to communicate over any of a variety of other networks or combinations of networks. Communication system 206 may also include a system that facilitates downloads or transfers of information to and from a secure digital (SD) card or a universal serial bus (USB) card, or both.

Geographic position sensor 204 illustratively senses or detects the geographic position or location of agricultural harvester 100. Geographic position sensor 204 can include, but is not limited to, a global navigation satellite system (GNSS) receiver that receives signals from a GNSS satellite transmitter. Geographic position sensor 204 can also include a real-time kinematic (RTK) component that is configured to enhance the precision of position data derived from the GNSS signal. Geographic position sensor 204 can include a dead reckoning system, a cellular triangulation system, or any of a variety of other geographic position sensors.

In-situ sensors 208 may be any of the sensors described herein. In-situ sensors 208 include on-board sensors 222 that are mounted on-board agricultural harvester 100. Such sensors may include, for instance, an impact plate sensor, a radiation attenuation sensor, or an image sensor that is internal to agricultural harvester 100 (such as a clean grain camera). The in-situ sensors 208 may also include remote in-situ sensors 224 that capture in-situ information. In-situ data include data taken from a sensor on-board the agricultural harvester or taken by any sensor where the data are detected during the harvesting operation. Some examples of in-situ sensors 208 are shown in FIG. 8.

After being retrieved by agricultural harvester 100, prior information map selector 209 can filter or select one or more specific prior information map(s) 258 for usage by predictive model generator 210. In one example, prior information map selector 209 selects a map based on a comparison of the contextual information in the prior information map versus the present contextual information. For example, a historical yield map may be selected from one of the past years where weather conditions over the growing season were similar to the present year's weather conditions. Or, for example, a historical yield map may be selected from one of the past years when the context information is not similar. For example, a historical yield map may be selected for a prior year that was "dry" (i.e., had drought conditions or reduced precipitation), while the present year is "wet" (i.e., had increased precipitation or flood conditions). There still may be a useful historical relationship, but the relationship may be inverse. For instance, areas that are flooded in a wet year may be areas of higher yield in a dry year because these areas may retain more water in dry years. Present contextual information may include contextual information beyond immediate contextual information. For instance, present contextual information can include, but not by limitation, a set of information corresponding to the present growing season, a set of data corresponding to a winter before the current growing season, or a set of data corresponding to several past years, amongst others.

The contextual information can also be used for correlations between areas with similar contextual characteristics, regardless of whether the geographic position corresponds to the same position on prior information map 258. For instance, historical yield values from area with similar soil types in other fields can be used as prior information map 258 to create the predictive yield map. For example, the contextual characteristic information associated with a different location may be applied to the location on the prior information map 258 having similar characteristic information.

Predictive model generator 210 generates a model that is indicative of a relationship between the values sensed by the in-situ sensor 208 and a characteristic mapped to the field by the prior information map 258. For example, if the prior information map 258 maps a vegetative index value to different locations in the field, and the in-situ sensor 208 is sensing a value indicative of stalk diameter, then prior information variable-to-in-situ variable model generator 228 generates a predictive stalk diameter model that models the relationship between the vegetative index values and the stalk diameter values. Then, predictive map generator 212 uses the predictive stalk diameter model generated by predictive model generator 210 to generate a functional predictive stalk diameter map that predicts the value of stalk diameter that is expected to be sensed by the in-situ sensors 208, at different locations in the field. Or, for example, if the prior information map 258 maps a historical yield value to different locations in the field and the in-situ sensor 208 is sensing a value indicative of stalk diameter, then prior information variable-to-in-situ variable model generator 228 generates a predictive stalk diameter model that models the relationship between the historical yield values (with or without contextual information) and the in-situ stalk diameter values. Then, predictive map generator 212 uses the predictive stalk diameter model generated by predictive model generator 210 to generate a functional predictive stalk diameter map that predicts the value of stalk diameter that is expected be sensed by the in-situ sensors 208, at different locations in the field, based upon the prior information map 258.

In some examples, the type of data in the functional predictive map 263 may be the same as the in-situ data type sensed by the in-situ sensors 208. In some instances, the type of data in the functional predictive map 263 may have different units from the data sensed by the in-situ sensors 208. In some examples, the type of data in the functional predictive map 263 may be different from the data type sensed by the in-situ sensors 208 but has a relationship to data type sensed by the in-situ sensors 208. For example, in some examples, the in-situ data type may be indicative of the type of data in the functional predictive map 263. In some examples, the type of data in the functional predictive map 263 may be different than the data type in the prior information map 258. In some instances, the type of data in the functional predictive map 263 may have different units from the data in the prior information map 258. In some examples, the type of data in the functional predictive map 263 may be different from the data type in the prior information map 258 but has a relationship to the data type in the prior information map 258. For example, in some examples, the data type in the prior information map 258 may be indicative of the type of data in the functional predictive map 263. In some examples, the type of data in the functional predictive map 263 is different than one of, or both of the in-situ data type sensed by the in-situ sensors 208 and the data type in the prior information map 258. In some examples, the type of data in the functional predictive map 263 is the same as one of, or both of, of the in-situ data type sensed by the in-situ sensors 208 and the data type in prior information map 258. In some examples, the type of data in the functional predictive map 263 is the same as one of the in-situ data type sensed by the in-situ sensors 208 or the data type in the prior information map 258, and different than the other.

Continuing with the preceding vegetative index example, predictive map generator 212 can use the vegetative index values in prior information map 258 and the model generated by predictive model generator 210 to generate a functional predictive map 263 that predicts the stalk diameter at different locations in the field. Predictive map generator 212 thus outputs predictive map 264.

As shown in FIG. 2, predictive map 264 predicts the value of a characteristic, which may be the same characteristic sensed by in-situ sensor(s) 208, or a characteristic related to the characteristic sensed by the in-situ sensor(s) 208, at various locations across the field based upon a prior information value in prior information map 258 at those locations (or locations with similar contextual information, even if in a different field) and using the predictive model. For example, if predictive model generator 210 has generated a predictive model indicative of a relationship between a vegetative index value and stalk diameter, then, given the vegetative index value at different locations across the field, predictive map generator 212 generates a predictive map 264 that predicts the value of the stalk diameter of stalks at different locations across the field. The vegetative index value, obtained from the prior information map 258, at those locations and the relationship between vegetative index value and stalk diameter, obtained from the predictive model, are used to generate the predictive map 264.

Some variations in the data types that are mapped in the prior information map 258, the data types sensed by in-situ sensors 208 and the data types predicted on the predictive map 264 will now be described.

In some examples, the data type in the prior information map 258 is different from the data type sensed by in-situ sensors 208, yet the data type in the predictive map 264 is the same as the data type sensed by the in-situ sensors 208. For instance, the prior information map 258 may be a vegetative index map, and the variable sensed by the in-situ sensors 208 may be stalk diameter. The predictive map 264 may then be a predictive stalk diameter map that maps predicted stalk diameter values to different geographic locations in the field. predictive map 264

Also, in some examples, the data type in the prior information map 258 is different from the data type sensed by in-situ sensors 208, and the data type in the predictive map 264 is different from both the data type in the prior information map 258 and the data type sensed by the in-situ sensors 208. For instance, the prior information map 258 may be a seeding map, and the variable sensed by the in-situ sensors 208 may be an operator input command indicative of a deck plate spacing setting. The predictive map 264 may then be a predictive stalk diameter map that maps predicted stalk diameter values to different geographic locations in the field. In another example, the prior information map 258 may be a vegetative index map, and the variable sensed by the in-situ sensors 208 may be stalk diameter. The predictive map 264 may then be a predictive deck plate spacing setting map that maps predicted deck plate spacing setting values to different geographic locations in the field.

In some examples, the prior information map 258 is from a prior pass through the field during a prior operation and the data type is different from the data type sensed by in-situ sensors 208, yet the data type in the predictive map 264 is the same as the data type sensed by the in-situ sensors 208. For instance, the prior information map 258 may be a seed population map generated during planting, and the variable sensed by the in-situ sensors 208 may be stalk diameter. The predictive map 264 may then be a predictive stalk diameter map that maps predicted stalk diameter values to different geographic locations in the field. In another example, the prior information map 258 may be a seeding genotype map, and the variable sensed by the in-situ sensors 208 may be stalk diameter. The predictive map 264 may then be a predictive stalk diameter map that maps predicted stalk diameter values to different geographic locations in the field.

In some examples, the prior information map 258 is from a prior pass through the field during a prior operation and the data type is the same as the data type sensed by in-situ sensors 208, and the data type in the predictive map 264 is also the same as the data type sensed by the in-situ sensors 208. For instance, the prior information map 258 may be a stalk diameter map generated during a previous year, and the variable sensed by the in-situ sensors 208 may be stalk diameter. The predictive map 264 may then be a predictive stalk diameter map that maps predicted stalk diameter values to different geographic locations in the field. In such an example, the relative stalk diameter differences in the georeferenced prior information map 258 from the prior year can be used by predictive model generator 210 to generate a predictive model that models a relationship between the relative stalk diameter differences on the prior information map 258 and the stalk diameter values sensed by in-situ sensors 208 during the current harvesting operation. The predictive model is then used by predictive map generator 212 to generate a predictive stalk diameter map.

Predictive Map 264

In some examples, predictive map 264 can be provided to the control zone generator 213. Control zone generator 213 groups adjacent portions of an area into one or more control zones based on data values of predictive map 264 that are associated with those adjacent portions. A control zone may include two or more contiguous portions of an area, such as a field, for which a control parameter corresponding to the control zone for controlling a controllable subsystem is constant. For example, a response time to alter a setting of controllable subsystems 216 may be inadequate to satisfactorily respond to changes in values contained in a map, such as predictive map 264. In that case, control zone generator 213 parses the map and identifies control zones that are of a defined size to accommodate the response time of the controllable subsystems 216. In another example, control zones may be sized to reduce wear from excessive actuator movement resulting from continuous adjustment. In some examples, there may be a different set of control zones for each controllable subsystem 216 or for groups of controllable subsystems 216. The control zones may be added to the predictive map 264 to obtain predictive control zone map 265. Predictive control zone map 265 is a predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265. In some examples, multiple crops may be simultaneously present in a field if an intercrop production system is implemented. In that case, predictive map generator 212 and control zone generator 213 are able to identify the location and characteristics of the two or more crops and then generate predictive map 264 and predictive control zone map 265 with control zones accordingly.

It will also be appreciated that control zone generator 213 can cluster values to generate control zones and the control zones can be added to predictive control zone map 265, or a separate map, showing only the control zones that are generated. In some examples, the control zones may be used for controlling or calibrating agricultural harvester 100 or both. In other examples, the control zones may be presented to the operator 260 and used to control or calibrate agricultural harvester 100, and, in other examples, the control zones may be presented to the operator 260 or another user or stored for later use.

Predictive map 264 or predictive control zone map 265 or both are provided to control system 214, which generates control signals based upon the predictive map 264 or predictive control zone map 265 or both. In some examples, communication system controller 229 controls communication system 206 to communicate the predictive map 264 or predictive control zone map 265 or control signals based on the predictive map 264 or predictive control zone map 265 to other agricultural harvesters that are harvesting in the same field. In some examples, communication system controller 229 controls the communication system 206 to send the predictive map 264, predictive control zone map 265, or both to other remote systems.

Operator interface controller 231 is operable to generate control signals to control operator interface mechanisms 218. The operator interface controller 231 is also operable to present the predictive map 264 or predictive control zone map 265 or other information derived from or based on the predictive map 264, predictive control zone map 265, or both to operator 260. Operator 260 may be a local operator or a remote operator. As an example, controller 231 generates control signals to control a display mechanism to display one or both of predictive map 264 and predictive control zone map 265 for the operator 260. Controller 231 may generate operator actuatable mechanisms that are displayed and can be actuated by the operator to interact with the displayed map. The operator can edit the map by, for example, correcting a yield value displayed on the map based on the operator's observation. Settings controller 232 can generate control signals to control various settings on the agricultural harvester 100 based upon predictive map 264, the predictive control zone map 265, or both. For instance, settings controller 232 can generate control signals to control machine and header actuators 248. In response to the generated control signals, the machine and header actuators 248 operate to control, for example, one or more of the sieve and chaffer settings, deck plate settings (such as deck plate spacing, deck plate position, or both), concave clearance, rotor settings, cleaning fan speed settings, header height, header functionality, reel speed, reel position, draper functionality (where agricultural harvester 100 is coupled to a draper header), corn header functionality, internal distribution control, and other actuators 248 that affect the other functions of the agricultural harvester 100. Path planning controller 234 illustratively generates control signals to control steering subsystem 252 to steer agricultural harvester 100 according to a desired path. Path planning controller 234 can control a path planning system to generate a route for agricultural harvester 100 and can control propulsion subsystem 250 and steering subsystem 252 to steer agricultural harvester 100 along that route. Feed rate controller 236 can control various subsystems, such as propulsion subsystem 250 and machine actuators 248, to control a feed rate based upon the predictive map 264 or predictive control zone map 265 or both. For instance, as agricultural harvester 100 approaches an area yielding above a selected threshold, feed rate controller 236 may reduce the speed of agricultural harvester 100 to maintain constant feed rate of grain or biomass through the machine. Header and reel controller 238 can generate control signals to control a header or a reel or other header functionality. Draper belt controller 240 can generate control signals to control a draper belt or other draper functionality based upon the predictive map 264, predictive control zone map 265, or both. Deck plate position controller 242 can generate control signals to control a position of a deck plate included on a header based on predictive map 264 or predictive control zone map 265 or both, and residue system controller 244 can generate control signals to control a residue subsystem 138 based upon predictive map 264 or predictive control zone map 265, or both. Machine cleaning controller 245 can generate control signals to control machine cleaning subsystem 254. For instance, based upon the different types of seeds or weeds passed through agricultural harvester 100, a particular type of machine cleaning operation or a frequency with which a cleaning operation is performed may be controlled. Other controllers included on the agricultural harvester 100 can control other subsystems based on the predictive map 264 or predictive control zone map 265 or both as well.

FIGS. 3A and 3B (collectively referred to herein as FIG. 3) show a flow diagram illustrating one example of the operation of agricultural harvester 100 in generating a predictive map 264 and predictive control zone map 265 based upon prior information map 258.

At 280, agricultural harvester 100 receives prior information map 258. Examples of prior information map 258 or receiving prior information map 258 are discussed with respect to blocks 282, 284 and 286. As discussed above, prior information map 258 maps values of a variable, corresponding to a first characteristic, to different locations in the field, as indicated at block 282. For instance, the data may be collected based on aerial images or measured characteristics taken during a previous year. The information may be based on data detected in other ways (other than using aerial images) as well. Data collected prior to the current harvesting operation, whether via aerial images or otherwise, is indicated by block 284. The prior information map 258 can be downloaded by agricultural harvester 100 using communication system 206 and stored in data store 202. Prior information map 258 can be loaded onto agricultural harvester 100 using communication system 206 in other ways as well, and loading of the prior information map 258 onto the agricultural harvester 100 is indicated by block 286 in the flow diagram of FIG. 3. In some examples, the prior information map 258 can be received by communication system 206.

At block 287, prior information map selector 209 can select one or more maps from the plurality of candidate prior information maps received in block 280. For example, multiple years of historical yield maps may be received as candidate prior information maps. Each of these maps can contain contextual information such as weather patterns over a period of time, such as a year, pest surges over a period of time, such as a year, soil types, etc. Contextual information can be used to select which historical yield map should be selected. For instance, the weather conditions over a period of time, such in a current year, or the soil types for the current field can be compared to the weather conditions and soil type in the contextual information for each candidate prior information map. The results of such a comparison can be used to select which historical yield map should be selected. For example, years with similar weather conditions may generally produce similar stalk diameter or stalk diameter trends across a field. In some cases, years with opposite weather conditions may also be useful for predicting stalk diameter based on historical yield. For instance, an area with a small stalk diameter in a dry year, might have a large stalk diameter in a wetter year. The process by which one or more prior information maps are selected by prior information map selector 209 can be manual, semi-automated or automated. In some examples, during a harvesting operation, prior information map selector 209 can continually or intermittently determine whether a different prior information map has a better relationship with the in-situ sensor value. If a different prior information map is correlating with the in-situ data more closely, then prior information map selector 209 can replace the currently selected prior information map with the more correlative prior information map.

Upon commencement of a harvesting operation, in-situ sensors 208 generate sensor signals indicative of one or more in-situ data values indicative of a plant characteristic, such as a yield, as indicated by block 288. Examples of in-situ sensors 288 are discussed with respect to blocks 222, 290, and 226. As explained above, the in-situ sensors 208 include on-board sensors 222; remote in-situ sensors 224, such as UAV-based sensors flown at a time to gather in-situ data, shown in block 290; or other types of in-situ sensors, designated by in-situ sensors 226. Some examples of in-situ sensors 208 are shown in FIG. 8. In some examples, data from on-board sensors is georeferenced using position heading or speed data from geographic position sensor 204.

Predictive model generator 210 controls the prior information variable-to-in-situ variable model generator 228 to generate a model that models a relationship between the mapped values contained in the prior information map 258 and the in-situ values sensed by the in-situ sensors 208 as indicated by block 292. The characteristics or data types represented by the mapped values in the prior information map 258 and the in-situ values sensed by the in-situ sensors 208 may be the same characteristics or data type or different characteristics or data types.

The relationship or model generated by predictive model generator 210 is provided to predictive map generator 212. Predictive map generator 212 generates a predictive map 264 that predicts a value of the characteristic sensed by the in-situ sensors 208 at different geographic locations in a field being harvested, or a different characteristic that is related to the characteristic sensed by the in-situ sensors 208, using the predictive model and the prior information map 258, as indicated by block 294.

It should be noted that, in some examples, the prior information map 258 may include two or more different maps or two or more different map layers of a single map. Each map layer may represent a different data type from the data type of another map layer or the map layers may have the same data type that were obtained at different times. Each map in the two or more different maps or each layer in the two or more different map layers of a map maps a different type of variable to the geographic locations in the field. In such an example, predictive model generator 210 generates a predictive model that models the relationship between the in-situ data and each of the different variables mapped by the two or more different maps or the two or more different map layers. Similarly, the in-situ sensors 208 can include two or more sensors each sensing a different type of variable. Thus, the predictive model generator 210 generates a predictive model that models the relationships between each type of variable mapped by the prior information map 258 and each type of variable sensed by the in-situ sensors 208. Predictive map generator 212 can generate a functional predictive map 263 that predicts a value for each sensed characteristic sensed by the in-situ sensors 208 (or a characteristic related to the sensed characteristic) at different locations in the field being harvested using the predictive model and each of the maps or map layers in the prior information map 258.

Predictive map generator 212 configures the predictive map 264 so that the predictive map 264 is actionable (or consumable) by control system 214. Predictive map generator 212 can provide the predictive map 264 to the control system 214 or to control zone generator 213 or both. Some examples of different ways in which the predictive map 264 can be configured or output are described with respect to blocks 296, 295, 299 and 297. For instance, predictive map generator 212 configures predictive map 264 so that predictive map 264 includes values that can be read by control system 214 and used as the basis for generating control signals for one or more of the different controllable subsystems of the agricultural harvester 100, as indicated by block 296.

Control zone generator 213 can divide the predictive map 264 into control zones based on the values on the predictive map 264. Contiguously-geolocated values that are within a threshold value of one another can be grouped into a control zone. The threshold value can be a default threshold value, or the threshold value can be set based on an operator input, based on an input from an automated system or based on other criteria. A size of the zones may be based on a responsiveness of the control system 214, the controllable subsystems 216, or based on wear considerations, or on other criteria as indicated by block 295. Predictive map generator 212 configures predictive map 264 for presentation to an operator or other user. Control zone generator 213 can configure predictive control zone map 265 for presentation to an operator or other user. This is indicated by block 299. When presented to an operator or other user, the presentation of the predictive map 264 or predictive control zone map 265 or both may contain one or more of the predictive values on the predictive map 264 correlated to geographic location, the control zones on predictive control zone map 265 correlated to geographic location, and settings values or control parameters that are used based on the predicted values on predictive map 264 or zones on predictive control zone map 265. The presentation can, in another example, include more abstracted information or more detailed information. The presentation can also include a confidence level that indicates an accuracy with which the predictive values on predictive map 264 or the zones on predictive control zone map 265 conform to measured values that may be measured by sensors on agricultural harvester 100 as agricultural harvester 100 moves through the field. Further where information is presented to more than one location, an authentication/authorization system can be provided to implement authentication and authorization processes. For instance, there may be a hierarchy of individuals that are authorized to view and change maps and other presented information. By way of example, an on-board display device may show the maps in near real time locally on the machine, only, or the maps may also be generated at one or more remote locations. In some examples, each physical display device at each location may be associated with a person or a user permission level. The user permission level may be used to determine which display markers are visible on the physical display device, and which values the corresponding person may change. As an example, a local operator of agricultural harvester 100 may be unable to see the information corresponding to the predictive map 264 or make any changes to machine operation. A supervisor, at a remote location, however, may be able to see the predictive map 264 on the display, but not make changes. A manager, who may be at a separate remote location, may be able to see all of the elements on predictive map 264 and also change the predictive map 264 that is used in machine control. This is one example of an authorization hierarchy that may be implemented. The predictive map 264 or predictive control zone map 265 or both can be configured in other ways as well, as indicated by block 297.

At block 298, input from geographic position sensor 204 and other in-situ sensors 208 are received by the control system. Block 300 represents receipt by control system 214 of an input from the geographic position sensor 204 identifying a geographic location of agricultural harvester 100. Block 302 represents receipt by the control system 214 of sensor inputs indicative of trajectory or heading of agricultural harvester 100, and block 304 represents receipt by the control system 214 of a speed of agricultural harvester 100. Block 306 represents receipt by the control system 214 of other information from various in-situ sensors 208.

At block 308, control system 214 generates control signals to control the controllable subsystems 216 based on the predictive map 264 or predictive control zone map 265 or both and the input from the geographic position sensor 204 and any other in-situ sensors 208. At block 310, control system 214 applies the control signals to the controllable subsystems. It will be appreciated that the particular control signals that are generated, and the particular controllable subsystems 216 that are controlled, may vary based upon one or more different things. For example, the control signals that are generated and the controllable subsystems 216 that are controlled may be based on the type of predictive map 264 or predictive control zone map 265 or both that is being used. Similarly, the control signals that are generated and the controllable subsystems 216 that are controlled and the timing of the control signals can be based on various latencies of crop flow through the agricultural harvester 100 and the responsiveness of the controllable subsystems 216.

By way of example, a generated predictive map 264 in the form of a predictive stalk diameter map can be used to control one or more controllable subsystems 216. For example, the functional predictive stalk diameter map can include stalk diameter values georeferenced to locations within the field being harvested. The functional predictive stalk diameter map can be extracted and used to control the spacing of one or more sets of deck plates on header 102 of agricultural harvester 100. predictive map 264 The preceding example involving deck plate spacing control using a functional predictive stalk diameter map is provided merely as an example. Consequently, a wide variety of other control signals can be generated using values obtained from a predictive stalk diameter map or other type of functional predictive map 263 to control one or more of the controllable subsystems 216.

At block 312, a determination is made as to whether the harvesting operation has been completed. If harvesting is not completed the processing advances to block 314 where in-situ sensor data from geographic position sensor 204 and in-situ sensors 208 (and perhaps other sensors) continue to be read.

In some examples, at block 316, agricultural harvester 100 can also detect learning trigger criteria to perform machine learning on one or more of the predictive map 264, predictive control zone map 265, the model generated by predictive model generator 210, the zones generated by control zone generator 213, one or more control algorithms implemented by the controllers in the control system 214, and other triggered learning.

The learning trigger criteria can include any of a wide variety of different criteria. Some examples of detecting trigger criteria are discussed with respect to blocks 318, 320, 321, 322 and 324. For instance, in some examples, triggered learning can involve recreation of a relationship used to generate a predictive model when a threshold amount of in-situ sensor data are obtained from in-situ sensors 208. In such examples, receipt of an amount of in-situ sensor data from the in-situ sensors 208 that exceeds a threshold triggers or causes the predictive model generator 210 to generate a new predictive model that is used by predictive map generator 212. Thus, as agricultural harvester 100 continues a harvesting operation, receipt of the threshold amount of in-situ sensor data from the in-situ sensors 208 triggers the creation of a new relationship represented by a predictive model generated by predictive model generator 210. Further, new predictive map 264, predictive control zone map 265, or both can be regenerated using the new predictive model. Block 318 represents detecting a threshold amount of in-situ sensor data used to trigger creation of a new predictive model.

In other examples, the learning trigger criteria may be based on how much the in-situ sensor data from the in-situ sensors 208 are changing, such as over time or compared to previous values. For example, if variations within the in-situ sensor data (or the relationship between the in-situ sensor data and the information in prior information map 258) are within a selected range or is less than a defined amount or is below a threshold value, then a new predictive model is not generated by the predictive model generator 210. As a result, the predictive map generator 212 does not generate a new predictive map 264, predictive control zone map 265, or both. However, if variations within the in-situ sensor data are outside of the selected range, are greater than the defined amount, or are above the threshold value, for example, then the predictive model generator 210 generates a new predictive model using all or a portion of the newly received in-situ sensor data that the predictive map generator 212 uses to generate a new predictive map 264. At block 320, variations in the in-situ sensor data, such as a magnitude of an amount by which the data exceeds the selected range or a magnitude of the variation of the relationship between the in-situ sensor data and the information in the prior information map 258, can be used as a trigger to cause generation of a new predictive model and predictive map. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 210 switches to a different prior information map (different from the originally selected prior information map 258), then switching to the different prior information map may trigger relearning by predictive model generator 210, predictive map generator 212, control zone generator 213, control system 214, or other items. In another example, transitioning of agricultural harvester 100 to a different topography or to a different control zone may be used as learning trigger criteria as well.

In some instances, operator 260 can also edit the predictive map 264 or predictive control zone map 265 or both. The edits can change a value on the predictive map 264; change a size, shape, position, or existence of a control zone on predictive control zone map 265; or both. Block 321 shows that edited information can be used as learning trigger criteria.

In some instances, it may also be that operator 260 observes that automated control of a controllable subsystem, is not what the operator desires. In such instances, the operator 260 may provide a manual adjustment to the controllable subsystem reflecting that the operator 260 desires the controllable subsystem to operate in a different way than is being commanded by control system 214. Thus, manual alteration of a setting by the operator 260 can cause one or more of predictive model generator 210 to relearn a model, predictive map generator 212 to regenerate map 264, control zone generator 213 to regenerate one or more control zones on predictive control zone map 265, and control system 214 to relearn a control algorithm or to perform machine learning on one or more of the controller components 232 through 246 in control system 214 based upon the adjustment by the operator 260, as shown in block 322. Block 324 represents the use of other triggered learning criteria.

In other examples, relearning may be performed periodically or intermittently based, for example, upon a selected time interval such as a discrete time interval or a variable time interval, as indicated by block 326.

If relearning is triggered, whether based upon learning trigger criteria or based upon passage of a time interval, as indicated by block 326, then one or more of the predictive model generator 210, predictive map generator 212, control zone generator 213, and control system 214 performs machine learning to generate a new predictive model, a new predictive map, a new control zone, and a new control algorithm, respectively, based upon the learning trigger criteria. The new predictive model, the new predictive map, and the new control algorithm are generated using any additional data that has been collected since the last learning operation was performed. Performing relearning is indicated by block 328.

If the harvesting operation has been completed, operation moves from block 312 to block 330 where one or more of the predictive map 264, predictive control zone map 265, and predictive model generated by predictive model generator 210 are stored. The predictive map 264, predictive control zone map 265, and predictive model may be stored locally on data store 202 or sent to a remote system using communication system 206 for later use.

It will be noted that while some examples herein describe predictive model generator 210 and predictive map generator 212 receiving a prior information map in generating a predictive model and a functional predictive map, respectively, in other examples, the predictive model generator 210 and predictive map generator 212 can receive, in generating a predictive model and a functional predictive map, respectively other types of maps, including predictive maps, such as a functional predictive map generated during the harvesting operation.

FIG. 4 is a block diagram of a portion of the agricultural harvester 100 shown in FIG. 1. Particularly, FIG. 4 shows, among other things, examples of the predictive model generator 210 and the predictive map generator 212 in more detail. FIG. 4 also illustrates information flow among the various components shown therein. As shown, the predictive model generator 210 receives, as a map, one or more of a vegetative index map 332, a yield map 333 (such as a predictive yield map 335 or a historical yield map 337), a seeding map 399, or a prior operation map 400. In some examples, model generator 210 can receive various other maps 401. Predictive yield map 335 includes georeferenced predictive yield values. Predictive yield map 335 can be generated using a process described in FIG. 3, where the prior information map includes a vegetative index map or a historical yield map and the in-situ sensor includes a yield sensor. Predictive yield map 335 can be generated in other ways as well. Historical yield map 337 includes historical yield values indicative of yield values across the field during a past harvest. Historical yield map 337 also includes contextual data that is indicative of the context or conditions that may have influenced the yield value for the past year(s). For example, contextual data can include soil type, elevation, slope, plant date, harvest date, fertilizer application, seed type (hybrids, etc.), a measure of weed presence, a measure of pest presence, and weather conditions (e.g., rainfall, snow coverage, hail, wind, temperature, etc.). Historical yield map 337 can include other items as well. Seeding map 339 can include values of individual seeding characteristics, such as location, spacing, population, orientation, depth, dimensions, or taxonomy (such as seed or plant hybrid).

Besides receiving one or more maps, predictive model generator 210 also receives a geographic location 334, or an indication of a geographic location, from geographic position sensor 204. In-situ sensors 208 illustratively include a stalk diameter sensor 336 as well as a processing system 338. In some examples, stalk diameter sensor 336 can be on-board agricultural harvester 100. The processing system 338 processes sensor data generated from the stalk diameter sensors 336. Some examples of in-situ sensors 208 are also shown in FIG. 8.

In some examples, stalk diameter sensor 336 may be an optical sensor on agricultural harvester 100. In some instances, the optical sensor may be a camera or other device that performs optical sensing. Processing system 338 processes one or more images obtained via the stalk diameter sensor 336 to generate processed image data identifying one or more characteristics of vegetation, such as crop plants, in the image. Vegetation characteristics detected by the processing system 338 may include size characteristics of the plant stalks on the field, for example diameters of stalks on the field. Processing system 338 can also geolocate the values received from the in-situ sensor 208. For example, the location of the agricultural harvester at the time a signal from in-situ sensor 208 is received may not accurately represent the location of the value on the field. This is because an amount of time elapses between when the agricultural harvester makes initial contact with the characteristic and when the characteristic is sensed by the in-situ sensor 208. Thus, a transient time between when a characteristic is initially encountered and when the characteristic is sensed by an in-situ sensor 208 is taken into account when georeferencing the sensed data. By doing so, the characteristic value can be accurately georeferenced to a location on the field.

By way of illustration, in the context of yield values, due to travel of severed crop along a header in a direction that is transverse to a direction of travel of the agricultural harvester, the yield values normally geolocate to a chevron shape area rearward of the agricultural harvester as the agricultural harvester travels in a forward direction. Processing system 338 allocates or apportions an aggregate yield detected by a yield sensor during each time or measurement interval back to earlier geo-referenced regions based upon the travel times of the crop from different portions of the agricultural harvester, such as different lateral locations along a width of a header of the agricultural harvester. For example, processing system 338 allocates a measured aggregate yield from a measurement interval or time back to geo-referenced regions that were traversed by a header of the agricultural harvester during different measurement intervals or times. The processing system 338 apportions or allocates the aggregate yield from a particular measurement interval or time to previously traversed geo-referenced regions which are part of the chevron shape area.

In other examples, stalk diameter sensor 336 can rely on different types of radiation and the way in which radiation is reflected by, absorbed by, attenuated by, or transmitted through the vegetation. The stalk diameter sensor 336 may sense other electromagnetic properties of grain and biomass, such as electrical permittivity when the material passes between two capacitive plates. The stalk diameter sensor 336 may also rely on mechanical properties of vegetation such as a signal generated when the stalk contacts a piezoelectric element or when the impact is detected by a microphone or accelerometer. Other material properties and sensors may also be used. In some examples, raw or processed data from stalk diameter sensor 336 may be presented to operator 260 via operator interface mechanism 218. Operator 260 may be onboard of the work agricultural harvester 100 or at a remote location. The stalk diameter sensor 336 can include any other examples described herein as well as any other sensor configured to generate a sensor signal indicative of a size, e.g., diameter, of a plant stalk.

The present discussion proceeds with respect to an example in which a stalk diameter sensor 336 generates sensor signals indicative of a size characteristic, such as a diameter, of plant stalks on the field, such as a diameter of cornstalks. As shown in FIG. 4, the predictive model generator 210 includes a vegetative index-to-stalk diameter model generator 342, a yield-to-stalk diameter model generator 344, and a seeding characteristic-to-stalk diameter model generator 346. In other examples, the predictive model generator 210 may include additional, fewer, or different components than those shown in the example of FIG. 4. Consequently, in some examples, the predictive model generator 210 may include other items 348 as well, which may include other types of predictive model generators to generate other types of stalk diameter models. For example, predictive model generator 210 may also include specific seeding characteristic-to-stalk diameter model generators, such as a hybrid-to-stalk diameter model generator or a population-to-stalk diameter model generator.

Vegetative index-to stalk diameter model generator 342 identifies a relationship between in-situ stalk diameter data 340 at geographic locations corresponding to where in-situ stalk diameter data 340 were geolocated and vegetative index values from the vegetative index map 332 corresponding to the same locations in the field where stalk diameter data 340 were geolocated. Based on this relationship established by vegetative index-to-stalk diameter model generator 342, vegetative index-to-stalk diameter model generator 342 generates a predictive stalk diameter model. The stalk diameter model is used by predictive map generator 212 to predict a stalk diameter at different locations in the field based upon the georeferenced vegetative index values contained in the vegetative index map 332 at the same respective locations in the field.

Yield-to stalk diameter model generator 344 identifies a relationship between in-situ stalk diameter data 340 at geographic locations corresponding to where in-situ stalk diameter data 340 were geolocated and yield values from the yield map 333 corresponding to the same locations in the field where stalk diameter data 340 were geolocated. Based on this relationship established by yield-to-stalk diameter model generator 344, yield-to-stalk diameter model generator 344 generates a predictive stalk diameter model. The stalk diameter model is used by predictive map generator 212 to predict a stalk diameter at different locations in the field based upon the georeferenced yield values contained in the yield map 333 at the same respective locations in the field.

Seeding characteristic-to stalk diameter model generator 346 identifies a relationship between in-situ stalk diameter data 340 at geographic locations corresponding to where in-situ stalk diameter data 340 were geolocated and seeding characteristic values from the seeding map 399 corresponding to the same locations in the field where stalk diameter data 340 were geolocated. Based on this relationship established by seeding characteristic-to-stalk diameter model generator 346, seeding characteristic-to-stalk diameter model generator 346 generates a predictive stalk diameter model. The stalk diameter model is used by predictive map generator 212 to predict a stalk diameter at different locations in the field based upon the georeferenced seeding characteristic values contained in the seeding map 399 at the same respective locations in the field.

In other examples, model generator 210 may include other model generators 348, such as specific seeding characteristic-to-stalk diameter model generators. For example, a hybrid-to-stalk diameter model generator that identifies a relationship between in-situ stalk diameter data 340 at geographic locations corresponding to where in-situ stalk diameter data 340 were geolocated and hybrid values from the seeding map 399 corresponding to the same locations in the field where stalk diameter data 340 were geolocated. In another example, a population-to-stalk diameter model generator that identifies a relationship between in-situ stalk diameter data 340 at geographic locations corresponding to where in-situ stalk diameter data 340 were geolocated and hybrid values from the seeding map 399 corresponding to the same locations in the field where stalk diameter data 340 were geolocated. Based on the relationship established by the specific seeding characteristic-to-stalk diameter model generator, the specific seeding characteristic-to-stalk diameter model generator generates a predictive stalk diameter model. The stalk diameter model is used by predictive map generator 212 to predict a stalk diameter at different locations in the field based upon the georeferenced specific seeding characteristic values (e.g., hybrid value, population value, etc.) contained in the seeding map 399 at the same respective locations in the field.

In light of the above, the predictive model generator 210 is operable to produce a plurality of predictive stalk diameter models, such as one or more of the predictive stalk diameter models generated by model generators 342, 344, and 346. In another example, two or more of the predictive stalk diameter models described above may be combined into a single predictive stalk diameter model that predicts stalk diameter based upon the vegetative index value, the yield value, or the seeding characteristic value at different locations in the field or combinations thereof. Any of these stalk diameter models, or combinations thereof, are represented collectively by stalk diameter model 350 in FIG. 4.

The predictive stalk diameter model 350 is provided to predictive map generator 212. In the example of FIG. 4, predictive map generator 212 includes a stalk diameter map generator 352. In other examples, the predictive map generator 212 may include additional or different map generators. Consequently, in some examples, the predictive map generator 212 may include other items 358 as well, which may include other types of predictive map generators to generate other types of predictive maps. Stalk diameter map generator 352 receives the predictive stalk diameter model 350 that predicts stalk diameter based upon in-situ data 340 along with one or more of the vegetative index map 332, the yield map 333, or the seeding map 399.

Stalk diameter map generator 352 can generate a functional predictive stalk diameter map 360 that predicts stalk diameter at different locations in the field based upon the vegetative index value, the yield value, or the seeding characteristic value at those locations in the field and the predictive stalk diameter model 350. The generated functional predictive stalk diameter map 360 may be provided to control zone generator 213, control system 214, or both, as shown in FIG. 2. Control zone generator 213 generates control zones and incorporates those control zones to produce predictive control zone map 265. One or both of functional predictive maps 264 or predictive control zone map 265 may be presented to the operator 260 or anther user or be provided to control system 214, which generates control signals to control one or more of the controllable subsystems 216 based upon the predictive map 264, predictive control zone map 265, or both.

FIG. 5 is a flow diagram of an example of operation of predictive model generator 210 and predictive map generator 212 in generating the predictive stalk diameter model 350 and the functional predictive stalk diameter map 360, respectively. At block 362, predictive model generator 210 and predictive map generator 212 receive one or more maps, such as one or more vegetative index maps 332, one or more yield maps 333, or one or more seeding characteristic maps 399, or any combination thereof. At block 364, an in-situ sensor signal is received from an in-situ sensor 208. As discussed above, the in-situ sensor 208 can include a stalk diameter sensor 336 that generates a sensor signal indicative of size characteristics, such as diameters, of vegetation on the field, for instance, a diameter of cornstalks. Some other examples of in-situ sensors 208 are shown in FIG. 8.

At block 372, processing system 338 processes the one or more received sensor signals received from the stalk diameter sensor 336 to generate a stalk diameter value indicative of a stalk diameter of vegetation on the field, such as a stalk diameter of a cornstalk on the field.

At block 382, predictive model generator 210 also obtains the geographic location corresponding to the sensor signal. For instance, the predictive model generator 210 can obtain the geographic position from geographic position sensor 204 and determine, based upon machine delays (e.g., machine processing speed) and machine speed, an accurate geographic location where the in-situ sensed stalk diameter is to be attributed. For example, the exact time a stalk diameter sensor signal is captured may not correspond to a time when the crop was severed from the ground. Thus, a position of the agricultural harvester 100 when the stalk diameter sensor signal is obtained may not correspond to the location where the crop was planted.

At block 384, predictive model generator 210 generates one or more predictive stalk diameter models, such as stalk diameter model 350, that model a relationship between at least one of a vegetative index value, a yield value, or a seeding characteristic value obtained from a map, such as vegetative index map 332, yield map 333, or seeding map 339, and a stalk diameter being sensed by the in-situ sensor 208. For instance, predictive model generator 210 may generate a predictive stalk diameter model based on a vegetative index value, a yield value, or a seeding characteristic value and a sensed stalk diameter value indicated by the sensor signal obtained from in-situ sensor 208.

At block 386, the predictive stalk diameter model, such as predictive stalk diameter model 350, is provided to predictive map generator 212, which generates a functional predictive stalk diameter map that maps a predicted stalk diameter to different geographic locations in the field based on the vegetative index map, the yield map, or the seeding map and the predictive stalk diameter model 350. For instance, in some examples, the functional predictive stalk diameter map 360 predicts stalk diameter, as indicated by block 391. In other examples, the functional predictive stalk diameter map 360 predicts other items, as indicated by block 392, such as other items indicative of stalk diameter, for example, power requirements for stalk processing, such as power requirements to power the stalk rolls or gathering chains. Further, the functional predictive stalk diameter map 360 can be generated during the course of an agricultural harvesting operation. Thus, as an agricultural harvester is moving through a field performing an agricultural harvesting operation, the functional predictive stalk diameter map 360 is generated.

At block 394, predictive map generator 212 outputs the functional predictive stalk diameter map 360. At block 393, predictive map generator 212 configures the functional predictive stalk diameter map 360 for consumption by control system 214. At block 395, predictive map generator 212 can also provide the map 360 to control zone generator 213 for generation and incorporation of control zones. At block 397, predictive map generator 212 configures the map 360 in other ways as well. The functional predictive stalk diameter map 360 (with or without the control zones) is provided to control system 214. At block 396, control system 214 generates control signals to control the controllable subsystems 216 based upon the functional predictive stalk diameter map 360.

Control system 214 can generate control signals to control header or other machine actuator(s) 248, such as to control a position or spacing of the deck plates. Control system 214 can generate control signals to control propulsion subsystem 250. Control system 214 can generate control signals to control steering subsystem 252. Control system 214 can generate control signals to control residue subsystem 138. Control system 214 can generate control signals to control machine cleaning subsystem 254. Control system 214 can generate control signals to control thresher 110. Control system 214 can generate control signals to control material handling subsystem 125. Control system 214 can generate control signals to control crop cleaning subsystem 118. Control system 214 can generate control signals to control communication system 206. Control system 214 can generate control signals to control operator interface mechanisms 218. Control system 214 can generate control signals to control various other controllable subsystems 256. In other examples, control system 214 can generate control signals to control a speed of threshing rotor 112, can generate control signals to control a concave clearance, or can generate control signals to adjust power output to some of the plant processing systems, such as the gathering chains or stalk rolls.

Figure 6:
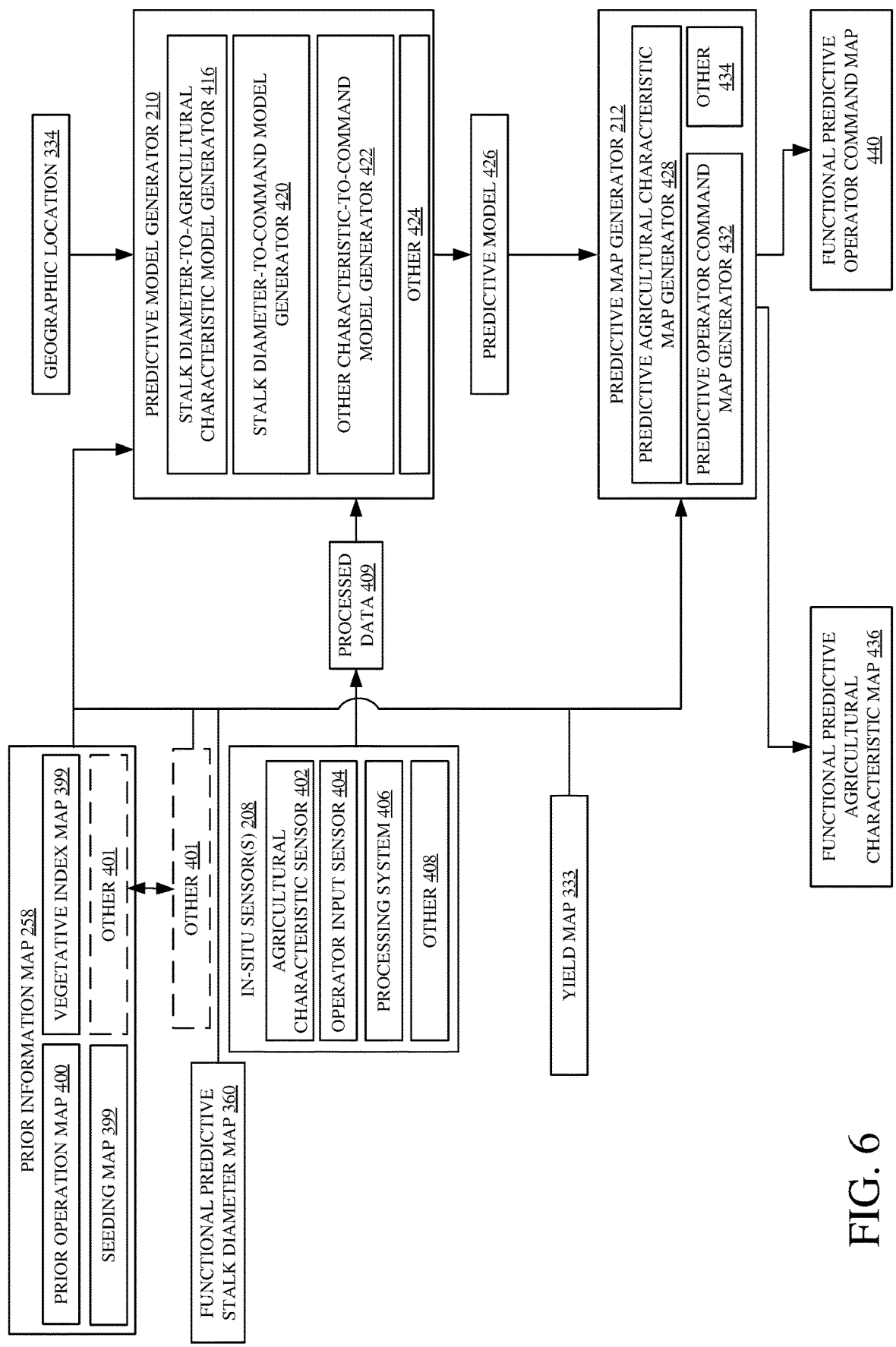
FIG. 6 is a block diagram showing one example of a predictive model generator and a predictive map generator.

FIG. 6 is a block diagram of an example portion of the agricultural harvester 100 shown in FIG. 1. Particularly, FIG. 6 shows, among other things, examples of predictive model generator 210 and predictive map generator 212. In the illustrated example, the prior information map 258 can be a vegetative index map 332, a seeding map 399, a yield map 333 (such as historical yield map 337), or a prior operation map 400. Prior operation map 400 may include characteristic values indicative of a characteristic at various locations in the field. The characteristic values may be characteristic values that were collected during a prior operation, such as a prior operation by another agricultural work machine, such as a sprayer, on the field. Prior information map 258 can include other prior information maps 401 as well, for example, a prior stalk diameter map generated or otherwise provided in a variety of ways. In one example, a prior stalk diameter map can be a historical stalk diameter map generated on the basis of data collected during a previous harvesting operation, such as a previous harvesting operation in a previous harvesting season. FIG. 6 also shows that predictive model generator 210 and predictive map generator can receive, in addition to prior information map 258, functional predictive stalk diameter map 360 and yield map 333 (such as predictive yield map 335). Functional predictive stalk diameter map 360 and predictive yield map 335 can be used similarly as prior information map 258 in that model generator 210 models a relationship between information provided by functional predictive stalk diameter map 360 or predictive yield map 335 and characteristics sensed by in-situ sensors 208, and map generator 212 can thus use the model to generate a functional predictive map that predicts the characteristics sensed by the in-situ sensors 208, or a characteristic indicative of the sensed characteristic, at different locations in the field based upon one or more of the values in the functional predictive stalk diameter map 360 or the predictive yield map 335 at those locations in the field and based on the predictive model. In some examples, yield map 333 is a prior information map, such as historical yield map 337, or is a predictive yield map such as predictive yield map 335. Predictive model generator 210 and predictive map generator 212 can receive various other maps 401 as well, such as other predictive stalk diameter maps generated in ways other than functional predictive stalk diameter map 360.

Also, in the example shown in FIG. 6, in-situ sensor 208 can include one or more agricultural characteristic sensors 402, an operator input sensor 404, and a processing system 406. In-situ sensors 208 can include other sensors 408 as well. Some other examples of in-situ sensors 208 are shown in FIG. 8. Agricultural characteristic sensors 402 can include one or more of the in-situ sensors 208 described herein. Agricultural characteristic sensors 402 sense one or more variables indicative of an agricultural characteristic.

Operator input sensor 404 illustratively senses various operator inputs. The inputs can be setting inputs for controlling the settings on agricultural harvester 100 or other control inputs, such as steering inputs and other inputs. Thus, when an operator of agricultural harvester 100, such as operator 260, changes a setting or provides a commanded input, such as through an operator interface mechanism 218, such an input is detected by operator input sensor 404, which provides a sensor signal indicative of that sensed operator input. For the purpose of this disclosure, an operator input can also be referred to as a characteristic, such as an agricultural characteristic, and, thus, can be an agricultural characteristic sensed by an in-situ sensor 208. Processing system 406 may receive one or more sensor signals from agricultural characteristic sensors 402 or operator input sensor 404 or both and generate an output indicative of the sensed characteristic. For instance, processing system 406 may receive a sensor input from an agricultural characteristic sensor 402 and generate an output indicative of an agricultural characteristic. Processing system 406 may also receive an input from operator input sensor 404 and generate an output indicative of the sensed operator input.

Predictive model generator 210 may include stalk diameter-to-agricultural characteristic model generator 416 stalk diameter-to-command model generator 420, and other characteristic-to-command model generator 422. In other examples, predictive model generator 210 can include additional, fewer, or other model generators 424, such as specific agricultural characteristic model generators. Additionally, other characteristic-to-command model generator 422 can include, as the other characteristic, vegetative index values provided by vegetative index map 332, prior operation characteristic values provided by prior operation map 400, seeding characteristic values provided by seeding map 399, or yield values provided by yield map 333. Predictive model generator 210 receives a geographic location 334, or an indication of a geographic location, from geographic position sensor 204 and generates a predictive model 426 that models a relationship between the information in one or more of the maps and one or more agricultural characteristics sensed by an agricultural characteristic sensor 402, one or more operator input commands sensed by operator input sensor 404, or both. For instance, stalk diameter-to-agricultural characteristic generator 416 generates a model that models a relationship between stalk diameter values (which may be on or indicated by one or more of the prior information maps 258 or the functional predictive stalk diameter map 360) and agricultural characteristic values sensed by agricultural characteristic sensors 402. Stalk diameter-to-command model generator 420 generates a model that models a relationship between stalk diameter values (which may be on or indicated by one or more of the prior information maps or the functional predictive stalk diameter map 360, or other map 401) and operator input commands that are sensed by operator input sensor 404. Other characteristic-to-command model generator 422 generates a model that models a relationship between other characteristic values (such as vegetative index values, seeding characteristic values, prior operation characteristic values, or yield values) and operator input commands that are sensed by operator input sensor, such as an operator input command indicative of a deck plate spacing or position setting for one or more sets of deck plates on the agricultural harvester.

Predictive model 426 generated by the predictive model generator 210 can include one or more of the predictive models that may be generated by stalk diameter-to-agricultural characteristic model generator 416, stalk diameter-to-command model generator 420, other characteristic-to-command model generator 422, and other model generators that may be included as part of other items 424.

In the example of FIG. 6, predictive map generator 212 includes predictive agricultural characteristic map generator 428 and a predictive operator command map generator 432. In other examples, predictive map generator 212 can include additional, fewer, or other map generators 434. Predictive agricultural characteristic map generator 428 receives one or more of the maps, and a predictive model 426 that models a relationship between one or more values provided by one or more of the maps and one or more agricultural characteristic values sensed by agricultural characteristic sensors 402 (such as a predictive model generated by stalk diameter-to-agricultural characteristic model generator 416). Predictive agricultural characteristic map generator 428 generates a functional predictive agricultural characteristic map 436 that predicts, at any given location in the field, an agricultural characteristic at that location in the field based on predictive model 426 and upon a value, such as a stalk diameter value, contained in one or more of the prior information maps 258 or functional predictive stalk diameter map 360, corresponding to that location on the field.

Predictive operator command map generator 432 receives one or more of the maps and a predictive model 426 that models a relationship between one or more of the values provided by the maps (such as stalk diameter values, yield values, vegetative index values, or seeding characteristic values) and one or more operator command inputs (such as a predictive model generated by stalk diameter-to-command model generator 420 or a predictive model generated by other characteristic-to-command model generator 422). Predictive operator command map generator 432 generates a functional predictive operator command map 440 that predicts operator commands at different locations in the field based upon one or more of the values in the one or more of the maps and based on predictive model 426. For instance, predictive operator command map generator 432 generates a functional predictive operator command map 440 that predicts, at any given location in the field, an operator command at that location based on a stalk diameter value, a yield value, a vegetative index value, or a seeding characteristic value contained in functional predictive stalk diameter map 360, the yield map 333, the vegetative index map 332, and the seeding map 399, respectively, corresponding to that location.

Predictive map generator 212 outputs one or more of the functional predictive maps 436 or 440. Each of the functional predictive maps 436 or 440 may be provided to control zone generator 213, control system 214, or both, as shown in FIG. 2. Control zone generator 213 generates control zones and incorporates those control zones into the functional predictive maps 436 and 440 to produce a functional predictive agricultural characteristic map 436 with control zones and a functional predictive operator command map 440 with control zones. One or more of the functional predictive maps 436 or 440 (with or without control zones) may be provided to control system 214, which generates control signals based upon one or more of the functional predictive maps 436 or 440 (with or without control zones) to control one or more of the controllable subsystems of agricultural harvester 100. The controllable subsystems may include controllable subsystems 216. One or more of the maps 436 or 440 or corresponding maps 265 may be presented to operator 260 or another user.

Figure 7:
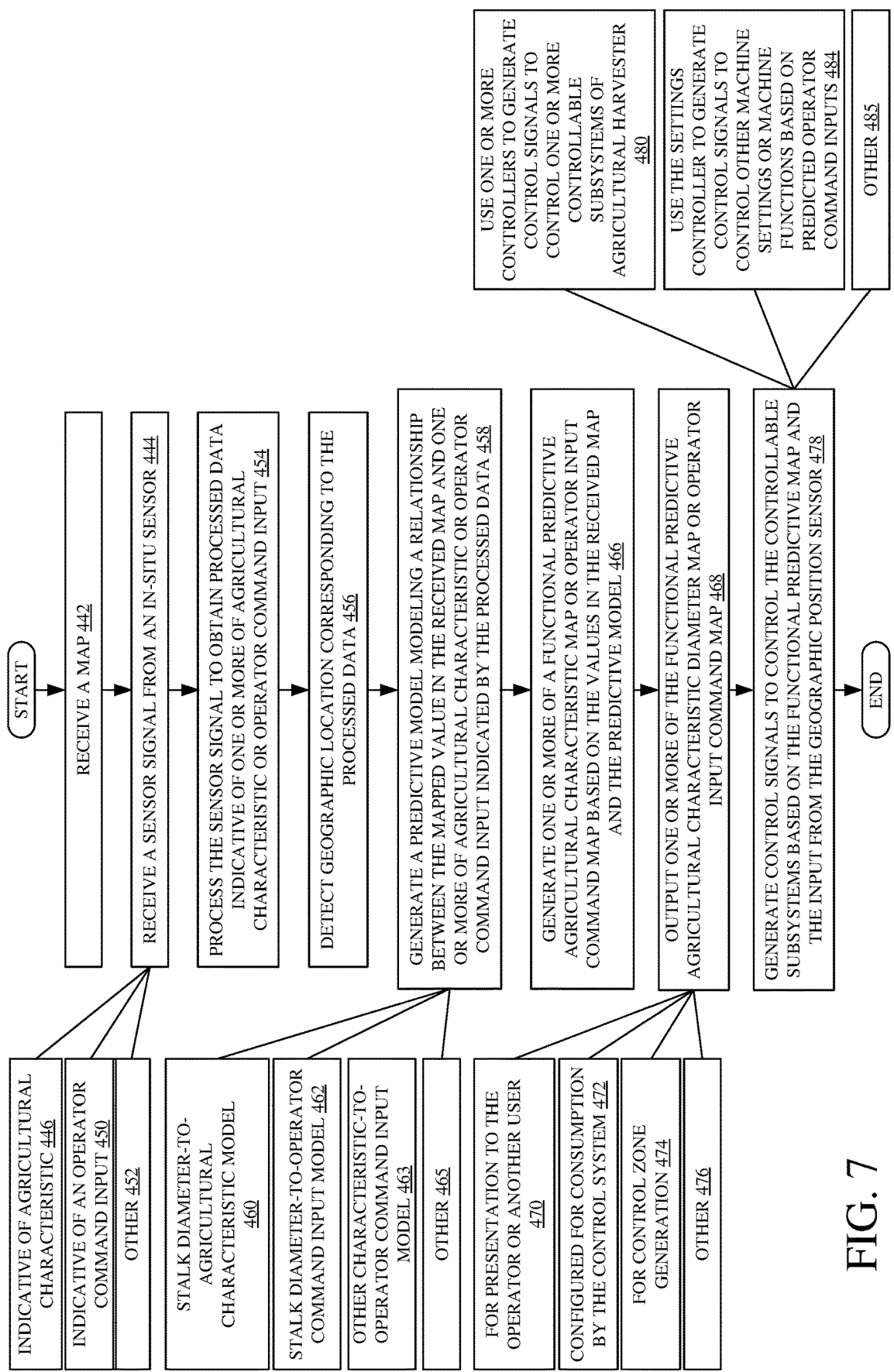
FIG. 7 shows a flow diagram illustrating one example of the operation of an agricultural harvester in receiving a map and detecting an in-situ sensor input in generating a functional predictive map.

FIG. 7 shows a flow diagram illustrating one example of the operation of predictive model generator 210 and predictive map generator 212 in generating one or more predictive models 426 and one or more functional predictive maps 436 or 440, respectively. At block 442, predictive model generator 210 and predictive map generator 212 receive a map. The map may be one or more of the maps shown in in FIG. 6, such as vegetative index map 332, yield map 333, seeding map 399, prior operation map 400, functional predictive stalk diameter map 360, or other maps 401. At block 444, predictive model generator 210 receives a sensor signal containing sensor data from an in-situ sensor 208. The in-situ sensor can be one or more agricultural characteristic sensors 402, an operator input sensor 404, or another sensor 408. Some examples of in-situ sensors 208 are shown in FIG. 8. Block 446 indicates that the sensor signal received by predictive model generator 210 includes data of a type that is indicative of an agricultural characteristic. Block 450 indicates that the sensor signal received by predictive map generator 210 may be a sensor signal having data of a type that is indicative of an operator command input. Predictive model generator 210 can receive other in-situ sensor inputs as well, as indicated by block 452.

At block 454, processing system 406 processes the data contained in the sensor signal or signals received from the in-situ sensor or sensors 208 to obtain processed data 409, shown in FIG. 6. The data contained in the sensor signal or signals can be in a raw format that is processed to receive processed data 409. For example, a temperature sensor signal includes electrical resistance data, this electrical resistance data can be processed into temperature data. In other examples, processing may comprise digitizing, encoding, formatting, scaling, filtering, or classifying data. The processed data 409 may be indicative of one or more of agricultural characteristics or operator input commands. The processed data 409 is provided to predictive model generator 210.

Returning to FIG. 7, at block 456, predictive model generator 210 also receives a geographic location 334, or an indication of geographic location, from geographic position sensor 204, as shown in FIG. 6. The geographic location 334 may be correlated to the geographic location from which the sensed variable or variables, sensed by in-situ sensors 208, were taken. For instance, the predictive model generator 210 can obtain the geographic location 334, or indication of geographic location, from geographic position sensor 204 and determine, based upon machine delays, machine speed, etc., a precise geographic location from which the processed data 409 was derived.

At block 458, predictive model generator 210 generates one or more predictive models 426 that model a relationship between a mapped value in a map received at block 442 and a characteristic represented in the processed data 409. For example, in some instances, the mapped value in the received map may be a stalk diameter value, which may be indicated by functional predictive stalk diameter map 360 or a characteristic value in prior operation map 400, or other map 401 and the predictive model generator 210 generates a predictive model using the mapped value of a received map and a characteristic sensed by in-situ sensors 208, as represented in the processed data 409, or a related characteristic, such as a characteristic that correlates to the characteristic sensed by in-situ sensors 208.

For instance, at block 460, predictive model generator 210 may generate a predictive model 426 that models a relationship between a stalk diameter value obtained from one or more maps and agricultural characteristic data obtained by an in-situ sensor 208. In another example, at block 462, predictive model generator 210 may generate a predictive model 426 that models a relationship between a stalk diameter value obtained from one or more maps and operator command inputs obtained from an in-situ sensor 208. In another example, at block 463, predictive model generator 210 may generate a predictive model 426 that models a relationship between other characteristics (such as yield values, vegetative index values, or seeding characteristic values) obtained from one or more maps and operator command inputs obtained from an in-situ sensor 208. Model generator 210 may generate a variety of other predictive models that model relationships between various other characteristic values obtained from one or more maps and data from one or more in-situ sensors 208.

The one or more predictive models 426 are provided to predictive map generator 212. At block 466, predictive map generator 212 generates one or more functional predictive maps. The functional predictive maps may be one or more functional predictive agricultural characteristic maps 436 or one or more functional predictive operator command maps 440 or any combination of these maps. Functional predictive agricultural characteristic map 436 predicts an agricultural characteristic at different locations in the field. Functional predictive operator command map 440 predicts desired or likely operator command inputs at different locations in the field. Further, one or more of the functional predictive maps 436 and 440 can be generated during the course of an agricultural operation. Thus, as agricultural harvester 100 is moving through a field performing an agricultural operation, the one or more predictive maps 436 and 440 are generated as the agricultural operation is being performed.

At block 468, predictive map generator 212 outputs the one or more functional predictive maps 436 and 440. At block 470, predictive map generator 212 may configure the one or more maps for presentation to and possible interaction by an operator 260 or another user. At block 472, predictive map generator 212 may configure the one or more maps for consumption by control system 214. At block 474, predictive map generator 212 can provide the one or more predictive maps 436 and 440 to control zone generator 213 for generation of control zones. At block 476, predictive map generator 212 configures the one or more predictive maps 436 and 440 in other ways. In an example in which the one or more functional predictive maps 436 and 440 are provided to control zone generator 213, the one or more functional predictive maps 436 and 440, with the control zones included therewith, represented by corresponding maps 265, described above, may be presented to operator 260 or another user or provided to control system 214 as well.

At block 478, control system 214 then generates control signals to control the controllable subsystems of agricultural harvester 100, such as controllable subsystems 216, based upon the one or more functional predictive maps 436 or 440 (or the functional predictive maps 436 or 440 having control zones) as well as a geographical position input signal from the geographic position sensor 204. For example, when the functional predictive agricultural characteristic map 436 (with or without control zones) or the functional predictive command map 440 (with or without control zones0 is provided to control system 214, one or more controllers, in response, generate control signals to control one or more of the controllable subsystems 216 in order to control the operation of agricultural harvester 100 based upon the predicted agricultural characteristic values in the functional predictive agricultural characteristic map 436 or based on the predicted operator command values in the functional predictive command map 440. This is indicated by block 480.

Block 484 shows an example in which control system 214 receives the functional predictive operator command map 440 or functional predictive operator command map 440 with control zones added. In response, settings controller 232 generates control signals to control other machine settings or machine functions based on predicted operator command inputs in the functional predictive operator command map 440 or functional predictive operator command map 440 with control zones added. Block 485 shows that control signals to control the operation of agricultural harvester 100 can be generated in other ways as well. For instance, control signals can be generated on the basis of a combination of functional predictive maps 436 or 440. For example, on the basis of functional predictive maps 436 or 440 (with or without control zones), or both, one or more controllers generate control signals to control one or more of the controllable subsystems 216 in order to control the operation of agricultural harvester 100 based upon the predicted agricultural characteristic values in the functional predictive agricultural characteristic map 436 or the functional predictive agricultural characteristic map 436 containing control zones or operator command values in the functional predictive operator command map 440 or the functional predictive operator command map 440 containing control zones.

Control system 214 can generate control signals to control header or other machine actuator(s) 248, such as to control a position of or spacing between deck plates. Control system 214 can generate control signals to control propulsion subsystem 250. Control system 214 can generate control signals to control steering subsystem 252. Control system 214 can generate control signals to control residue subsystem 138. Control system 214 can generate control signals to control machine cleaning subsystem 254. Control system 214 can generate control signals to control thresher 110. Control system 214 can generate control signals to control material handling subsystem 125. Control system 214 can generate control signals to control crop cleaning subsystem 118. Control system 214 can generate control signals to control communication system 206. Control system 214 can generate control signals to control operator interface mechanisms 218. Control system 214 can generate control signals to control various other controllable subsystems 256. In other examples, control system 214 can generate control signals to control a speed of threshing rotor 112, can generate control signals to control a concave clearance, or can generate control signals to adjust power output to some of the plant processing systems, such as the gathering chains or stalk rolls.

FIG. 8 shows a block diagram illustrating examples of real time (in-situ) sensors 208. In-situ sensors 208 can sense any of a number of agricultural characteristics. Some of the sensors shown in FIG. 8, or different combinations thereof, may have both a sensor 402 and a processing system 406, while others may act as sensor 402 described above with respect to FIGS. 6 and 7 where the processing system 406 is separate. Some of the possible in-situ sensors 208 shown in FIG. 8 are shown and described above with respect to previous FIGS. and are similarly numbered. FIG. 8 shows that in-situ sensors 208 can include operator input sensors 980, machine sensors 982, harvested material property sensors 984, field and soil property sensors 985, and environmental characteristic sensors 987. The in-situ sensors 208 may also include a wide variety of other sensors 226. Operator input sensors 980 may be sensors that sense operator inputs through operator interface mechanisms 218. Therefore, operator input sensors 980 may sense user movement of linkages, joysticks, a steering wheel, buttons, dials, pedals, or other operator input devices. Operator input sensors 980 can also sense user interactions with other operator input mechanisms, such as with a touch sensitive screen, with a microphone where speech recognition is utilized, or any of a wide variety of other operator input mechanisms.

Machine sensors 982 may sense different characteristics of agricultural harvester 100. For instance, as discussed above, machine sensors 982 may include machine speed sensors 146, separator loss sensor 148, clean grain camera 150, forward looking image capture mechanism 151, loss sensors 152, or geographic position sensor 204, examples of which are described above. Machine sensors 982 can also include machine setting sensors 991 that sense machine settings. Some examples of machine settings were described above with respect to FIG. 1. Front-end equipment (e.g., header) position sensor 993 can sense the position of the header 102, reel 164, cutter 104, or other front-end equipment relative to the frame of agricultural harvester 100 or relative to the surface of the field. For instance, sensors 993 may sense the height of header 102 above the ground. Machine sensors 982 can also include front-end equipment (e.g., header) orientation sensors 995. Sensors 995 may sense the orientation of header 102 relative to agricultural harvester 100 or relative to the ground. Machine sensors 982 may include stability sensors 997. Stability sensors 997 sense oscillation or bouncing motion (and amplitude) of agricultural harvester 100. Machine sensors 982 may also include residue setting sensors 999 that are configured to sense whether agricultural harvester 100 is configured to chop the residue, produce a windrow, or deal with the residue in another way. Machine sensors 982 may include cleaning shoe fan speed sensor 951 that senses the speed of cleaning fan 120. Machine sensors 982 may include concave clearance sensors 953 that sense the clearance between the rotor 112 and concaves 114 on agricultural harvester 100. Machine sensors 982 may include chaffer clearance sensors 955 that sense the size of openings in chaffer 122. The machine sensors 982 may include threshing rotor speed sensor 957 that senses a rotor speed of rotor 112. Machine sensors 982 may include rotor force sensor 959 that senses the force (e.g., pressure, torque, etc.) used to drive rotor 112. Machine sensors 982 may include sieve clearance sensor 961 that senses the size of openings in sieve 124. The machine sensors 982 may include MOG moisture sensor 963 that senses a moisture level of the MOG passing through agricultural harvester 100. Machine sensors 982 may include machine orientation sensor 965 that senses the orientation of agricultural harvester 100. Machine sensors 982 may include material feed rate sensors 967 that sense the feed rate of material as the material travels through feeder house 106, clean grain elevator 130, or elsewhere in agricultural harvester 100. Machine sensors 982 can include biomass sensors 969 that sense the biomass traveling through feeder house 106, through separator 116, or elsewhere in agricultural harvester 100. The machine sensors 982 may include fuel consumption sensor 971 that senses a rate of fuel consumption over time of agricultural harvester 100. Machine sensors 982 may include power utilization sensor 973 that senses power utilization in agricultural harvester 100, such as which subsystems are utilizing power, the rate at which subsystems are utilizing power, or the distribution of power among the subsystems in agricultural harvester 100. Machine sensors 982 may include tire pressure sensors 977 that sense the inflation pressure in tires 144 of agricultural harvester 100. Machine sensor 982 may include a wide variety of other machine performance sensors or machine characteristic sensors, indicated by block 975. The machine performance sensors and machine characteristic sensors 975 may sense machine performance or characteristics of agricultural harvester 100.

Harvested material property sensors 984 may sense characteristics of the severed crop material as the crop material is being processed by agricultural harvester 100. The crop properties may include such things as crop type, crop moisture, grain quality (such as broken grain), MOG levels, grain constituents (such as starches and protein), MOG moisture, and other crop material properties.

Field and soil property sensors 985 may sense characteristics of the field and soil. The field and soil properties may include soil moisture, soil compactness, the presence and location of standing water, soil type, and other soil and field characteristics.

Environmental characteristic sensors 987 may sense one or more environmental characteristics. The environmental characteristics may include such things as wind direction, wind speed, precipitation, fog, levels of dust or other obscurants, or other environmental characteristics.

Figure 9:
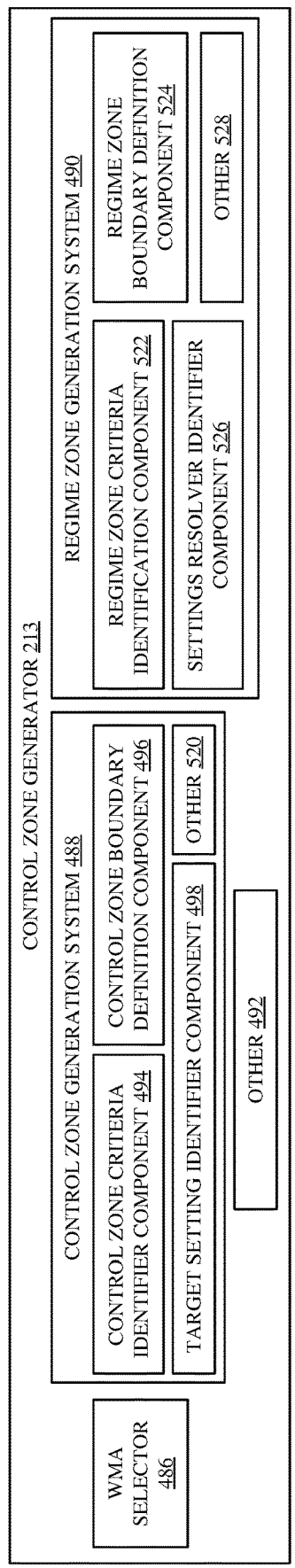
FIG. 9 is a block diagram showing one example of a control zone generator.
Figure 10:
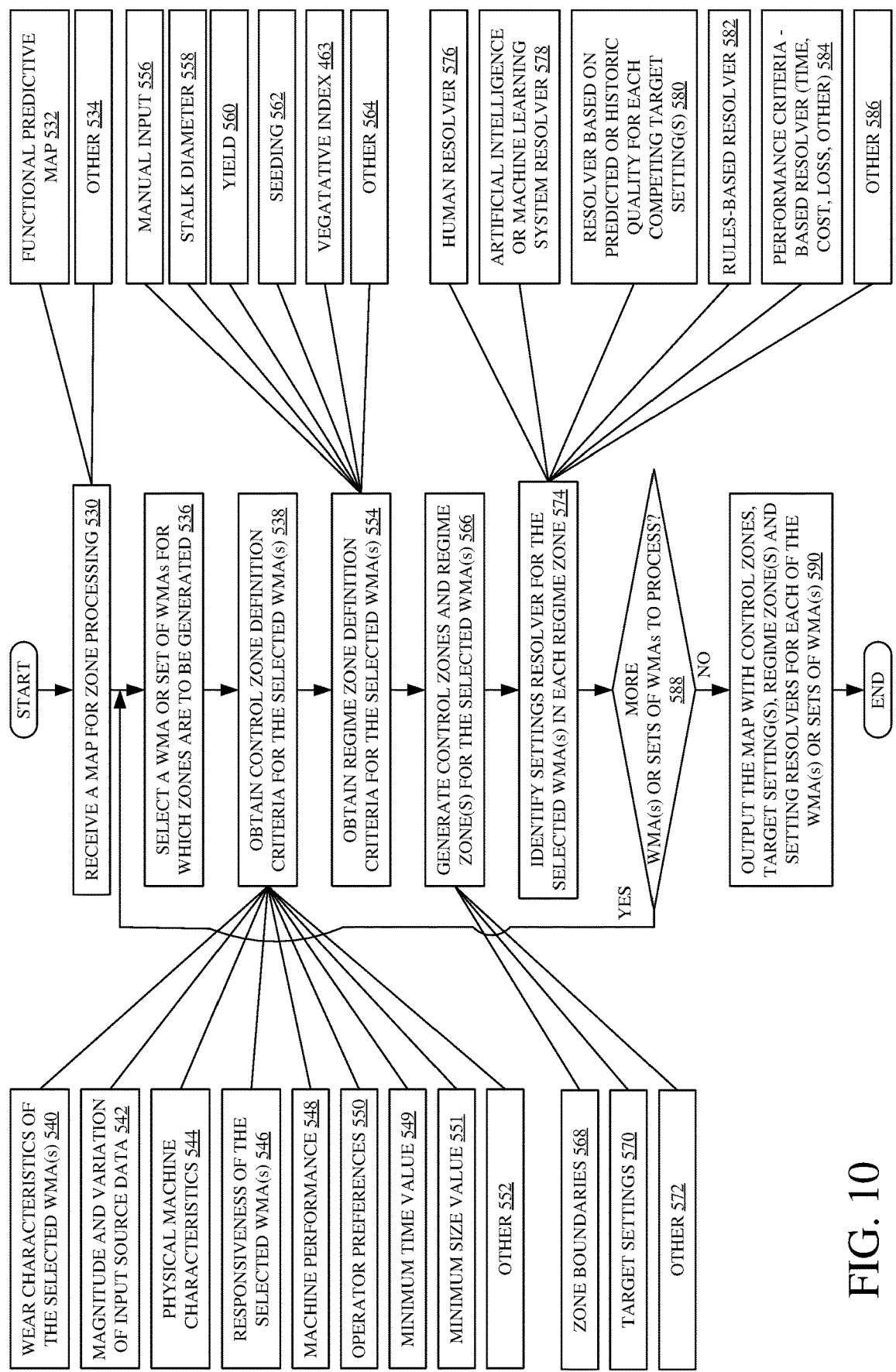
FIG. 10 is a flow diagram illustrating one example of the operation of the control zone generator shown in FIG. 8.

FIG. 9 shows a block diagram illustrating one example of control zone generator 213. Control zone generator 213 includes work machine actuator (WMA) selector 486, control zone generation system 488, and regime zone generation system 490. Control zone generator 213 may also include other items 492. Control zone generation system 488 includes control zone criteria identifier component 494, control zone boundary definition component 496, target setting identifier component 498, and other items 520. Regime zone generation system 490 includes regime zone criteria identification component 522, regime zone boundary definition component 524, settings resolver identifier component 526, and other items 528. Before describing the overall operation of control zone generator 213 in more detail, a brief description of some of the items in control zone generator 213 and the respective operations thereof will first be provided.

Agricultural harvester 100, or other work machines, may have a wide variety of different types of controllable actuators that perform different functions. The controllable actuators on agricultural harvester 100 or other work machines are collectively referred to as work machine actuators (WMAs). Each WMA may be independently controllable based upon values on a functional predictive map, or the WMAs may be controlled as sets based upon one or more values on a functional predictive map. Therefore, control zone generator 213 may generate control zones corresponding to each individually controllable WMA or corresponding to the sets of WMAs that are controlled in coordination with one another.

WMA selector 486 selects a WMA or a set of WMAs for which corresponding control zones are to be generated. Control zone generation system 488 then generates the control zones for the selected WMA or set of WMAs. For each WMA or set of WMAs, different criteria may be used in identifying control zones. For example, for one WMA, the WMA response time may be used as the criteria for defining the boundaries of the control zones. In another example, wear characteristics (e.g., how much a particular actuator or mechanism wears as a result of movement thereof) may be used as the criteria for identifying the boundaries of control zones. Control zone criteria identifier component 494 identifies particular criteria that are to be used in defining control zones for the selected WMA or set of WMAs. Control zone boundary definition component 496 processes the values on a functional predictive map under analysis to define the boundaries of the control zones on that functional predictive map based upon the values in the functional predictive map under analysis and based upon the control zone criteria for the selected WMA or set of WMAs.

Target setting identifier component 498 sets a value of the target setting that will be used to control the WMA or set of WMAs in different control zones. For instance, if the selected WMA is header or other machine actuators 248 and the functional predictive map under analysis is a functional predictive stalk diameter map 360 (with control zones) that maps predictive stalk diameter values indicative of a diameter of plant stalks, such as cornstalks, at different locations across the field, then the target setting in each control zone may be a deck plate position or deck plate spacing setting based on stalk diameter values contained in the functional predictive stalk diameter map 360 within the identified control zone. This is because, given a stalk diameter of the vegetation at a location in the field to be harvested by agricultural harvester 100, controlling the position or spacing of the deck plates of agricultural harvester 100, such that the deck plates have proper settings, is important to reduce loss and to reduce material other than grain (MOG) intake, among other things.

In some examples, where agricultural harvester 100 is to be controlled based on a current or future location of the agricultural harvester 100, multiple target settings may be possible for a WMA at a given location. In that case, the target settings may have different values and may be competing. Thus, the target settings need to be resolved so that only a single target setting is used to control the WMA. For example, where the WMA is an actuator in propulsion system 250 that is being controlled in order to control the speed of agricultural harvester 100, multiple different competing sets of criteria may exist that are considered by control zone generation system 488 in identifying the control zones and the target settings for the selected WMA in the control zones. For instance, different target settings for controlling deck plate position or spacing may be generated based upon, for example, a detected or predicted stalk diameter value, a detected or predicted operator command input value, a detected or predicted yield value, a detected or predicted vegetative index value, a detected or predicted seeding characteristic value (such as a predicted or detected hybrid value or a detected or predicted population value), a detected or predicted feed rate value, a detected or predicted fuel efficiency value, a detected or predicted grain loss value, or a combination of these. It will be noted that these are merely examples and target settings for various WMAs can be based on various other values or combinations of values. However, at any given time, the agricultural harvester 100 cannot have multiple positions or spacing arrangements for the same set of deck plates simultaneously. Rather, at any given time, the position or spacing of a set of deck plates of agricultural harvester 100 are at a particular position or have a particular spacing. Thus, one of the competing target settings is selected to control the position or spacing of the deck plates of agricultural harvester 100.

Therefore, in some examples, regime zone generation system 490 generates regime zones to resolve multiple different competing target settings. Regime zone criteria identification component 522 identifies the criteria that are used to establish regime zones for the selected WMA or set of WMAs on the functional predictive map under analysis. Some criteria that can be used to identify or define regime zones include, for example, stalk diameters, operator command inputs, vegetative index values, yield values, and seeding characteristic values (such as hybrid values or population values or both). The regime zone criteria may also include, for instance, crop type or crop variety (for example, based on an as-planted map or another source of the crop type or crop variety), weed type, weed intensity, or crop state (such as whether the crop is down, partially down, or standing). These are merely some examples of the criteria that can be used to identify or define regime zones. Just as each WMA or set of WMAs may have a corresponding control zone, different WMAs or sets of WMAs may have a corresponding regime zone. Regime zone boundary definition component 524 identifies the boundaries of regime zones on the functional predictive map under analysis based on the regime zone criteria identified by regime zone criteria identification component 522. These are merely some examples of the criteria that can be used to identify or define regime zones. Just as each WMA or set of WMAs may have a corresponding control zone, different WMAs or sets of WMAs may have a corresponding regime zone. Regime zone boundary definition component 524 identifies the boundaries of regime zones on the functional predictive map under analysis based on the regime zone criteria identified by regime zone criteria identification component 522.

In some examples, regime zones may overlap with one another. For instance, a stalk diameter regime zone may overlap with a portion of or an entirety of a crop state regime zone. In such an example, the different regime zones may be assigned to a precedence hierarchy so that, where two or more regime zones overlap, the regime zone assigned with a greater hierarchical position or importance in the precedence hierarchy has precedence over the regime zones that have lesser hierarchical positions or importance in the precedence hierarchy. The precedence hierarchy of the regime zones may be manually set or may be automatically set using a rules-based system, a model-based system, or another system. As one example, where a stalk diameter regime zone overlaps with a crop state regime zone, the stalk diameter regime zone may be assigned a greater importance in the precedence hierarchy than the crop state regime zone so that the stalk diameter regime zone takes precedence.

In addition, each regime zone may have a unique settings resolver for a given WMA or set of WMAs. Settings resolver identifier component 526 identifies a particular settings resolver for each regime zone identified on the functional predictive map under analysis and a particular settings resolver for the selected WMA or set of WMAs.

Once the settings resolver for a particular regime zone is identified, that settings resolver may be used to resolve competing target settings, where more than one target setting is identified based upon the control zones. The different types of settings resolvers can have different forms. For instance, the settings resolvers that are identified for each regime zone may include a human choice resolver in which the competing target settings are presented to an operator or other user for resolution. In another example, the settings resolver may include a neural network or other artificial intelligence or machine learning system. In such instances, the settings resolvers may resolve the competing target settings based upon a predicted or historic quality metric corresponding to each of the different target settings. As an example, an increased deck plate spacing may reduce the amount of MOG intake but increase the grain loss at the header. A reduced deck plate spacing may increase the amount of MOG intake and thus reduce overall machine capacity. When grain loss or machine capacity is selected as a quality metric, the predicted or historic value for the selected quality metric, given the two competing deck plate spacing settings, may be used to resolve the deck plate spacing setting. In some instances, the settings resolvers may be a set of threshold rules that may be used instead of, or in addition to, the regime zones. An example of a threshold rule may be expressed as follows:

> If predicted stalk diameter values within 20 feet of the header of the agricultural harvester 100 are greater than x (where x is a selected or predetermined value), then use the target setting value that is chosen based on header grain loss over other competing target settings, otherwise use the target setting value based on machine capacity over other competing target setting values.

The settings resolvers may be logical components that execute logical rules in identifying a target setting. For instance, the settings resolver may resolve target settings while attempting to minimize harvest time or minimize the total harvest cost or maximize harvested grain or based on other variables that are computed as a function of the different candidate target settings. A harvest time may be minimized when an amount to complete a harvest is reduced to at or below a selected threshold. A total harvest cost may be minimized where the total harvest cost is reduced to at or below a selected threshold. Harvested grain may be maximized where the amount of harvested grain is increased to at or above a selected threshold.

FIG. 9 is a flow diagram illustrating one example of the operation of control zone generator 213 in generating control zones and regime zones for a map that the control zone generator 213 receives for zone processing (e.g., for a map under analysis).

At block 530, control zone generator 213 receives a map under analysis for processing. In one example, as shown at block 532, the map under analysis is a functional predictive map. For example, the map under analysis may be one of the functional predictive maps 436 or 440. In another example, the map under analysis may be the functional predictive stalk diameter map 360. Block 534 indicates that the map under analysis can be other maps as well.

At block 536, WMA selector 486 selects a WMA or a set of WMAs for which control zones are to be generated on the map under analysis. At block 538, control zone criteria identification component 494 obtains control zone definition criteria for the selected WMAs or set of WMAs. Block 540 indicates an example in which the control zone criteria are or include wear characteristics of the selected WMA or set of WMAs. Block 542 indicates an example in which the control zone definition criteria are or include a magnitude and variation of input source data, such as the magnitude and variation of the values on the map under analysis or the magnitude and variation of inputs from various in-situ sensors 208. Block 544 indicates an example in which the control zone definition criteria are or include physical machine characteristics, such as the physical dimensions of the machine, a speed at which different subsystems operate, or other physical machine characteristics. Block 546 indicates an example in which the control zone definition criteria are or include a responsiveness of the selected WMA or set of WMAs in reaching newly commanded setting values. Block 548 indicates an example in which the control zone definition criteria are or include machine performance metrics. Block 549 indicates an example in which the control zone definition criteria are time based, meaning that agricultural harvester 100 will not cross the boundary of a control zone until a selected amount of time has elapsed since agricultural harvester 100 entered a particular control zone. In some instances, the selected amount of time may be a minimum amount of time. Thus, in some instances, the control zone definition criteria may prevent the agricultural harvester 100 from crossing a boundary of a control zone until at least the selected amount of time has elapsed. Block 550 indicates an example in which the control zone definition criteria are or includes operator preferences. Block 551 indicates an example in which the control zone definition criteria are based on a selected size value. For example, a control zone definition criterion that is based on a selected size value may preclude definition of a control zone that is smaller than the selected size. In some instances, the selected size may be a minimum size. Block 552 indicates an example in which the control zone definition criteria are or include other items as well.

At block 554, regime zone criteria identification component 522 obtains regime zone definition criteria for the selected WMA or set of WMAs. Block 556 indicates an example in which the regime zone definition criteria are based on a manual input from operator 260 or another user. Block 558 illustrates an example in which the regime zone definition criteria are based on stalk diameter values. Block 560 illustrates an example in which the regime zone definition criteria are based on yield values. Block 562 illustrates an example in which the regime zone definition criteria are based on seeding characteristic values, such as hybrid values or population values. Block 563 indicates an example in which the regime zone definition criteria are based on vegetative index values. Block 564 indicates an example in which the regime zone definition criteria are or include other criteria as well, for instance, crop type or crop variety, weed type, weed intensity, or crop state (such as whether the crop is down, partially down, or standing). Other criteria may also be used.

At block 566, control zone boundary definition component 496 generates the boundaries of control zones on the map under analysis based upon the control zone criteria. Regime zone boundary definition component 524 generates the boundaries of regime zones on the map under analysis based upon the regime zone criteria. Block 568 indicates an example in which the zone boundaries are identified for the control zones and the regime zones. Block 570 shows that target setting identifier component 498 identifies the target settings for each of the control zones. The control zones and regime zones can be generated in other ways as well, and this is indicated by block 572.

At block 574, settings resolver identifier component 526 identifies the settings resolver for the selected WMAs in each regime zone defined by regimes zone boundary definition component 524. As discussed above, the regime zone resolver can be a human resolver 576, an artificial intelligence or machine learning system resolver 578, a resolver 580 based on predicted or historic quality for each competing target setting, a rules-based resolver 582, a performance criteria-based resolver 584, or other resolvers 586.

At block 588, WMA selector 486 determines whether there are more WMAs or sets of WMAs to process. If additional WMAs or sets of WMAs are remaining to be processed, processing reverts to block 536 where the next WMA or set of WMAs for which control zones and regime zones are to be defined is selected. When no additional WMAs or sets of WMAs for which control zones or regime zones are to be generated are remaining, processing moves to block 590 where control zone generator 213 outputs a map with control zones, target settings, regime zones, and settings resolvers for each of the WMAs or sets of WMAs. As discussed above, the outputted map can be presented to operator 260 or another user; the outputted map can be provided to control system 214; or the outputted map can be output in other ways.

Figure 11:
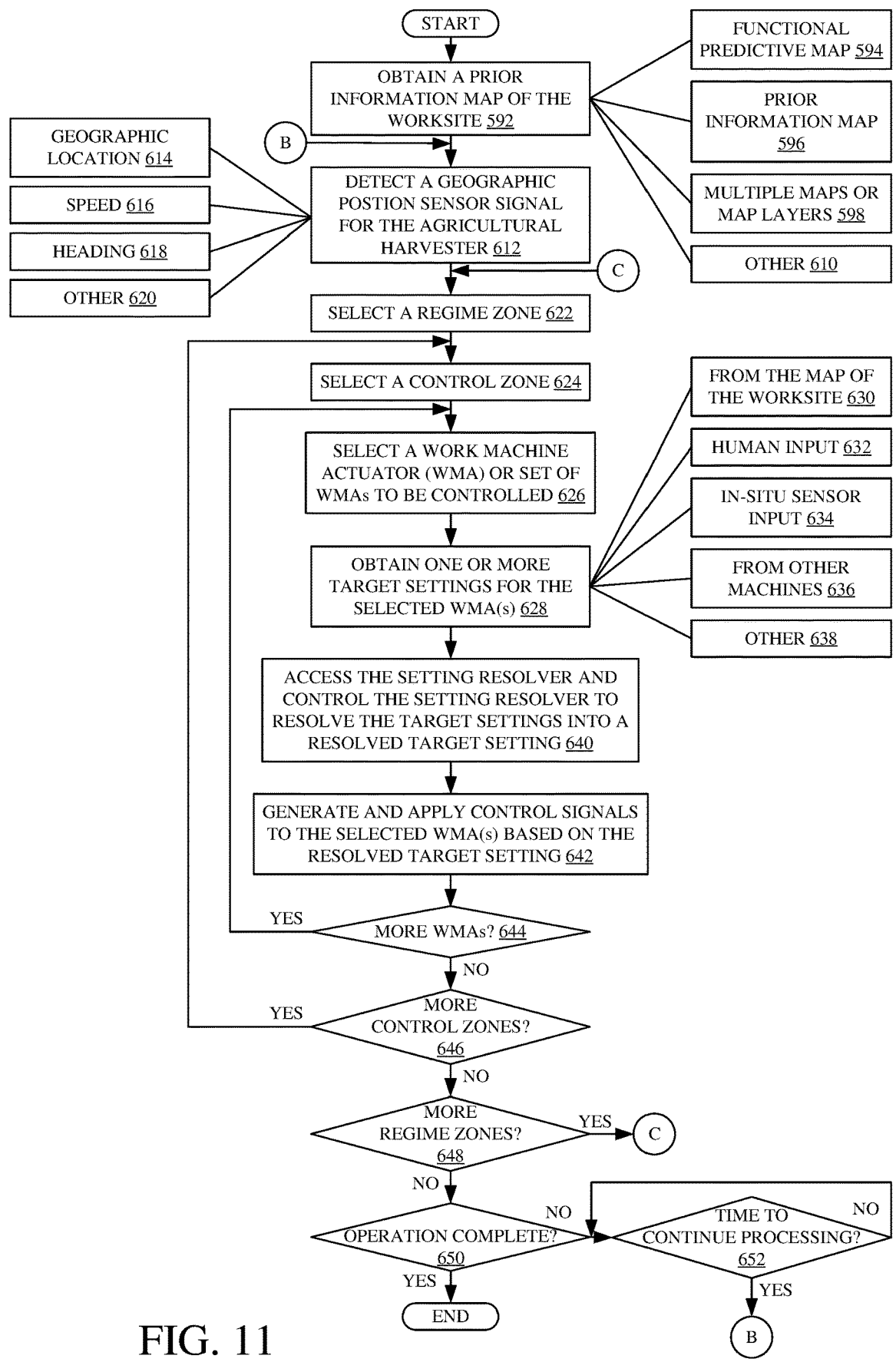
FIG. 11 illustrates a flow diagram showing an example of the operation of a control system in selecting a target settings value to control the agricultural harvester.

FIG. 11 illustrates one example of the operation of control system 214 in controlling agricultural harvester 100 based upon a map that is output by control zone generator 213. Thus, at block 592, control system 214 receives a map of the worksite. In some instances, the map can be a functional predictive map that may include control zones and regime zones, as represented by block 594. In some instances, the received map may be a functional predictive map that excludes control zones and regime zones. Block 596 indicates an example in which the received map of the worksite can be a prior information map having control zones and regime zones identified on it. Block 598 indicates an example in which the received map can include multiple different maps or multiple different map layers. Block 610 indicates an example in which the received map can take other forms as well.

At block 612, control system 214 receives a sensor signal from geographic position sensor 204. The sensor signal from geographic position sensor 204 can include data that indicates the geographic location 614 of agricultural harvester 100, the speed 616 of agricultural harvester 100, the heading 618 of agricultural harvester 100, or other information 620. At block 622, zone controller 247 selects a regime zone, and, at block 624, zone controller 247 selects a control zone on the map based on the geographic position sensor signal. At block 626, zone controller 247 selects a WMA or a set of WMAs to be controlled. At block 628, zone controller 247 obtains one or more target settings for the selected WMA or set of WMAs. The target settings that are obtained for the selected WMA or set of WMAs may come from a variety of different sources. For instance, block 630 shows an example in which one or more of the target settings for the selected WMA or set of WMAs is based on an input from the control zones on the map of the worksite. Block 632 shows an example in which one or more of the target settings is obtained from human inputs from operator 260 or another user. Block 634 shows an example in which the target settings are obtained from an in-situ sensor 208. Block 636 shows an example in which the one or more target settings is obtained from one or more sensors on other machines working in the same field either concurrently with agricultural harvester 100 or from one or more sensors on machines that worked in the same field in the past. Block 638 shows an example in which the target settings are obtained from other sources as well.

At block 640, zone controller 247 accesses the settings resolver for the selected regime zone and controls the settings resolver to resolve competing target settings into a resolved target setting. As discussed above, in some instances, the settings resolver may be a human resolver in which case zone controller 247 controls operator interface mechanisms 218 to present the competing target settings to operator 260 or another user for resolution. In some instances, the settings resolver may be a neural network or other artificial intelligence or machine learning system, and zone controller 247 submits the competing target settings to the neural network, artificial intelligence, or machine learning system for selection. In some instances, the settings resolver may be based on a predicted or historic quality metric, on threshold rules, or on logical components. In any of these latter examples, zone controller 247 executes the settings resolver to obtain a resolved target setting based on the predicted or historic quality metric, based on the threshold rules, or with the use of the logical components.

At block 642, with zone controller 247 having identified the resolved target setting, zone controller 247 provides the resolved target setting to other controllers in control system 214, which generate and apply control signals to the selected WMA or set of WMAs based upon the resolved target setting. For instance, where the selected WMA is a machine or header actuator 248, zone controller 247 provides the resolved target setting to settings controller 232 or header/real controller 238 or both to generate control signals based upon the resolved target setting, and those generated control signals are applied to the machine or header actuators 248. At block 644, if additional WMAs or additional sets of WMAs are to be controlled at the current geographic location of the agricultural harvester 100 (as detected at block 612), then processing reverts to block 626 where the next WMA or set of WMAs is selected. The processes represented by blocks 626 through 644 continue until all of the WMAs or sets of WMAs to be controlled at the current geographical location of the agricultural harvester 100 have been addressed. If no additional WMAs or sets of WMAs are to be controlled at the current geographic location of the agricultural harvester 100 remain, processing proceeds to block 646 where zone controller 247 determines s whether additional control zones to be considered exist in the selected regime zone. If additional control zones to be considered exist, processing reverts to block 624 where a next control zone is selected. If no additional control zones are remaining to be considered, processing proceeds to block 648 where a determination as to whether additional regime zones are remaining to be consider. Zone controller 247 determines whether additional regime zones are remaining to be considered. If additional regimes zone are remaining to be considered, processing reverts to block 622 where a next regime zone is selected.

At block 650, zone controller 247 determines whether the operation that agricultural harvester 100 is performing is complete. If not, the zone controller 247 determines whether a control zone criterion has been satisfied to continue processing, as indicated by block 652. For instance, as mentioned above, control zone definition criteria may include criteria defining when a control zone boundary may be crossed by the agricultural harvester 100. For example, whether a control zone boundary may be crossed by the agricultural harvester 100 may be defined by a selected time period, meaning that agricultural harvester 100 is prevented from crossing a zone boundary until a selected amount of time has transpired. In that case, at block 652, zone controller 247 determines whether the selected time period has elapsed. Additionally, zone controller 247 can perform processing continually. Thus, zone controller 247 does not wait for any particular time period before continuing to determine whether an operation of the agricultural harvester 100 is completed. At block 652, zone controller 247 determines that it is time to continue processing, then processing continues at block 612 where zone controller 247 again receives an input from geographic position sensor 204. It will also be appreciated that zone controller 247 can control the WMAs and sets of WMAs simultaneously using a multiple-input, multiple-output controller instead of controlling the WMAs and sets of WMAs sequentially.

Figure 12:
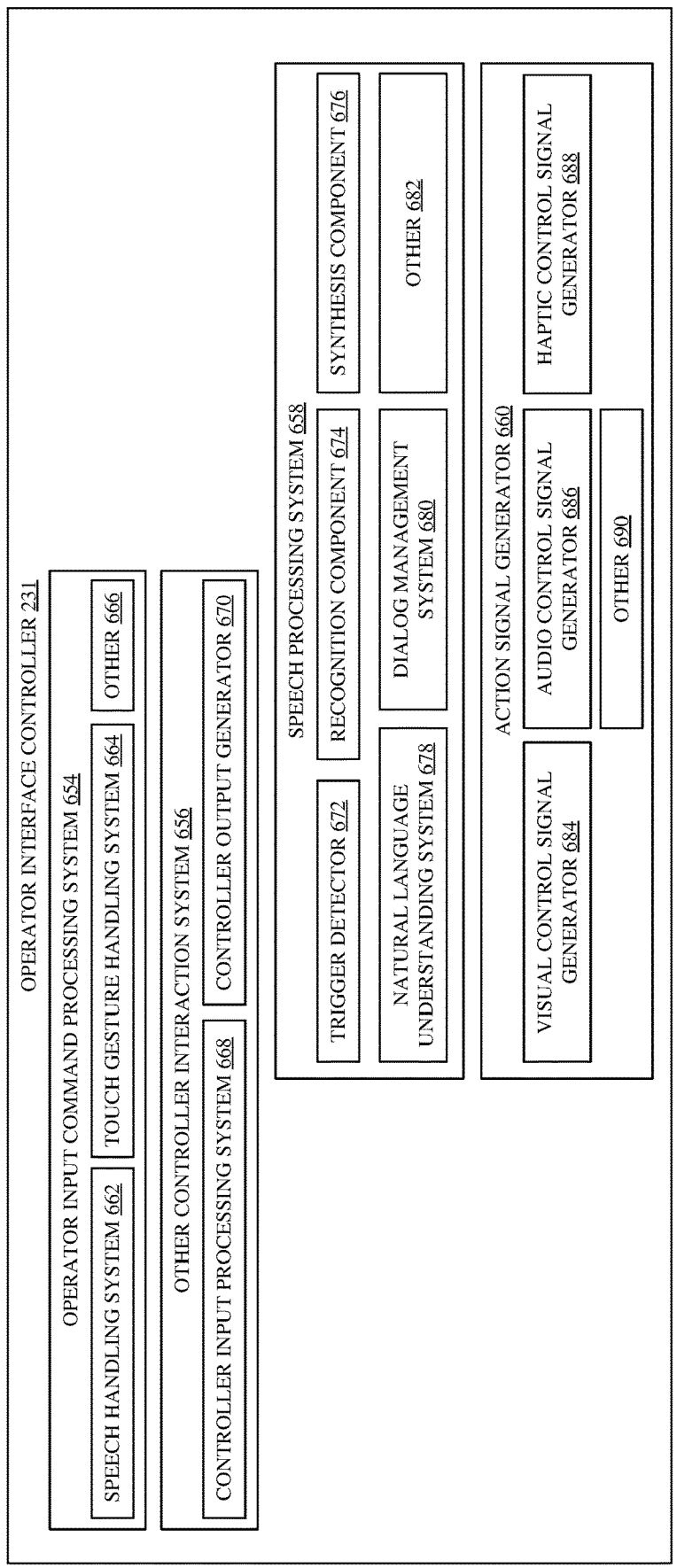
FIG. 12 is a block diagram showing one example of an operator interface controller.

FIG. 12 is a block diagram showing one example of an operator interface controller 231. In an illustrated example, operator interface controller 231 includes operator input command processing system 654, other controller interaction system 656, speech processing system 658, and action signal generator 660. Operator input command processing system 654 includes speech handling system 662, touch gesture handling system 664, and other items 666. Other controller interaction system 656 includes controller input processing system 668 and controller output generator 670. Speech processing system 658 includes trigger detector 672, recognition component 674, synthesis component 676, natural language understanding system 678, dialog management system 680, and other items 682. Action signal generator 660 includes visual control signal generator 684, audio control signal generator 686, haptic control signal generator 688, and other items 690. Before describing operation of the example operator interface controller 231 shown in FIG. 12 in handling various operator interface actions, a brief description of some of the items in operator interface controller 231 and the associated operation thereof is first provided.

Operator input command processing system 654 detects operator inputs on operator interface mechanisms 218 and processes those inputs for commands. Speech handling system 662 detects speech inputs and handles the interactions with speech processing system 658 to process the speech inputs for commands. Touch gesture handling system 664 detects touch gestures on touch sensitive elements in operator interface mechanisms 218 and processes those inputs for commands.

Other controller interaction system 656 handles interactions with other controllers in control system 214. Controller input processing system 668 detects and processes inputs from other controllers in control system 214, and controller output generator 670 generates outputs and provides those outputs to other controllers in control system 214. Speech processing system 658 recognizes speech inputs, determines the meaning of those inputs, and provides an output indicative of the meaning of the spoken inputs. For instance, speech processing system 658 may recognize a speech input from operator 260 as a settings change command in which operator 260 is commanding control system 214 to change a setting for a controllable subsystem 216. In such an example, speech processing system 658 recognizes the content of the spoken command, identifies the meaning of that command as a settings change command, and provides the meaning of that input back to speech handling system 662. Speech handling system 662, in turn, interacts with controller output generator 670 to provide the commanded output to the appropriate controller in control system 214 to accomplish the spoken settings change command.

Speech processing system 658 may be invoked in a variety of different ways. For instance, in one example, speech handling system 662 continuously provides an input from a microphone (being one of the operator interface mechanisms 218) to speech processing system 658. The microphone detects speech from operator 260, and the speech handling system 662 provides the detected speech to speech processing system 658. Trigger detector 672 detects a trigger indicating that speech processing system 658 is invoked. In some instances, when speech processing system 658 is receiving continuous speech inputs from speech handling system 662, speech recognition component 674 performs continuous speech recognition on all speech spoken by operator 260. In some instances, speech processing system 658 is configured for invocation using a wakeup word. That is, in some instances, operation of speech processing system 658 may be initiated based on recognition of a selected spoken word, referred to as the wakeup word. In such an example, where recognition component 674 recognizes the wakeup word, the recognition component 674 provides an indication that the wakeup word has been recognized to trigger detector 672. Trigger detector 672 detects that speech processing system 658 has been invoked or triggered by the wakeup word. In another example, speech processing system 658 may be invoked by an operator 260 actuating an actuator on a user interface mechanism, such as by touching an actuator on a touch sensitive display screen, by pressing a button, or by providing another triggering input. In such an example, trigger detector 672 can detect that speech processing system 658 has been invoked when a triggering input via a user interface mechanism is detected. Trigger detector 672 can detect that speech processing system 658 has been invoked in other ways as well.

Once speech processing system 658 is invoked, the speech input from operator 260 is provided to speech recognition component 674. Speech recognition component 674 recognizes linguistic elements in the speech input, such as words, phrases, or other linguistic units. Natural language understanding system 678 identifies a meaning of the recognized speech. The meaning may be a natural language output, a command output identifying a command reflected in the recognized speech, a value output identifying a value in the recognized speech, or any of a wide variety of other outputs that reflect the understanding of the recognized speech. For example, the natural language understanding system 678 and speech processing system 568, more generally, may understand of the meaning of the recognized speech in the context of agricultural harvester 100.

In some examples, speech processing system 658 can also generate outputs that navigate operator 260 through a user experience based on the speech input. For instance, dialog management system 680 may generate and manage a dialog with the user in order to identify what the user wishes to do. The dialog may disambiguate a user's command; identify one or more specific values that are needed to carry out the user's command; or obtain other information from the user or provide other information to the user or both. Synthesis component 676 may generate speech synthesis which can be presented to the user through an audio operator interface mechanism, such as a speaker. Thus, the dialog managed by dialog management system 680 may be exclusively a spoken dialog or a combination of both a visual dialog and a spoken dialog.

Action signal generator 660 generates action signals to control operator interface mechanisms 218 based upon outputs from one or more of operator input command processing system 654, other controller interaction system 656, and speech processing system 658. Visual control signal generator 684 generates control signals to control visual items in operator interface mechanisms 218. The visual items may be lights, a display screen, warning indicators, or other visual items. Audio control signal generator 686 generates outputs that control audio elements of operator interface mechanisms 218. The audio elements include a speaker, audible alert mechanisms, horns, or other audible elements. Haptic control signal generator 688 generates control signals that are output to control haptic elements of operator interface mechanisms 218. The haptic elements include vibration elements that may be used to vibrate, for example, the operator's seat, the steering wheel, pedals, or joysticks used by the operator. The haptic elements may include tactile feedback or force feedback elements that provide tactile feedback or force feedback to the operator through operator interface mechanisms. The haptic elements may include a wide variety of other haptic elements as well.

Figure 13:
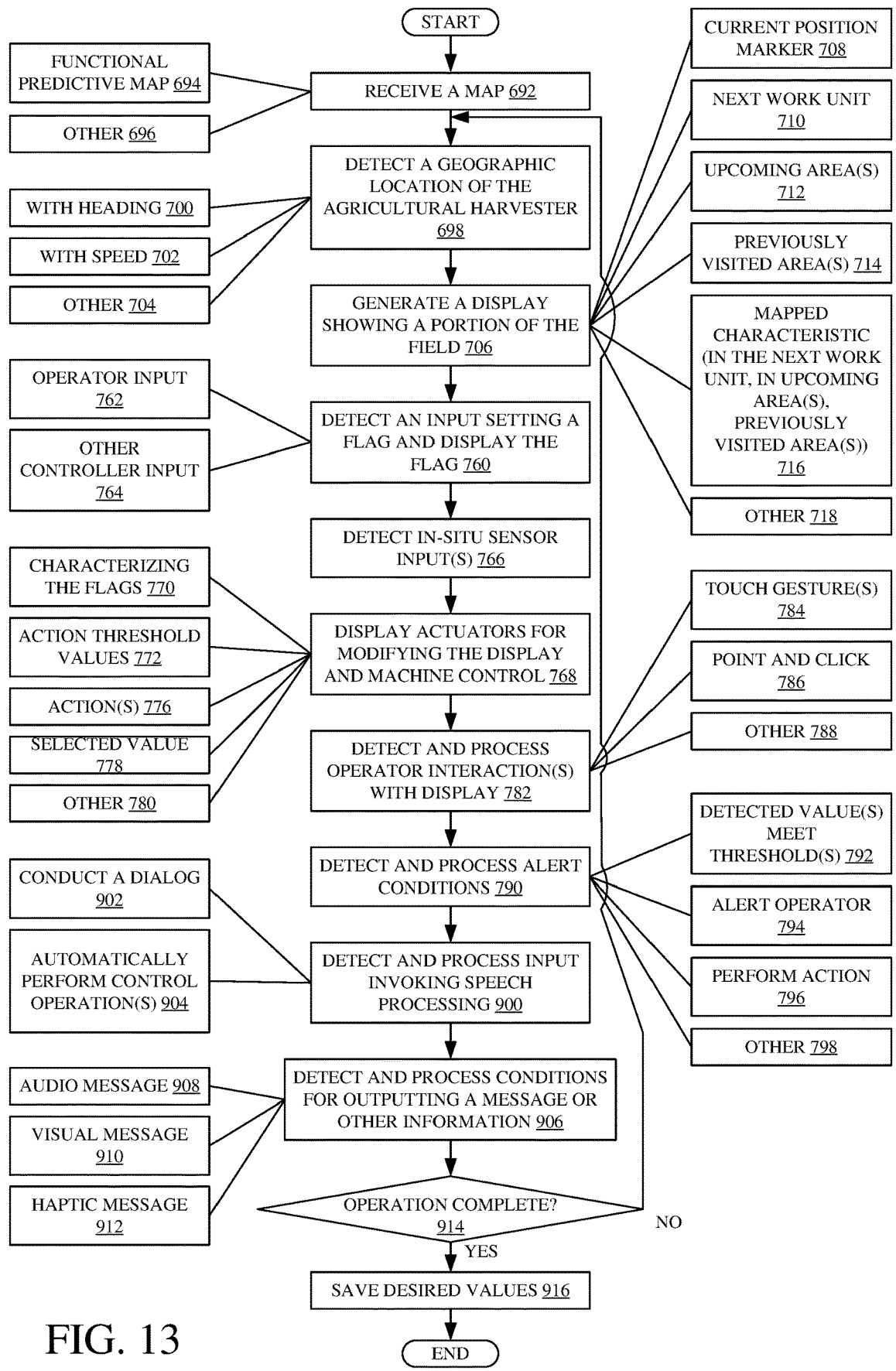
FIG. 13 is a flow diagram illustrating one example of the operation of an operator interface controller.

FIG. 13 is a flow diagram illustrating one example of the operation of operator interface controller 231 in generating an operator interface display on an operator interface mechanism 218, which can include a touch sensitive display screen. FIG. 13 also illustrates one example of how operator interface controller 231 can detect and process operator interactions with the touch sensitive display screen.

At block 692, operator interface controller 231 receives a map. Block 694 indicates an example in which the map is a functional predictive map, and block 696 indicates an example in which the map is another type of map. At block 698, operator interface controller 231 receives an input from geographic position sensor 204 identifying the geographic location of the agricultural harvester 100. As indicated in block 700, the input from geographic position sensor 204 can include the heading, along with the location, of agricultural harvester 100. Block 702 indicates an example in which the input from geographic position sensor 204 includes the speed of agricultural harvester 100, and block 704 indicates an example in which the input from geographic position sensor 204 includes other items.

At block 706, visual control signal generator 684 in operator interface controller 231 controls the touch sensitive display screen in operator interface mechanisms 218 to generate a display showing all or a portion of a field represented by the received map. Block 708 indicates that the displayed field can include a current position marker showing a current position of the agricultural harvester 100 relative to the field. Block 710 indicates an example in which the displayed field includes a next work unit marker that identifies a next work unit (or area on the field) in which agricultural harvester 100 will be operating. Block 712 indicates an example in which the displayed field includes an upcoming area display portion that displays areas that are yet to be processed by agricultural harvester 100, and block 714 indicates an example in which the displayed field includes previously visited display portions that represent areas of the field that agricultural harvester 100 has already processed. Block 716 indicates an example in which the displayed field displays various characteristics of the field having georeferenced locations on the map. For instance, if the received map is a predictive stalk diameter map, such as functional predictive stalk diameter map 360, the displayed field may show the different stalk diameter values in the field georeferenced within the displayed field. In other examples, the received map may be another one of the maps described herein. Thus, the displayed field may show different characteristic values, such as yield values, vegetative index values, seeding characteristic values, operator command values, as well as various other values, georeferenced within the displayed field. The mapped characteristics can be shown in the previously visited areas (as shown in block 714), in the upcoming areas (as shown in block 712), and in the next work unit (as shown in block 710). Block 718 indicates an example in which the displayed field includes other items as well.

Figure 14:
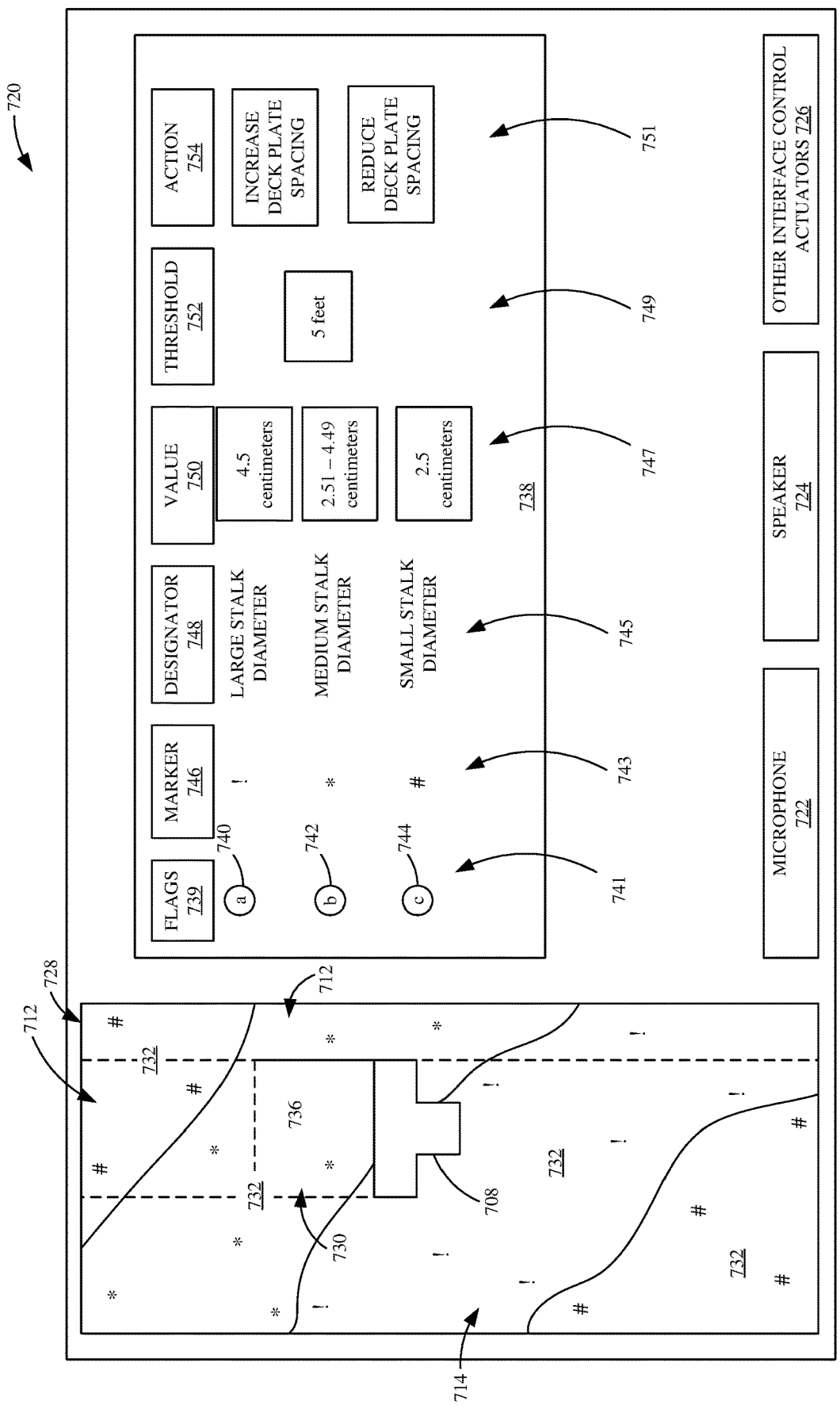
FIG. 14 is a pictorial illustration showing one example of an operator interface display.

FIG. 14 is a pictorial illustration showing one example of a user interface display 720 that can be generated on a touch sensitive display screen. In other implementations, the user interface display 720 may be generated on other types of displays. The touch sensitive display screen may be mounted in the operator compartment of agricultural harvester 100 or on the mobile device or elsewhere. User interface display 720 will be described prior to continuing with the description of the flow diagram shown in FIG. 13.

In the example shown in FIG. 14, user interface display 720 illustrates that the touch sensitive display screen includes a display feature for operating a microphone 722 and a speaker 724. Thus, the touch sensitive display may be communicably coupled to the microphone 722 and the speaker 724. Block 726 indicates that the touch sensitive display screen can include a wide variety of user interface control actuators, such as buttons, keypads, soft keypads, links, icons, switches, etc. The operator 260 can actuator the user interface control actuators to perform various functions.

In the example shown in FIG. 14, user interface display 720 includes a field display portion 728 that displays at least a portion of the field in which the agricultural harvester 100 is operating. The field display portion 728 is shown with a current position marker 708 that corresponds to a current position of agricultural harvester 100 in the portion of the field shown in field display portion 728. In one example, the operator may control the touch sensitive display in order to zoom into portions of field display portion 728 or to pan or scroll the field display portion 728 to show different portions of the field. A next work unit 730 is shown as an area of the field directly in front of the current position marker 708 of agricultural harvester 100. The current position marker 708 may also be configured to identify the direction of travel of agricultural harvester 100, a speed of travel of agricultural harvester 100 or both. In FIG. 14, the shape of the current position marker 708 provides an indication as to the orientation of the agricultural harvester 100 within the field which may be used as an indication of a direction of travel of the agricultural harvester 100.

The size of the next work unit 730 marked on field display portion 728 may vary based upon a wide variety of different criteria. For instance, the size of next work unit 730 may vary based on the speed of travel of agricultural harvester 100. Thus, when the agricultural harvester 100 is traveling faster, then the area of the next work unit 730 may be larger than the area of next work unit 730 if agricultural harvester 100 is traveling more slowly. In another example, the size of the next work unit 730 may vary based on the dimensions of the agricultural harvester 100, including equipment on agricultural harvester 100 (such as header 102). For example, the width of the next work unit 730 may vary based on a width of header 102. Field display portion 728 is also shown displaying previously visited area 714 and upcoming areas 712. Previously visited areas 714 represent areas that are already harvested while upcoming areas 712 represent areas that still need to be harvested. The field display portion 728 is also shown displaying different characteristics of the field. In the example illustrated in FIG. 14, the map that is being displayed is a predictive stalk diameter map, such as functional predictive stalk diameter map 360. Therefore, a plurality of stalk diameter markers are displayed on field display portion 728. There are a set of stalk diameter display markers 732 shown in the already visited areas 714. There are also a set of stalk diameter display markers 732 shown in the upcoming areas 712, and there are a set of stalk diameter display markers 732 shown in the next work unit 730. FIG. 14 shows that the stalk diameter display markers 732 are made up of different symbols that indicate an area of similar stalk diameter. In the example shown in FIG. 14, the ! symbol represents areas of large stalk diameter; the * symbol represents areas of medium stalk diameter; and the # symbol represents an area of small stalk diameter. Thus, the field display portion 728 shows different measured or predicted values (or characteristics indicated by the values) that are located at different areas within the field and represents those measured or predicted values (or characteristics indicated by or derived from the values) with a variety of display markers 732. As shown, the field display portion 728 includes display markers, particularly stalk diameter display markers 732 in the illustrated example of FIG. 14, at particular locations associated with particular locations on the field being displayed. In some instances, each location of the field may have a display marker associated therewith. Thus, in some instances, a display marker may be provided at each location of the field display portion 728 to identify the nature of the characteristic being mapped for each particular location of the field. Consequently, the present disclosure encompasses providing a display marker, such as the stalk diameter display marker 732 (as in the context of the present example of FIG. 14), at one or more locations on the field display portion 728 to identify the nature, degree, etc., of the characteristic being displayed, thereby identifying the characteristic at the corresponding location in the field being displayed. As described earlier, the display markers 732 may be made up of different symbols, and, as described below, the symbols may be any display feature such as different colors, shapes, patterns, intensities, text, icons, or other display features. In some instances, each location of the field may have a display marker associated therewith. Thus, in some instances, a display marker may be provided at each location of the field display portion 728 to identify the nature of the characteristic being mapped for each particular location of the field. Consequently, the present disclosure encompasses providing a display marker, such as the loss level display marker 732 (as in the context of the present example of FIG. 11), at one or more locations on the field display portion 728 to identify the nature, degree, etc., of the characteristic being displayed, thereby identifying the characteristic at the corresponding location in the field being displayed.

In other examples, the map being displayed may be one or more of the maps described herein, including information maps, prior information maps, the functional predictive maps, such as predictive maps or predictive control zone maps, or a combination thereof. Thus, the markers and characteristics being displayed will correlate to the information, data, characteristics, and values provided by the one or more maps being displayed.

In the example of FIG. 14, user interface display 720 also has a control display portion 738. Control display portion 738 allows the operator to view information and to interact with user interface display 720 in various ways.

The actuators and display markers in portion 738 may be displayed as, for example, individual items, fixed lists, scrollable lists, drop down menus, or drop down lists. In the example shown in FIG. 14, display portion 738 shows information for the three different stalk diameter categories that correspond to the three symbols mentioned above. Display portion 738 also includes a set of touch sensitive actuators with which the operator 260 can interact by touch.

For example, the operator 260 may touch the touch sensitive actuators with a finger to activate the respective touch sensitive actuator.

As shown in FIG. 14, display portion 738 includes an interactive flag display portion, indicated generally at 741. Interactive flag display portion 741 includes a flag column 739 that shows flags that have been automatically or manually set. Flag actuator 740 allows operator 260 to mark a location, such as the current location of the agricultural harvester, or another location on the field designated by the operator and add information indicating the characteristic, such as stalk diameter, found at the current location. For instance, when the operator 260 actuates the flag actuator 740 by touching the flag actuator 740, touch gesture handling system 664 in operator interface controller 231 identifies the current location as one where agricultural harvester 100 encountered large stalk diameter. When the operator 260 touches the button 742, touch gesture handling system 664 identifies the current location as a location where agricultural harvester 100 encountered medium stalk diameter. When the operator 260 touches the button 744, touch gesture handling system 664 identifies the current location as a location where agricultural harvester 100 encountered small stalk diameter. Upon actuation of one of the flag actuators 740, 742, or 744, touch gesture handling system 664 can control visual control signal generator 684 to add a symbol corresponding to the identified characteristic on field display portion 728 at a location the user identifies. In this way, areas of the field where the predicted value did not accurately represent an actual value can be marked for later analysis, and can also be used in machine learning. In other examples, the operator may designate areas ahead of or around the agricultural harvester 100 by actuating one of the flag actuators 740, 742, or 744 such that control of the agricultural harvester 100 can be undertaken based on the value designated by the operator 260.

Display portion 738 also includes an interactive marker display portion, indicated generally at 743. Interactive marker display portion 743 includes a symbol column 746 that displays the symbols corresponding to each category of values or characteristics (in the case of FIG. 14, stalk diameter) that is being tracked on the field display portion 728. Display portion 738 also includes an interactive designator display portion, indicated generally at 745. Interactive designator display portion 745 includes a designator column 748 that shows the designator (which may be a textual designator or other designator) identifying the category of values or characteristics (in the case of FIG. 14, stalk diameter). Without limitation, the symbols in symbol column 746 and the designators in designator column 748 can include any display feature such as different colors, shapes, patterns, intensities, text, icons, or other display features, and can be customizable by interaction of an operator of agricultural harvester 100.

Display portion 738 also includes an interactive value display portion, indicated generally at 747. Interactive value display portion 747 includes a value display column 750 that displays selected values. The selected values correspond to the characteristics or values being tracked or displayed, or both, on field display portion 728. The selected values can be selected by an operator of the agricultural harvester 100. The selected values in value display column 750 define a range of values or a value by which other values, such as predicted values, are to be classified. Thus, in the example in FIG. 14, a predicted or measured stalk diameter meeting or greater than 4.5 centimeters is classified as "a large stalk diameter" and a predicted or measured stalk diameter meeting or less than 2.5 centimeters is classified as "small stalk diameter." In some examples, the selected values may include a range, such that a predicted or measured value that is within the range of the selected value will be classified under the corresponding designator. As shown in FIG. 14, "medium stalk diameter" includes a range of 2.51-to-4.49 centimeters such that a measured or predicted stalk diameter value falling within the range of 2.51-to-4.49 centimeters is classified as "medium stalk diameter". The selected values in value display column 750 are adjustable by an operator of agricultural harvester 100. In one example, the operator 260 can select the particular part of field display portion 728 for which the values in column 750 are to be displayed. Thus, the values in column 750 can correspond to values in display portions 712, 714 or 730.

Display portion 738 also includes an interactive threshold display portion, indicated generally at 749. Interactive threshold display portion 749 includes a threshold value display column 752 that displays action threshold values. Action threshold values in column 752 may be threshold values corresponding to the selected values in value display column 750. If the predicted or measured values of characteristics being tracked or displayed, or both, satisfy the corresponding action threshold values in threshold value display column 752, then control system 214 takes the action identified in column 754. In some instances, a measured or predicted value may satisfy a corresponding action threshold value by meeting or exceeding the corresponding action threshold value. In one example, operator 260 can select a threshold value, for example, in order to change the threshold value by touching the threshold value in threshold value display column 752. Once selected, the operator 260 may change the threshold value. The threshold values in column 752 can be configured such that the designated action is performed when the measured or predicted value of the characteristic exceeds the threshold value, equals the threshold value, or is less than the threshold value. In some instances, the threshold value may represent a range of values, or range of deviation from the selected values in value display column 750, such that a predicted or measured characteristic value that meets or falls within the range satisfies the threshold value. For instance, in the example of stalk diameters, a predicted stalk diameter that falls within 10% of 4.5 centimeters will satisfy the corresponding action threshold value (of within 10% of 4.5 centimeters) and an action, such as increasing the deck plate spacing, will be taken by control system 214. In other examples, the threshold values in column threshold value display column 752 are separate from the selected values in value display column 750, such that the values in value display column 750 define the classification and display of predicted or measured values, while the action threshold values define when an action is to be taken based on the measured or predicted values. For example, while a predicted or measured stalk diameter of 3.5 centimeters may be designated as a "medium stalk diameter" for purposes of classification and display, the action threshold value may be 3.6 centimeters such that no action will be taken until the stalk diameter satisfies the threshold value. In other examples, the threshold values in threshold value display column 752 may include distances or times. For instance, in the example of a distance, the threshold value may be a threshold distance from the area of the field where the measured or predicted value is georeferenced that the agricultural harvester 100 must be before an action is taken. For example, a threshold distance value of 5 feet would mean that an action will be taken when the agricultural harvester is at or within 5 feet of the area of the field where the measured or predicted value is georeferenced. In an example where the threshold value is time, the threshold value may be a threshold time for the agricultural harvester 100 to reach the area of the field where the measured or predictive value is georeferenced. For instance, a threshold value of 5 seconds would mean that an action will be taken when the agricultural harvester 100 is 5 seconds away from the area of the field where the measured or predicted value is georeferenced. In such an example, the current location and travel speed of the agricultural harvester can be accounted for.

Display portion 738 also includes an interactive action display portion, indicated generally at 751. Interactive action display portion 751 includes an action display column 754 that displays action identifiers that indicate actions to be taken when a predicted or measured value satisfies an action threshold value in threshold value display column 752. Operator 260 can touch the action identifiers in column 754 to change the action that is to be taken. When a threshold is satisfied, an action may be taken. For instance, at the bottom of column 754, an increase deck plate spacing action and a reduce deck plate spacing action are identified as actions that will be taken if the measured or predicted value meets the threshold value in column 752. In some examples, when a threshold is met, multiple actions may be taken. For instance, a deck plate spacing may be adjusted, a power output to the stalk processing components (e.g., stalk rolls, gathering chains, etc.) may be adjusted, and a speed of the agricultural machine may be adjusted. These are merely some examples.

The actions that can be set in column 754 can be any of a wide variety of different types of actions. For example, the actions can include a keep out action which, when executed, inhibits agricultural harvester 100 from further harvesting in an area. The actions can include a speed change action which, when executed, changes the travel speed of agricultural harvester 100 through the field. The actions can include a setting change action for changing a setting of an internal actuator or another WMA or set of WMAs or for implementing a settings change action that changes a setting, such as the deck plate spacing, of one or more sets of deck plates of the header, along with various other settings. These are examples only, and a wide variety of other actions are contemplated herein.

The items shown on user interface display 720 can be visually controlled. Visually controlling the interface display 720 may be performed to capture the attention of operator 260. For instance, the items can be controlled to modify the intensity, color, or pattern with which the items are displayed. Additionally, the items may be controlled to flash. The described alterations to the visual appearance of the items are provided as examples. Consequently, other aspects of the visual appearance of the items may be altered. Therefore, the items can be modified under various circumstances in a desired manner in order, for example, to capture the attention of operator 260. Additionally, while a particular number of items are shown on user interface display 720, this need not be the case. In other examples, more or less items, including more or less of a particular item can be included on user interface display 720.

Returning now to the flow diagram of FIG. 13, the description of the operation of operator interface controller 231 continues. At block 760, operator interface controller 231 detects an input setting a flag and controls the touch sensitive user interface display 720 to display the flag on field display portion 728. The detected input may be an operator input, as indicated at 762, or an input from another controller, as indicated at 764. At block 766, operator interface controller 231 detects an in-situ sensor input indicative of a measured characteristic of the field from one of the in-situ sensors 208. At block 768, visual control signal generator 684 generates control signals to control user interface display 720 to display actuators for modifying user interface display 720 and for modifying machine control. For instance, block 770 represents that one or more of the actuators for setting or modifying the values in columns 739, 746, and 748 can be displayed. Thus, the user can set flags and modify characteristics of those flags. For example, a user can modify the stalk diameter levels and stalk diameter designators corresponding to the flags. Block 772 represents that action threshold values in column 752 are displayed. Block 776 represents that the actions in column 754 are displayed, and block 778 represents that the selected values in column 750 is displayed. Block 780 indicates that a wide variety of other information and actuators can be displayed on user interface display 720 as well.

At block 782, operator input command processing system 654 detects and processes operator inputs corresponding to interactions with the user interface display 720 performed by the operator 260. Where the user interface mechanism on which user interface display 720 is displayed is a touch sensitive display screen, interaction inputs with the touch sensitive display screen by the operator 260 can be touch gestures 784. In some instances, the operator interaction inputs can be inputs using a point and click device 786 or other operator interaction inputs 788.

At block 790, operator interface controller 231 receives signals indicative of an alert condition. For instance, block 792 indicates that signals may be received by controller input processing system 668 indicating that detected or predicted values satisfy threshold conditions present in column 752. As explained earlier, the threshold conditions may include values being below a threshold, at a threshold, or above a threshold. Block 794 shows that action signal generator 660 can, in response to receiving an alert condition, alert the operator 260 by using visual control signal generator 684 to generate visual alerts, by using audio control signal generator 686 to generate audio alerts, by using haptic control signal generator 688 to generate haptic alerts, or by using any combination of these. Similarly, as indicated by block 796, controller output generator 670 can generate outputs to other controllers in control system 214 so that those controllers perform the corresponding action identified in column 754. Block 798 shows that operator interface controller 231 can detect and process alert conditions in other ways as well.

Block 900 shows that speech handling system 662 may detect and process inputs invoking speech processing system 658. Block 902 shows that performing speech processing may include the use of dialog management system 680 to conduct a dialog with the operator 260. Block 904 shows that the speech processing may include providing signals to controller output generator 670 so that control operations are automatically performed based upon the speech inputs.

Table 1, below, shows an example of a dialog between operator interface controller 231 and operator 260. In Table 1, operator 260 uses a trigger word or a wakeup word that is detected by trigger detector 672 to invoke speech processing system 658. In the example shown in Table 1, the wakeup word is "Johnny"

TABLE 1

Operator: "Johnny, tell me about current stalk diameter values."
Operator Interface Controller: "At the current location the stalk diameters are large."
Operator: "Johnny, what should I do because of stalk diameter levels."
Operator Interface Controller: "Increase deck plate spacing on header."

Table 2 shows an example in which speech synthesis component 676 provides an output to audio control signal generator 686 to provide audible updates on an intermittent or periodic basis. The interval between updates may be time-based (such as every five minutes), or coverage or distance-based (such as every five acres), or exception-based (such as when a measured value is greater than a threshold value).

TABLE 2

Operator Interface Controller: "Over last 10 minutes, operation has been on medium stalk diameter level areas 95% of the time."
Operator Interface Controller: "Next 1 acre comprises 66% medium stalk diameter levels and 33% small stalk diameter levels."
Operator Interface Controller: "Warning: Now approaching large stalk diameter area. Adjust deck plate spacing."
Operator Interface Controller: "Caution: Approaching small stalk diameter level area, adjust deck plate spacing."

The example shown in Table 3 illustrates that some actuators or user input mechanisms on the touch sensitive display 720 can be supplemented with speech dialog. The example in Table 3 illustrates that action signal generator 660 can generate action signals to automatically mark a large stalk diameter level area in the field being harvested.

TABLE 3

| |
|---|
| Human: "Johnny, mark large stalk diameter level area." |
| Operator Interface Controller: "Large stalk diameter level area marked." |

The example shown in Table 4 illustrates that action signal generator 660 can conduct a dialog with operator 260 to begin and end marking of a large stalk diameter level area.

TABLE 4

| |
|---|
| Human: "Johnny, start marking large stalk diameter level area." |
| Operator Interface Controller: "Marking large stalk diameter level area." |
| Human: "Johnny, stop marking large stalk diameter level area." |
| Operator Interface Controller: "Large stalk diameter level area marking stopped." |

The example shown in Table 5 illustrates that action signal generator 160 can generate signals to mark a stalk diameter level area in a different way than those shown in Tables 3 and 4.

TABLE 5

| |
|---|
| Human: "Johnny, mark next 100 feet as large stalk diameter level area." |
| Operator Interface Controller: "Next 100 feet marked as large stalk diameter level area." |

Returning again to FIG. 13, block 906 illustrates that operator interface controller 231 can detect and process conditions for outputting a message or other information in other ways as well. For instance, other controller interaction system 656 can detect inputs from other controllers indicating that alerts or output messages should be presented to operator 260. Block 908 shows that the outputs can be audio messages. Block 910 shows that the outputs can be visual messages, and block 912 shows that the outputs can be haptic messages. Until operator interface controller 231 determines that the current harvesting operation is completed, as indicated by block 914, processing reverts to block 698 where the geographic location of harvester 100 is updated and processing proceeds as described above to update user interface display 720.

Once the operation is complete, then any desired values that are displayed, or have been displayed on user interface display 720, can be saved. Those values can also be used in machine learning to improve different portions of predictive model generator 210, predictive map generator 212, control zone generator 213, control algorithms, or other items. Saving the desired values is indicated by block 916. The values can be saved locally on agricultural harvester 100, or the values can be saved at a remote server location or sent to another remote system.

It can thus be seen that one or more maps are obtained by an agricultural harvester that show agricultural characteristic values at different geographic locations of a field being harvested. An in-situ sensor on the harvester senses a characteristic that has values indicative of an agricultural characteristic, such as a stalk diameter or an operator command as the agricultural harvester moves through the field. A predictive map generator generates a predictive map that predicts control values for different locations in the field based on the values in the prior information map and the agricultural characteristic sensed by the in-situ sensor. A control system controls controllable subsystem based on the control values in the predictive map.

A control value is a value upon which an action can be based. A control value, as described herein, can include any value (or characteristics indicated by or derived from the value) that may be used in the control of agricultural harvester 100. A control value can be any value indicative of an agricultural characteristic. A control value can be a predicted value, a measured value, or a detected value. A control value may include any of the values provided by a map, such as any of the maps described herein, for instance, a control value can be a value provided by an information map, a value provided by prior information map, or a value provided predictive map, such as a functional predictive map. A control value can also include any of the values (or characteristics indicated by or derived from the values) detected by any of the sensors described herein. In other examples, a control value can be provided by an operator of the agricultural machine, such as a command input by an operator of the agricultural machine.

The present discussion has mentioned processors and servers. In some examples, the processors and servers include computer processors with associated memory and timing circuitry, not separately shown. The processors and servers are functional parts of the systems or devices to which the processors and servers belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, the user actuatable operator interface mechanisms can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic, and interactions. It will be appreciated that any or all of such systems, components, logic and interactions may be implemented by hardware items, such as processors, memory, or other processing components, some of which are described below, that perform the functions associated with those systems, components, logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 15:
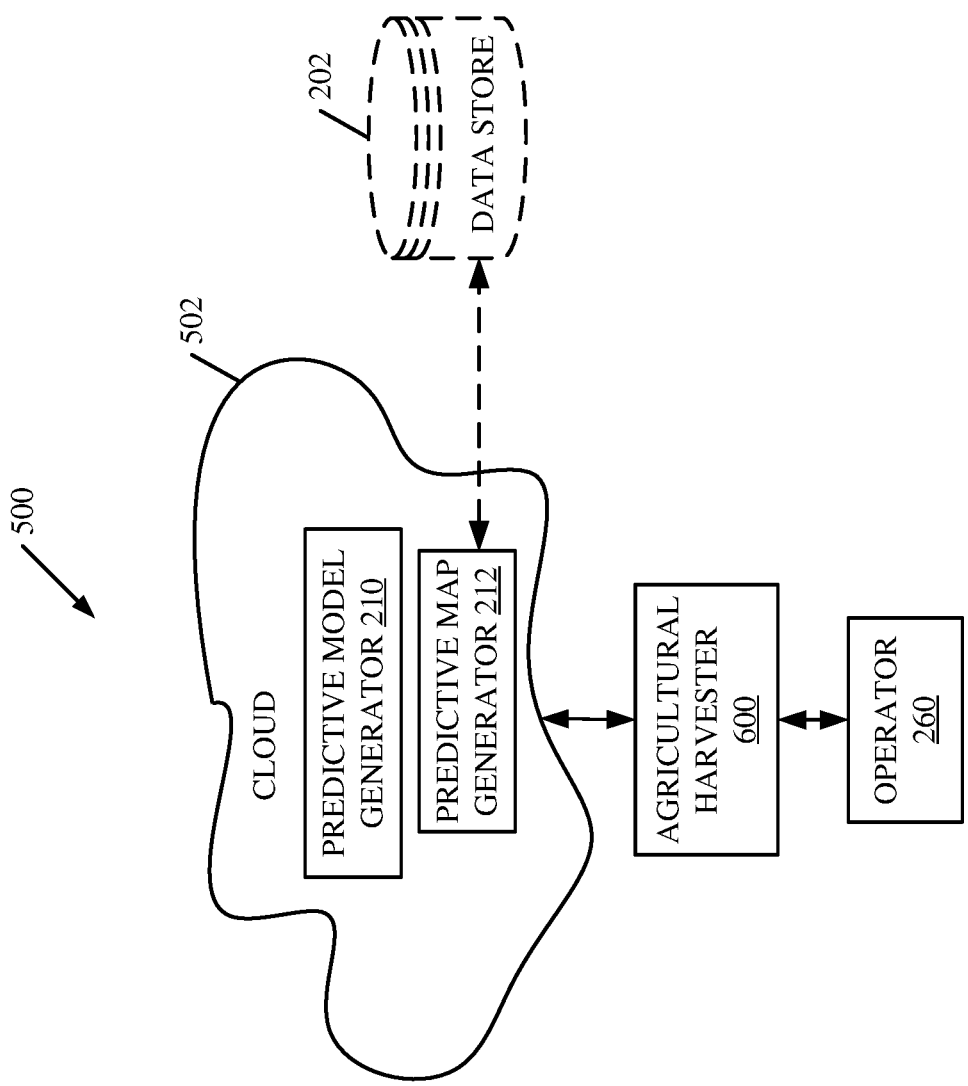
FIG. 15 is a block diagram showing one example of an agricultural harvester in communication with a remote server environment.

FIG. 15 is a block diagram of agricultural harvester 600, which may be similar to agricultural harvester 100 shown in FIG. 2. The agricultural harvester 600 communicates with elements in a remote server architecture 500. In some examples, remote server architecture 500 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 2 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 15, some items are similar to those shown in FIG. 2 and those items are similarly numbered. FIG. 15 specifically shows that predictive model generator 210 or predictive map generator 212, or both, may be located at a server location 502 that is remote from the agricultural harvester 600. Therefore, in the example shown in FIG. 15, agricultural harvester 600 accesses systems through remote server location 502.

FIG. 15 also depicts another example of a remote server architecture. FIG. 15 shows that some elements of FIG. 2 may be disposed at a remote server location 502 while others may be located elsewhere. By way of example, data store 202 may be disposed at a location separate from location 502 and accessed via the remote server at location 502. Regardless of where the elements are located, the elements can be accessed directly by agricultural harvester 600 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users, or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated, or manual information collection system. As the combine harvester 600 comes close to the machine containing the information collection system, such as a fuel truck prior to fueling, the information collection system collects the information from the combine harvester 600 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the agricultural harvester 600 until the agricultural harvester 600 enters an area having wireless communication coverage. The agricultural harvester 600, itself, may send the information to another network.

It will also be noted that the elements of FIG. 2, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 500 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 16:
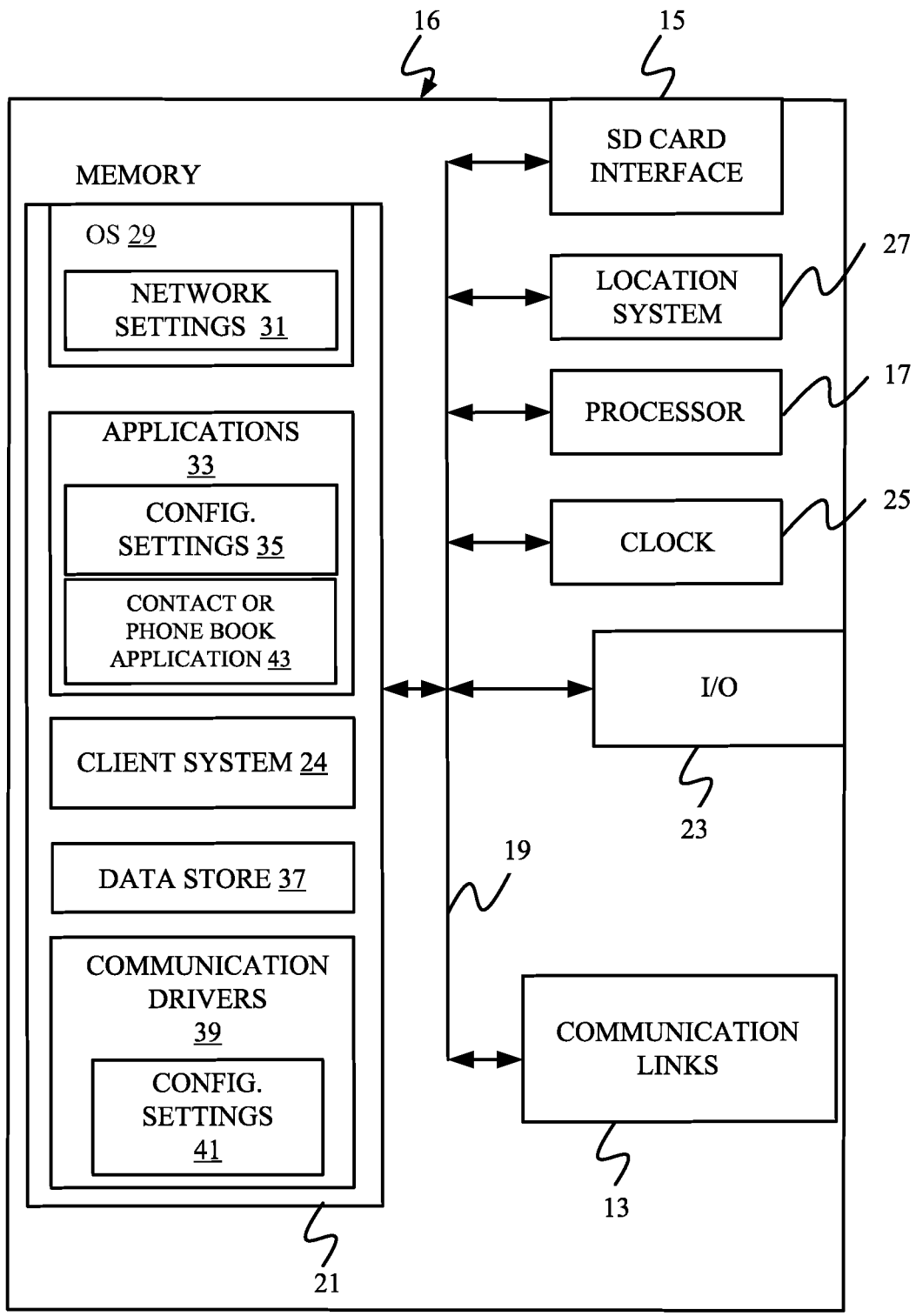
FIGS. 16-18 show examples of mobile devices that can be used in an agricultural harvester.
Figure 17:
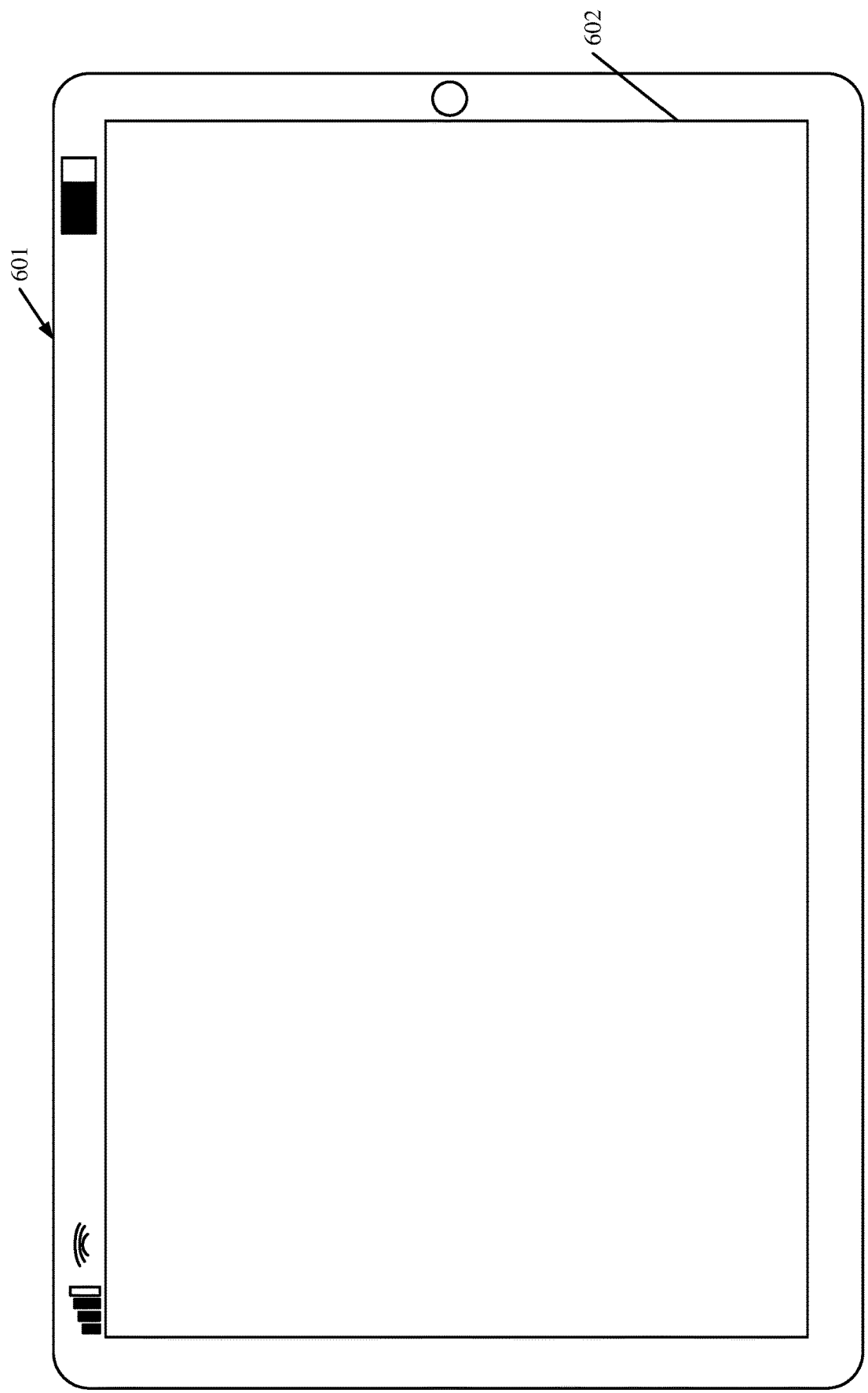
Figure 18:
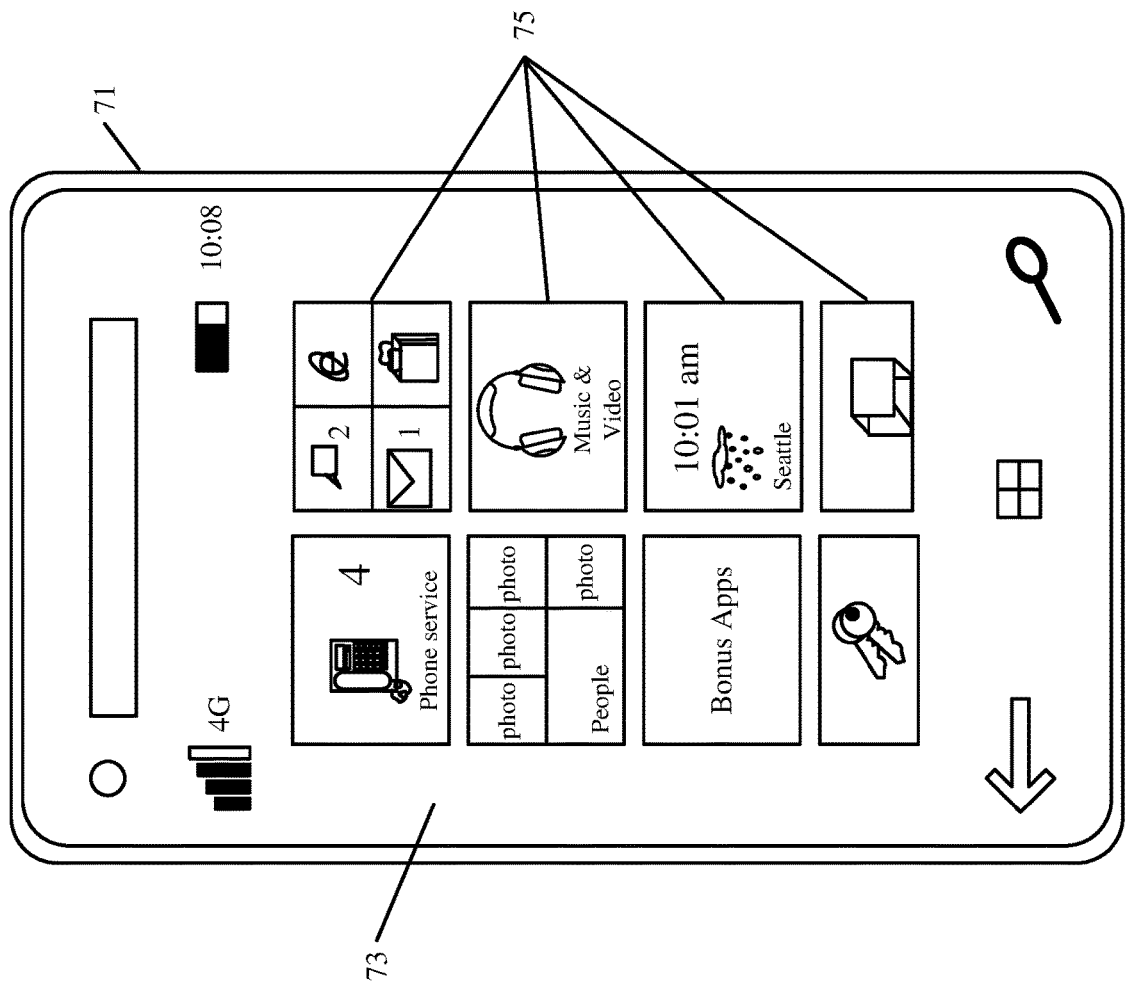

FIG. 16 is a simplified block diagram of one illustrative example of a handheld or mobile computing device that can be used as a user's or client's hand held device 16, in which the present system (or parts of it) can be deployed. For instance, a mobile device can be deployed in the operator compartment of agricultural harvester 100 for use in generating, processing, or displaying the maps discussed above. FIGS. 17-18 are examples of handheld or mobile devices.

FIG. 16 provides a general block diagram of the components of a client device 16 that can run some components shown in FIG. 2, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 17 shows one example in which device 16 is a tablet computer 600. In FIG. 17, computer 600 is shown with user interface display screen 602. Screen 602 can be a touch screen or a pen-enabled interface that receives inputs from a pen or stylus. Tablet computer 600 may also use an on-screen virtual keyboard. Of course, computer 600 might also be attached to a keyboard or other user input device through a suitable attachment mechanism, such as a wireless link or USB port, for instance. Computer 600 may also illustratively receive voice inputs as well.

FIG. 18 is similar to FIG. 8 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 19:
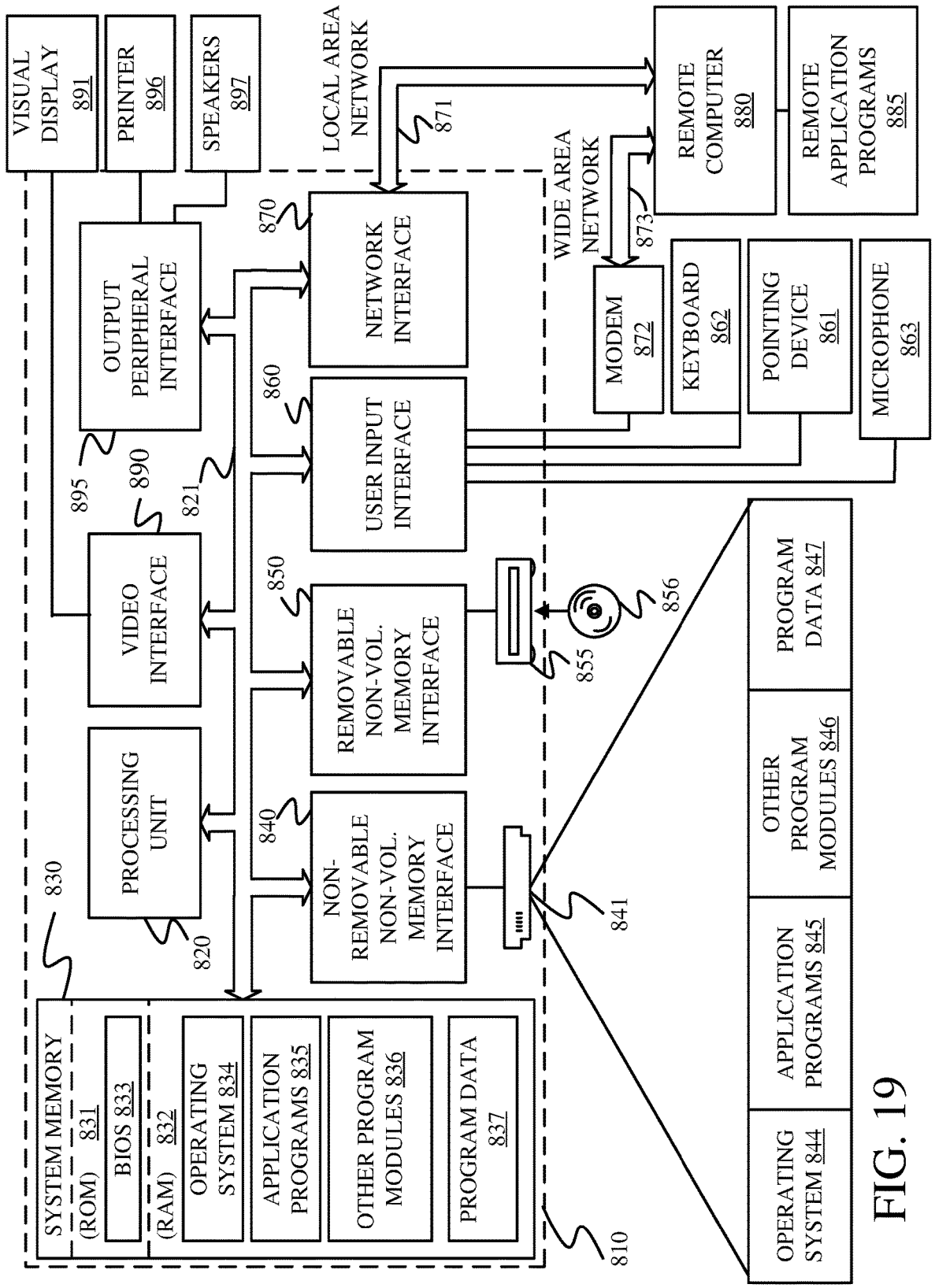
FIG. 19 is a block diagram showing one example of a computing environment that can be used in an agricultural harvester and the architectures illustrated in previous figures.

FIG. 19 is one example of a computing environment in which elements of FIG. 2 can be deployed. With reference to FIG. 19, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 19.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 19 illustrates operating system 834, application programs 835, other program modules 836, and program data 837.

The computer 810 may also include other removable/non-removable volatile/nonvolatile computer storage media. By way of example only, FIG. 19 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 19, provide storage of computer readable instructions, data structures, program modules and other data for the computer 810. In FIG. 19, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 19 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is an agricultural work machine comprising:
a communication system that receives a map that includes values of an agricultural characteristic corresponding to different geographic locations in a field;
a geographic position sensor that detects a geographic location of the agricultural work machine;
an in-situ sensor that detects a value of a stalk diameter corresponding to the geographic location;
a predictive map generator that generates a functional predictive map of the field that maps predictive control values to the different geographic locations in the field based on the values of the agricultural characteristic in the map and based on the value of the stalk diameter;
a controllable subsystem; and
a control system that generates a control signal to control the controllable subsystem based on the geographic position of the agricultural work machine and based on the predictive control values in the functional predictive map.

Example 2 is the agricultural work machine of any or all previous examples, wherein the predictive map generator comprises:
a predictive stalk diameter map generator that generates, as the functional predictive map, a functional predictive stalk diameter map that maps predictive stalk diameters, as the predictive control values, to the different geographic locations in the field.

Example 3 is the agricultural work machine of any or all previous examples, wherein the control system comprises:
a deck plate position controller that generates a deck plate position control signal based on the detected geographic location and the functional predictive stalk diameter map and controls the controllable subsystem based on the deck plate position control signal to control a spacing between an at least one set of deck plates on the agricultural work machine.

Example 4 is the agricultural work machine of any or all previous examples, wherein the predictive map generator comprises:
a predictive operator command map generator that generates, as the functional predictive map, a functional predictive operator command map that maps predictive operator commands, as the predictive control values, to the different geographic locations in the field.

Example 5 is the agricultural work machine of any or all previous examples, wherein the control system comprises:
a settings controller that generates an operator command control signal indicative of an operator command based on the detected geographic location and the functional predictive operator command map and controls the controllable subsystem based on the operator command control signal to execute the operator command.

Example 6 is the agricultural work machine of any or all previous examples and further comprising:
a predictive model generator that generates a predictive model that models a relationship between the agricultural characteristic and the stalk diameter based on the value of the agricultural characteristic in the map at the geographic location and the value of the stalk diameter detected by the in-situ sensor corresponding to the geographic location, wherein the predictive map generator generates the functional predictive map based on the values of the agricultural characteristic in the map and based on the predictive model.

Example 7 is the agricultural work machine of any or all previous examples, wherein the map is a vegetative index map that includes, as values of the agricultural characteristic, values of a vegetative index characteristic, and further comprising:
  a predictive model generator that generates a predictive model that models a relationship between the vegetative index characteristic and the stalk diameter based on the value of the vegetative index characteristic in the vegetative index map at the geographic location and the value of the stalk diameter detected by the in-situ sensor corresponding to the geographic location,
  wherein the predictive map generator generates the functional predictive map based on the values of the vegetative index characteristic in the vegetative index map and based on the predictive model.

Example 8 is the agricultural work machine of any or all previous examples, wherein the map is a yield map that includes, as values of the agricultural characteristic, values of a yield characteristic, and further comprising:
  a predictive model generator that generates a predictive model that models a relationship between the yield characteristic and the stalk diameter based on the value of the yield characteristic in the yield map at the geographic location and the value of the stalk diameter detected by the in-situ sensor corresponding to the geographic location,
  wherein the predictive map generator generates the functional predictive map based on the values of the yield characteristic in the yield map and based on the predictive model.

Example 9 is the agricultural work machine of any or all previous examples, wherein the map is a seeding map that includes, as values of the agricultural characteristic, values of a seeding characteristic, and further comprising:
  a predictive model generator that generates a predictive model that models a relationship between the seeding characteristic and the stalk diameter based on the value of the seeding characteristic in the seeding map at the geographic location and the value of the stalk diameter detected by the in-situ sensor corresponding to the geographic location,
  wherein the predictive map generator generates the functional predictive map based on the values of the seeding characteristic in the seeding map and based on the predictive model.

Example 10 is the agricultural work machine of any or all previous examples, wherein the control system further comprises:
  an operator interface controller that generates a user interface map representation of the functional predictive map, the user interface map representation comprising a field portion with one or more markers indicting the predictive control values at one or more geographic locations on the field portion.

Example 11 is a computer implemented method of controlling an agricultural work machine comprising:
  obtaining a map that includes values of an agricultural characteristic corresponding to different geographic locations in a field;
  detecting a geographic location of the agricultural work machine;
  detecting, with an in-situ sensor, a value of a stalk diameter corresponding to the geographic location;
  generating a functional predictive map of field that maps predictive control values to the different geographic locations in the field based on the values of the agricultural characteristic in the map and based on the value of the stalk diameter; and
  controlling a controllable subsystem based on the geographic position of the agricultural work machine and based on the predictive control values in the functional predictive map.

Example 12 is the computer implemented method of any or all previous examples, wherein generating a functional predictive map comprises:
  generating a functional predictive stalk diameter map that maps predictive stalk diameters to the different geographic locations in the field.

Example 13 is the computer implemented method of any or all previous examples, wherein controlling a controllable subsystem comprises:
  generating a deck plate position control signal based on the detected geographic location and the functional predictive stalk diameter map; and
  controlling the controllable subsystem based on the deck plate position control signal to control a spacing between an at least one set of deck plates on the agricultural work machine.

Example 14 is the computer implemented method of any or all previous examples, wherein generating a functional predictive map comprises:
  generating a functional predictive operator command map that maps predictive operator commands to the different geographic locations in the field.

Example 15 is the computer implemented method of any or all previous examples, wherein controlling the controllable subsystem comprises:
  generating an operator command control signal indicative of an operator command based on the detected geographic location and the functional predictive operator command map; and
  controlling the controllable subsystem based on the operator command control signal to execute the operator command.

Example 16 is the computer implemented method of any or all previous examples, wherein the map is a vegetative index map that includes, as values of the agricultural characteristic, values of a vegetative index characteristic, and further comprising:
  generating a predictive model that models a relationship between the vegetative index characteristic and the stalk diameter based on the value of the vegetative index characteristic in the vegetative index map at the geographic location and the value of the stalk diameter detected by the in-situ sensor corresponding to the geographic location,
  wherein generating the functional predictive map comprises generating the functional predictive map based on the values of the vegetative index characteristic in the vegetative index map and based on the predictive model.

Example 17 is the computer implemented method of any or all previous examples, wherein the map is a yield map that includes, as values of the agricultural characteristic, values of a yield characteristic, and further comprising:
  generating a predictive model that models a relationship between the yield characteristic and the stalk diameter based on the value of the yield characteristic in the yield map at the geographic location and the value of the stalk diameter detected by the in-situ sensor corresponding to the geographic location, wherein generating the functional predictive map comprises generating the functional predictive map based on the values of the yield characteristic in the yield map and based on the predictive model.

Example 18 is the computer implemented method of any or all previous examples, wherein the map is a seeding map that includes, as values of the agricultural characteristic, values of a seeding characteristic, and further comprising:

generating a predictive model that models a relationship between the seeding characteristic and the stalk diameter based on the value of the seeding characteristic in the seeding map at the geographic location and the value of the stalk diameter detected by the in-situ sensor corresponding to the geographic location, wherein generating the functional predictive map comprises generating the functional predictive map based on the values of the seeding characteristic in the seeding map and based on the predictive model.

Example 19 is an agricultural work machine comprising:

a communication system that receives a map that includes values of an agricultural characteristic corresponding to different geographic locations in a field;

a geographic position sensor that detects a geographic location of the agricultural work machine;

an in-situ sensor that detects a value of a stalk diameter corresponding to the geographic location;

a predictive model generator that generates a predictive model that models a relationship between the agricultural characteristic and the stalk diameter based on a value of the agricultural characteristic in the map at the geographic location and the value of the stalk diameter detected by the in-situ sensor corresponding to the geographic;

a predictive map generator that generates a functional predictive map of the field that maps predictive control values to the different geographic locations in the field based on the values of the agricultural characteristic in the map and based on the predictive model;

a controllable subsystem; and a control system that generates a control signal to control the controllable subsystem based on the geographic position of the agricultural work machine and based on the predictive control values in the functional predictive map.

Example 20 is the agricultural work machine of any or all previous examples, wherein the control system comprises:

a deck plate position controller that generates a deck plate position control signal based on the geographic location of the agricultural work machine and the functional predictive map and controls the controllable subsystem based on the deck plate position control signal to control a spacing between a set of deck plates on the agricultural work machine.

Although the subject matter has been described in language specific to structural features or methodological acts, it is to be understood that the subject matter defined in the appended claims is not necessarily limited to the specific features or acts described above. Rather, the specific features and acts described above are disclosed as example forms of the claims.

What is claimed is:

1. An agricultural system comprising:
a controllable subsystem;
a communication system that receives a map that includes values of an agricultural characteristic corresponding to different geographic locations in a field;
a geographic position sensor that detects a geographic location of the agricultural work machine;
an in-situ sensor that detects a stalk diameter value corresponding to a first geographic location;
one or more processors; and
a data store that stores a set of computer executable instructions that, when executed by the one or more processors, configure the one or more processors to:
predict a predictive stalk diameter value corresponding to a second geographic location in the field, different than the first geographic location to which the detected stalk diameter value corresponds, based on the detected stalk diameter value corresponding to the first geographic location and based on a value of the agricultural characteristic in the map corresponding to the first geographic location to which the detected stalk diameter value corresponds; and
generate a control signal to control the controllable subsystem based on the detected geographic location of the agricultural work machine and based on the predictive stalk diameter value.

2. The agricultural system of claim 1, wherein the controllable subsystem comprises an actuator that controls a spacing of an at least one set of deck plates on the agricultural work machine.

3. The agricultural system of claim 1 and further comprising an operator input sensor that detects an operator input command value corresponding to the second geographic location to which the predictive stalk diameter value corresponds, wherein the computer executable instructions, when executed by the one or more processors, further configure the one or more processors to:
predict a predictive operator input command value corresponding to a third geographic location, different than the second geographic location to which the detected operator input command value corresponds, based on the predictive stalk diameter value corresponding to the second geographic location and based on the detected operator input command value corresponding to the second geographic location to which the predictive stalk diameter value corresponds.

4. The agricultural system of claim 3, wherein the detected operator input command value is indicative of an operator input deck plate spacing setting corresponding to the second geographic location and wherein the predictive operator input command value is indicative of a predictive operator input deck plate spacing setting corresponding to the third geographic location.

5. The agricultural system of claim 3, wherein the computer executable instructions, when executed by the one or more processors, further configure the one or more processors to generate the control signal to control the controllable subsystem based on the predictive operator input command value.

6. The agricultural work machine of claim 1, wherein the set of computer executable instructions, when executed by the one or more processors, further configure the one or more processors to:
identify a relationship between stalk diameter and the agricultural characteristic based on the detected stalk diameter value corresponding to the first geographic location and the value of the agricultural characteristic in the map corresponding to the first geographic location to which the detected stalk diameter value corresponds; and predict the predictive stalk diameter value corresponding to the second geographic location based on a value of the agricultural characteristic in the map corresponding to the second geographic location and based on the identified relationship.

7. The agricultural work machine of claim 1, wherein the map is a vegetative index map that includes, as the values of the agricultural characteristic, vegetative index values, and wherein the set of computer executable instructions, when executed by the one or more processors, further configure the one or processors to:

identify a relationship between stalk diameter and vegetative index based on the detected stalk diameter value corresponding to the first geographic location and a vegetative index value in the vegetative index map corresponding to the first geographic location to which the detected stalk diameter value corresponds; and predict the predictive stalk diameter value corresponding to the second geographic location based on a vegetative index value in the vegetative index map corresponding to the second geographic location and based on the identified relationship.

8. The agricultural work machine of claim 1, wherein the map is a yield map that includes, as the values of the agricultural characteristic, yield values, and wherein the set of computer executable instructions, when executed by the one or more processors, further configure the one or processors to:

identify a relationship between stalk diameter and yield based on the detected stalk diameter value corresponding to the first geographic location and a yield value in the yield map corresponding to the first geographic location to which the detected stalk diameter value corresponds; and predict the predictive stalk diameter value corresponding to the second geographic location based on a yield value in the yield map corresponding to the second geographic location and based on the identified relationship.

9. The agricultural work machine of claim 1, wherein the map is a seeding map that includes, as the values of the agricultural characteristic, values of a seeding characteristic, and wherein the set of computer executable instructions, when executed by the one or more processors, further configure the one or processors to:

identify a relationship between stalk diameter and the seeding characteristic based on the detected stalk diameter value corresponding to the first geographic location and a value of the seeding characteristic in the seeding map corresponding to the first geographic location to which the detected stalk diameter value corresponds; and predict the predictive stalk diameter value corresponding to the second geographic location based on a value of the seeding characteristic in the seeding map corresponding to the second geographic location and based on the identified relationship.

10. A computer implemented method of controlling an agricultural work machine comprising:

obtaining a map that includes values of an agricultural characteristic corresponding to different geographic locations in a field;

detecting a geographic location of the agricultural work machine;

detecting, with an in-situ sensor, a stalk diameter value corresponding to a first geographic location;

predicting a predictive stalk diameter value corresponding to a second geographic location in the field, different than the first geographic location to which the detected stalk diameter value corresponds, based on the detected stalk diameter value corresponding to the first geographic location and based on a value of the agricultural characteristic in the map corresponding to the first geographic location to which the detected stalk diameter value corresponds;

controlling a controllable subsystem of the agricultural work machine based on the detected geographic location of the agricultural work machine and based on the predictive stalk diameter value.

11. The computer implemented method of claim 10, wherein controlling the controllable subsystem comprises:

generating a deck plate position control signal based on the detected geographic location of the agricultural work machine and the predictive stalk diameter value; and controlling the controllable subsystem based on the deck plate position control signal to control a spacing between an at least one set of deck plates on the agricultural work machine.

12. The computer implemented method of claim 11 and further comprising:

detecting, with an operator input sensor, an operator input command value corresponding to the second geographic location to which the predictive stalk diameter value corresponds; and predicting a predictive operator input command value corresponding to a third geographic location, different than the second geographic location to which the detected operator input command value corresponds, based on the predictive stalk diameter value corresponding to the second geographic location and based on the detected operator input command value corresponding to the second geographic location to which the predictive stalk diameter value corresponds.

13. The computer implemented method of claim 12, wherein controlling the controllable subsystem of the agricultural work machine comprises controlling the controllable subsystem based on the predictive operator input command value.

14. The computer implemented method of claim 10 and further comprising:

identifying a relationship between stalk diameter and the agricultural characteristic based on the detected stalk diameter value corresponding to the first geographic location and the value of the agricultural characteristic in the map corresponding to the first geographic location to which the detected stalk diameter value corresponds; and predicting the predictive stalk diameter value corresponding to the second geographic location based on a value of the agricultural characteristic in the map corresponding to the second geographic location and based on the identified relationship.

15. An agricultural system comprising:

a controllable subsystem;

a communication system that receives a map that includes values of an agricultural characteristic corresponding to different geographic locations in a field;

a geographic position sensor that detects a geographic location of the agricultural work machine;
an in-situ sensor that detects an operator input command value corresponding to a first geographic location;
one or more processors; and
a data store that stores a set of computer executable instructions that, when executed by the one or more processors, configure the one or more processors to:
predict a predictive operator input command value corresponding to a second geographic location in the field, different than the first geographic location to which the detected operator input command value corresponds, based on the detected operator input command value corresponding to the first geographic location and based on a value of the agricultural characteristic in the map corresponding to the first geographic location to which the detected operator input command value corresponds; and
generate a control signal to control the controllable subsystem based on the detected geographic location of the agricultural work machine and based on the predictive operator input command value.

16. The agricultural system of claim 15, wherein the map is a predictive stalk diameter map that includes, as the values of the agricultural characteristic, predictive stalk diameter values.

17. The agricultural system of claim 16, wherein the predictive stalk diameter map is generated as the agricultural work machine operates at the field.

18. The agricultural system of claim 16, wherein the set of computer executable instructions, when executed by the one or more processors, further configure the one or processors to:
identify a relationship between operator input command values and predictive stalk diameter values based on the detected operator input command value corresponding to the first geographic location and a predictive stalk diameter value in the predictive stalk diameter map corresponding to the first geographic location to which the detected operator input command value corresponds; and
predict the predictive operator input command value corresponding to the second geographic location based on a predictive stalk diameter value in the predictive stalk diameter map corresponding to the second geographic location and based on the identified relationship.

19. The agricultural system of claim 15, wherein the detected operator input command value is indicative of an operator input deck plate spacing setting corresponding to the first geographic location and wherein the predictive operator input command value is indicative of a predictive operator input deck plate spacing setting corresponding to the second geographic location.

20. The agricultural system of claim 19, wherein the controllable subsystem comprises an actuator that controls a spacing of an at least one set of deck plates on the agricultural work machine.

\* \* \* \* \*